United States Patent
Sekine

(10) Patent No.: US 8,823,890 B2
(45) Date of Patent: Sep. 2, 2014

(54) LIQUID CRYSTAL DISPLAY DEVICE

(75) Inventor: Hiroyuki Sekine, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 391 days.

(21) Appl. No.: 13/432,143

(22) Filed: Mar. 28, 2012

(65) Prior Publication Data

US 2012/0249901 A1   Oct. 4, 2012

(30) Foreign Application Priority Data

Mar. 29, 2011 (JP) ................................. 2011-072035
Jan. 26, 2012 (JP) ................................. 2012-014232

(51) Int. Cl.
- *G02F 1/1339* (2006.01)
- *G02F 1/1343* (2006.01)
- *H04N 13/04* (2006.01)
- *G02B 27/22* (2006.01)
- *G02F 1/1362* (2006.01)
- *G02F 1/1335* (2006.01)

(52) U.S. Cl.
CPC ....... *H04N 13/0404* (2013.01); *H04N 13/0422* (2013.01); *G02F 1/136213* (2013.01); *G02F 1/133514* (2013.01); *G02B 27/2214* (2013.01); *H04N 13/0415* (2013.01); *G02F 1/133526* (2013.01)
USPC ............................................ 349/15; 349/139

(58) Field of Classification Search
USPC ............................................................ 349/15
See application file for complete search history.

(56) References Cited

U.S. PATENT DOCUMENTS

2005/0046764 A1   3/2005   Enda et al.
2006/0012593 A1   1/2006   Iriguchi et al.

FOREIGN PATENT DOCUMENTS

| JP | 01-025196 | 1/1989 |
|---|---|---|
| JP | 64-025196 | 1/1989 |
| JP | 10-186294 | 7/1998 |
| JP | 2005-208567 | 8/2005 |
| JP | 2006-030512 | 2/2006 |
| JP | 2008-092361 | 4/2008 |
| JP | 2008-249887 | 10/2008 |

OTHER PUBLICATIONS

Partial European Search Report dated Nov. 9, 2012; Application No. 12161727.8.

*Primary Examiner* — Wen-Ying P Chen
(74) *Attorney, Agent, or Firm* — Young & Thompson

(57) ABSTRACT

Red, green, and blue color resists and a shielding layer (black matrix) are layered on a liquid crystal panel. The subpixels are zoned by the shielding layer. The subpixels arranged in three rows and two columns form a pixel. The red, green, and blue color resists are colored on the basis of a row of subpixels. The color resists extend in stripes in the X-axis direction. Three data lines are provided for each column of subpixels in the manner that one is provide under the shielding layer and the other two diagonally divide the opening of the shielding layer at equal intervals.

9 Claims, 70 Drawing Sheets

US 8,823,890 B2

LIQUID CRYSTAL DISPLAY DEVICE

INCORPORATION BY REFERENCE

This application is based on Japanese Patent Application No. 2012-14232 filed on Jan. 26, 2012, and including specification, claims, drawings and summary. The disclosure of the above Japanese Patent Application is incorporated herein by reference in its entirety.

TECHNICAL FIELD

The present invention relates to a liquid crystal display device and particularly to a liquid crystal display device displaying three-dimensional images.

BACKGROUND ART

Recently, there have been growing demands for displays capable of displaying three-dimensional images, or so-called 3D images. Methods for displaying three-dimensional images have long been explored. At the present, vigorous research and development efforts are being made. One of the currently most prospective methods utilizes the parallax between the eyes.

Three-dimensional display devices utilizing the parallax between the eyes are classified into two types: one type employs special glasses to project different images on the right and left eyes (which is termed "the glasses scheme," hereafter) and the other type spatially separates and projects light of right and left different images emitted from a three-dimensional display device without using special glasses (which is termed "the naked eye scheme," hereafter).

The former glasses scheme is suitable where multiple observers view a relatively large screen together and used in movie theaters and for televisions. The latter naked eye scheme is suitable where one observer views a relatively small screen. Particularly, the naked eye scheme eliminates the burden of wearing special glasses and allows for viewing of three-dimensional images with no hassle. Therefore, this scheme is expected to apply to portable terminals, digital still cameras, video cameras, and note-type computer displays.

A liquid crystal display device capable of displaying three-dimensional images in the naked eye scheme is disclosed in Unexamined Japanese Patent Application Publication No. 2006-030512. The Unexamined Japanese Patent Application Publication No. 2006-030512 discloses a liquid crystal display device comprising pixels arranged in a matrix of 3×3 in the X-axis and Y-axis directions and each consisting of six subpixels RR, RL, GR, GL, BR, and BL. The liquid crystal display device disclosed in the Unexamined Japanese Patent Application Publication No. 2006-030512 uses one pixel consisting of the six subpixels for projecting R, G, and B lights constituting a color image on the two, right and left, eyes. Here, the subpixel RR is a subpixel to display a red image for the right eye and RL is a subpixel to display a red image for the left eye. Similarly, the GR, GL, BR and, BL are subpixels to display green images for the right and left eyes and blue images for the right and left eyes, respectively.

The above subpixels are composed of the circuit as shown in FIG. 43. Each subpixel has a pixel thin film transistor TFT as a switching element, a liquid crystal capacitor Clc, and a storage capacitor Cst. The gate terminal of the pixel thin film transistor TFT is connected to a gate line Gn shared by a row of subpixels arranged in the X-axis direction. The drain terminal of the pixel thin film transistor TFT is connected to a data line Dm shared by a column of subpixels arranged in the Y-axis direction. The source terminal of the pixel thin film transistor TFT is connected to the liquid crystal capacitor Clc and storage capacitor Cst.

In the liquid crystal display device disclosed in the Unexamined Japanese Patent Application Publication No. 2006-030512, as shown in FIG. 44, a cylindrical lens having a pitch P1 is arranged in an array in the X-axis direction over columns of pixels arranged in the X-axis and Y-axis directions with a pitch Pp. The observer views the liquid crystal display device in the Z-axis direction. The right-eye red light emitted from the subpixel RR is released into a zone ZR in the space via a cylindrical lens 3a as shown in FIG. 45. Similarly, the left-eye red light emitted from the subpixel RL is released into a zone ZL in the space via the cylindrical lens 3a. Here, as the observer places the right and left eyes in the zones ZR and ZL, respectively, he/she can view a right-eye image with the right eye 8R and a left-eye image with the left eye 8L. Then, the observer can recognize an image displayed on the liquid crystal display device as a three-dimensional image.

The liquid crystal display device disclosed in the Unexamined Japanese Patent Application Publication No. 2006-030512 has a excellent characteristic, which is that the observer does not see the colors separate even if he/she shakes the head right and left (in the X-axis direction). The cylindrical lens 3a has a lens effect only in the direction perpendicular to the extending direction of the lens (the X-axis direction) and has no lens effect in the extending direction (the Y-axis direction). Here, the liquid crystal display device disclosed in the Unexamined Japanese Patent Application Publication No. 2006-030512 has the subpixels of the same color in the X-axis direction. Therefore, the lights of primary colors R, G, and B are not emitted in different directions by the lens and high quality three-dimensional images without color separation can be displayed. Therefore, the observer does not see the color separate even if he/she shakes the head.

However, the liquid crystal display device disclosed in the Unexamined Japanese Patent Application Publication No. 2006-030512 has some problems such as possible insufficient writing of signals due to short time to write video signals in the subpixels, occurrence of moire, and an increased size of a circuit driving the data lines.

First, the reason for possible insufficient writing of signals is discussed. The liquid crystal display device disclosed in the Unexamined Japanese Patent Application Publication No. 2006-030512 operates as shown in FIG. 46. Here, a frame time period Tv is the time period to write signals for one screen in the liquid crystal display device. A horizontal time period Th is the time period to write signals for a row of subpixels of the liquid crystal display device. In a horizontal time period Th, a signal is applied to any one gate line to turn on the pixel thin film transistors TFT. Concurrently, video signals are written in all data lines so that the video signals on the data lines are written in the liquid crystal capacitors Clc and storage capacitors Cst via the pixel thin film transistors TFT. This operation is conducted on all gate lines to write video signals for one screen.

Here, the liquid crystal display device disclosed in the Unexamined Japanese Patent Application Publication No. 2006-030512 has a resolution of 3×3 and one pixel is divided into six subpixels, two in the X-axis direction and three in the Y-axis direction. Therefore, one frame time period has to be divided into at least nine, 3 times 3, horizontal time periods. In other words, the horizontal time periods as many as three times the actual number of pixels in the Y-axis direction are necessary. For example, for a resolution of VGA (640×480 pixels), 1440 horizontal time periods Th are necessary. The number of horizontal time periods Th, 1440, is higher than the number of horizontal time periods for a resolution of conventional (two-dimensional display) FHD (1920×1080). Therefore, insufficient writing is likely to occur.

Next, occurrence of moire is discussed. The liquid crystal display device disclosed in the Unexamined Japanese Patent Application Publication No. 2006-030512 emits light as shown in FIG. 47. In the liquid crystal display device disclosed in the Unexamined Japanese Patent Application Publication No. 2006-030512, each subpixel is zoned and surrounded by a region transmitting no light ("a shielding part," hereafter) 52 in the X-axis and Y-axis directions. The shielding part 52 of the liquid crystal panel 2 is projected to the observer as a zone Zd via the cylindrical lens 3a. The zone Zd, where no light is emitted from the liquid crystal panel 2, looks black to the observer. This black zone appears intermittently and is recognized as moire.

Finally, the reason for an increased size of a data line drive circuit is discussed. The circuit driving the data lines (the data driver) in the liquid crystal display device disclosed in the Unexamined Japanese Patent Application Publication No. 2006-030512 generally consists of a circuit as shown in FIG. 48. This data driver consists of two sets of memories, MR1 to MRm, MG1 to MGm, and MB1 to MBm, and M'R1 to M'Rm, M'G1 to M'Gm, and M'B1 to M'Bm, selection circuits SL1 to SLm, DACs (digital-analog converters) DA1 to DAm, and amplifiers AM1 to AMm. The two sets of memories each have a capacity to store video signals for one row of pixels. The selection circuits, DACs, and amplifiers at least as many as the number of subpixels in a row of subpixels are provided. This data driver temporarily stores red, green, and blue digitalized video signals supplied to the signal lines SR, SG, and SB from a signal source therein, converts them to analog signals, and supplies them to the data lines of the liquid crystal display device in sequence on the basis of a row of subpixels.

The above data driver operates as shown in FIG. 49. SR, SG, and SB present times for video signals to be supplied from a signal source. MR1 to MBm present transition in the content of the first set of memories. M'R1 to M'Bm present transition in the content of the second set of memories. DA1 to DAm present transition in the output of DACs. Video signals are supplied from a signal source in sequence generally on the bases of red, green, and blue data for one pixel. However, in the liquid crystal display device disclosed in the Unexamined Japanese Patent Application Publication No. 2006-030512, the subpixels of the same color, red, green, or blue, are arranged in stripes in the row direction and driven by individual different gate lines. Then, the time to output video signals is adjusted among the data drivers. Video signals for a row of subpixels are output in sequence in time periods, ThRn, ThGn, and ThBn, obtained by dividing the time period Th'n by 3. Here, signals for a row of red subpixels are output in a time period ThRn, signals for a row of green subpixels are output in a time period ThGn, and signals for a row of blue subpixels are output in a time period ThBn.

The codes written in the signals of the timing chart present how video signals supplied from a signal source are retained, transferred, and output via DAC circuits. For example, a signal R1 to be supplied to a signal line SR in a time period Th'n is first retained in a memory MR1 of the first set and, after all video signals are retained in the first set of memories in a time period Th'n, transferred to a memory M'R1 of the second set. Therefore, the code R1 in the second half of a time period Th'n is presented as M'R1.

Then, at the beginning of a time period Th'n+1, the signal retained in the memory MR'1 of the second set is transferred to a DAC DA1 via a selection circuit SL1 for output. Therefore, the code R1 is written at the beginning of the time period Th'n+1 under the DA1. Other codes are written according to the same rules. As seen from this timing chart, video signals are supplied to the liquid crystal display device in sequence on the basis of a row of red, green, or blue subpixels. Therefore, for example, before a signal G1 retained in a memory MG1 of the first set in the time period Th'n is output to the liquid crystal display device via a DAC, a signal G'1 of the next pixel row is supplied to the data driver. Therefore, two sets of memories are necessary so that a new signal is not written before a signal retained in the memory is output. Furthermore, a selection circuit for selectively outputting a signal retained in the second set to the DAC circuit is also necessary.

Then, the size of the circuit is discussed. The above data driver has DACs and amplifiers as many as the number of subpixels in a row of subpixels. This is smaller in number than the number of pixels multiplied by the number of colors and by two or the number of right and left images.

However, a set of memories and a set of selection circuits are additionally necessary. Here, provided that the data driver is incorporated in a semiconductor device, the circuit area for incorporating the circuits is discussed. The circuit area of a DAC and amplifier depends on the frequency property required. In other words, the individual elements constituting a circuit have to be increased in size in order for the circuit to operate at a tripled speed with the same circuit configuration. In practice, the element size of the output part of the circuit is increased. Even if the number of circuits is reduced, the circuit area is not significantly diminished as long as the drive frequency is accordingly increased. Furthermore, for complex operation, the control circuit controlling such operation is increased in size. Then, the data driver is increased in size and then in cost.

A method of resolving the above problem of possible insufficient writing is disclosed in Unexampled Japanese Patent Application Publication No. S64-025196. The liquid crystal display device disclosed in the Unexampled Japanese Patent Application Publication No. S64-025196 has 4×4 pixels in the X-axis and Y-axis directions, a gate line shared by two rows of pixels, and two data lines for each row of pixels as shown in FIG. 50. The liquid crystal display device disclosed in the Unexampled Japanese Patent Application Publication No. S64-025196 operates as shown in FIG. 51. The liquid crystal display device disclosed in the Unexampled Japanese Patent Application Publication No. S64-025196 has four rows of pixels; two rows of pixels are driven by the same signal. Therefore, two horizontal time periods Th are required in one frame time period. Then, a long horizontal time period Th is assured, which can resolve insufficient writing of signals in the pixels.

A method of reducing moire, which is another problem, is disclosed in Unexamined Japanese Patent Application Publication No. H10-186294. The subpixel disclosed in the Unexamined Japanese Patent Application Publication No. H10-186294 has the structure shown in FIG. 52. As described above, moire is attributed to the shielding part extending in the extending direction of the cylindrical lens (the Y-axis direction). More specifically, moire is determined by the ratio between the width of the shielding part and the width of the opening in the Y-axis direction in a pixel. If this ratio varies depending on the position in the X-axis direction, the observer is aware of change in the brightness according to the angle to view the liquid crystal display device while he/she is viewing the liquid crystal display device through the cylindrical lens. Therefore, in order to eliminate moire, the ratio between the width of the shielding part and the width of the opening should be constant regardless of the position in the X-axis direction. In the subpixel disclosed in the Unexamined Japanese Patent Application Publication No. H10-186294, the shielding part extending in Y-axis direction has an angle θ with respect to the X-axis. Then, the width d of the shielding part in the Y-axis direction is expressed by the formula below in which e is the width of the diagonal shielding part:

$$d = e/\cos\theta \qquad [\text{Math 1}]$$

The width of the opening in a region where the diagonal shielding part is present is the total of widths b and c. The total value is constant regardless of the position in the X-axis direction provided that the sides Et and Eb defining the opening are parallel to each other. On the other hand, in a region where the diagonal shielding part is absent, the width a of the opening is constant regardless of the position in the X-axis direction and equal to the total of the widths b and c provided that the sides Et' and Eb defining the opening are parallel to each other and the widths f and d are equal. Here, the sides El, El', Er are parallel to each other.

Another method of obtaining a constant ratio between the width of the shielding part and the width of the opening in the Y-axis direction regardless of the position in the X-axis direction is disclosed in Unexamined Japanese Patent Application Publication No. 2008-092361. The subpixel disclosed in the Unexamined Japanese Patent Application Publication No. 2008-092361 has a parallelogram opening as shown in FIG. 53 so as to definitely overlap with subpixels adjacent in the X-axis direction. Because the opening is of a parallelogram, the sides Et and Eb are parallel and the sides El and Er are also parallel. Therefore, the width a and the total of widths b and c of the opening in the Y-axis direction are always equal regardless of the position in the X-axis direction. Furthermore, there are various other methods for reducing moire (for example, Unexamined Japanese Patent Application Publication Nos. 2008-249887 and 2005-208567).

SUMMARY

However, a new problem occurs when the methods disclosed in the Unexamined Japanese Patent Application Publication Nos. S64-025196 and H10-186294 or 2008-092361 are combined to resolve insufficient writing of signals in the pixels and prevent moire, which is drop in the aperture rate.

For example, as shown in FIG. 52, the width d of the diagonal shielding part in the Y-axis direction is determined by the width e and angle θ of the shielding part. If multiple rows of subpixels are driven concurrently for diminishing insufficient writing, the number of data lines provided for each column of subpixels should be increased. For example, two data lines should be provided for each column of subpixels for driving two rows of subpixels concurrently. Then, the width e of the shielding part will be doubled or larger. The width d of the diagonal shielding part in the Y-axis direction is accordingly increased. The width f for adjusting the width of the opening in the region where the diagonal shielding part is absent is also increased, whereby the aperture rate significantly drops.

Here, the width d can be reduced by using a smaller angle θ (made closer to zero). In such a case, another problem occurs. Subpixels next each other intrinsically display different images. This applies to the case of displaying two, right and left, images as described above and to a multiple viewpoint display device with which the observer can view different images depending on the angle to view. If the shielding part extending in the lens extending direction is tilted for preventing moire (the angle is made closer to zero), subpixels adjacent in the X-axis direction overlap with each other in a larger area in the Y-axis direction. In such an overlapping area, the observer views light from the next subpixel concurrently.

In other words, the observer views a right-eye image and, additionally, a left-eye image with the right eye concurrently. This mixture rate is sometimes called 3D crosstalk. A high rate of 3D crosstalk significantly deteriorates image quality and makes it difficult for the observer to recognize an image as a three-dimensional image. Furthermore, even if the pixel forms described in the Unexamined Japanese Patent Application Publication Nos. H10-186294, 2008-092361, 2008-249887, and 2005-208567 are used, moire may still occur. This happens when the TFT substrate and CF substrate are not superimposed in alignment and when the opening has blunt corners due to processing accuracy. The opening of a subpixel is defined by the crossover of the shielding entities of the TFT substrate and CF substrate. If the TFT substrate and CF substrate are out of alignment, conditions to eliminate moire such as a constant ratio between the width of the shielding part and the width of the opening regardless of the position in the X-axis direction are not satisfied.

On the other hand, if the opening is defined, for example, only by the BM (black matrix) or the shielding part of the CF substrate, the opening may not be formed with sufficient accuracy. In other words, as shown in FIG. 54, the actual opening indicated by the solid lines may be rounded and different in shape from the designed opening indicated by the dotted lines. Particularly, errors on the opening shape due to processing accuracy occur notably to the acute corners of the opening. Assessment of moire due to processing errors in actual prototypes of liquid crystal display devices revealed significant levels of moire even if the error was in the order of several μm.

As described above, moire occurs where sufficient processing accuracy is not assured in the production process of liquid crystal display devices. Furthermore, even a combination of the two methods cannot prevent high cost for the circuit driving a liquid crystal display device.

The present invention is invented in view of the above circumstances and an exemplary object of the present invention is to provide a liquid crystal display device realizing high image quality at low cost.

In order to achieve the above object, the liquid crystal display device according to a first exemplary aspect of the present invention includes a liquid crystal panel in which multiple pixels displaying right-eye and left-eye images are arranged in a matrix, and an optical unit arranged in a first direction, extending in a second direction perpendicular to the first direction, and allocating light emitted from the pixels in the first direction, wherein:

the pixels each include multiple subpixels arranged in a matrix;

the subpixels are each driven by a gate line extending in the first direction and a data line extending in the second direction, and provided with a color resist transmitting light of the same color as the subpixel adjacent in the first direction;

the subpixels are provided with an opening transmitting light and a shielding part transmitting no light in the manner that the ratio between the opening and shielding part in the second direction within the subpixel is nearly constant regardless of the position in the first direction;

the data line is arranged in the manner that n (n is an integer equal to or greater than 3) data lines are provided for each column of the subpixels and n−1 data lines divide the subpixel at equal intervals; and the multiple subpixels of each of the pixels are driven by a same gate signal.

In order to achieve the above object, the liquid crystal display device according to a second exemplary aspect of the present invention includes a liquid crystal panel in which multiple pixels displaying right-eye and left-eye images are arranged in a matrix, and an optical unit arranged in a first direction, extending in a second direction perpendicular to the first direction, and allocating light emitted from the pixels in the first direction, wherein:

the pixels each include multiple subpixels arranged in a matrix;

the subpixels are each driven by a gate line extending in the first direction and a data line extending in the second direction, and provided with a color resist transmitting light of the same color as the subpixel adjacent in the first direction; and the width in the first direction of light allocated by the optical unit is two or more times larger than the distance in the first direction between the eyes of the observer at a given position in a third direction perpendicular to the first and second directions.

In order to achieve the above object, the liquid crystal display device according to a third exemplary aspect of the present invention includes a liquid crystal panel in which multiple pixels displaying right-eye and left-eye images are arranged in a matrix, and an optical unit arranged in a first direction, extending in a second direction perpendicular to the first direction, and allocating light emitted from the pixels in the first direction, wherein:

the pixels each include multiple subpixels arranged in a matrix;

the subpixels are provided with multiple first shielding parts transmitting no light and extending in the first direction and multiple second shielding parts transmitting no light and having an angle θ with respect to the first direction;

the multiple first shielding parts each have a constant width in the second direction and the multiple second shielding parts have an equal width in the first direction;

the opening of the subpixels is divided by the multiple first shielding parts in the second direction and divided by the multiple second shielding parts equally into m in the first direction; and the following relationship is satisfied in which h is the total length in the second direction of the multiple divided openings in the second direction and Px is the pitch of the subpixels in the first direction:

$$m \times h / \tan \theta = Px.$$

The present invention can realize high image quality at low cost.

BRIEF DESCRIPTION OF THE DRAWINGS

These objects and other objects and advantages of the present invention will become more apparent upon reading of the following detailed description and the accompanying drawings in which.

EXEMPLARY EMBODIMENTS

Figure 1:
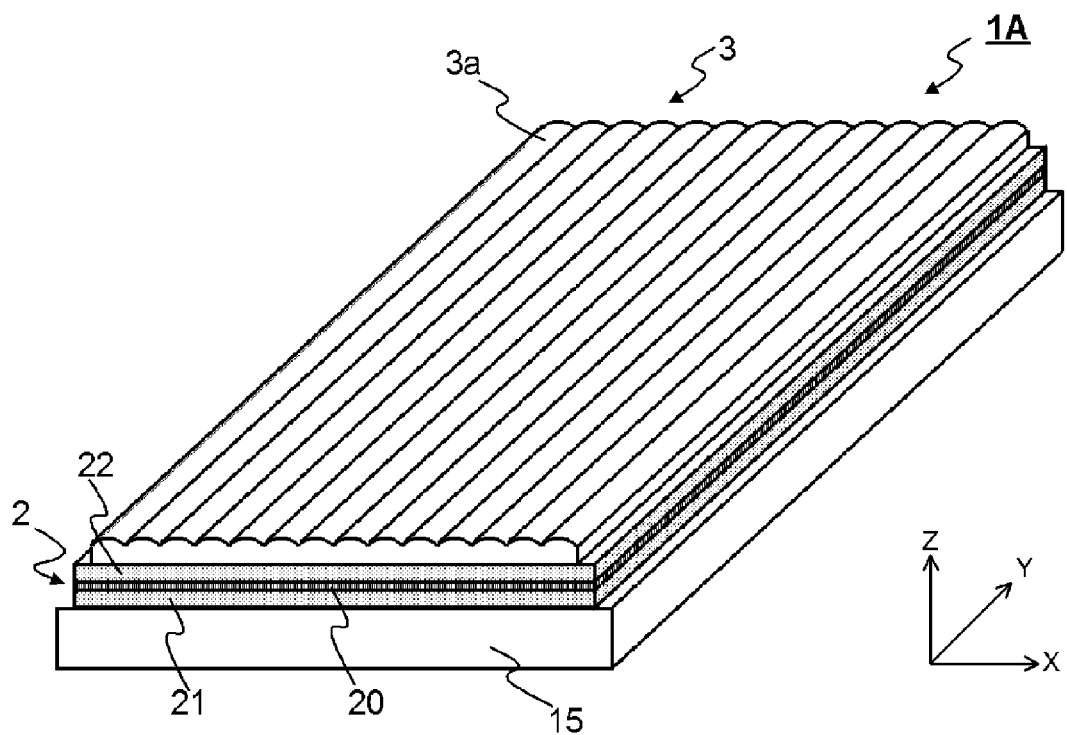
FIG. 1 A three-dimensional view showing the structure of the liquid crystal display device according to Embodiment 1 of the present invention.

The liquid crystal display devices according to embodiments of the present invention will be described with reference to the drawings. In the drawings, the components are illustrated in different size and scale as appropriate for assuring the visibility of the figure. Furthermore, hatched lines in the drawings are used to distinguish some components from others, not to present a cross section.

Embodiment 1

A liquid crystal display device 1A according to this embodiment can display a right-eye image and a left-eye image. Displaying different images to the right and left eyes of the observer, the liquid crystal display device 1A allows the observer to view a three-dimensional image.

As shown in FIG. 1, the liquid crystal display device 1A is constructed by providing on a liquid crystal panel 2 a lens array sheet 3 consisting of an array of cylindrical lenses. Furthermore, a back light 15 is provided on the opposite side of the liquid crystal panel 2 to the lens side.

Individual cylindrical lenses 3a constituting the lens array sheet 3 extend in the Y-axis direction and arrayed in the X-axis direction. The cylindrical lenses 3a have a lens effect only in the X-axis direction; it has no lens effect in the Y-axis direction. In other words, the cylindrical lenses 3a serve as an optical unit allocating light emitted from the pixels on the liquid crystal panel 2 in the X-axis direction.

The liquid crystal panel 2 is composed of a liquid crystal layer 20 interposed between a TFT substrate 21 and a CF substrate 22. The TFT substrate 21 and CF substrate 22 are each provided with an optical film such as a polarizing plate on the side opposite to the one in contact with the liquid crystal layer 20.

Furthermore, the liquid crystal panel 2 is provided with pixels arranged in a matrix in the X-axis and Y-axis directions for displaying right-eye and left-eye images. The cylindrical lenses have the focal point near the interface between the CF substrate 22 and liquid crystal layer of the liquid crystal panel 2.

Figure 2:
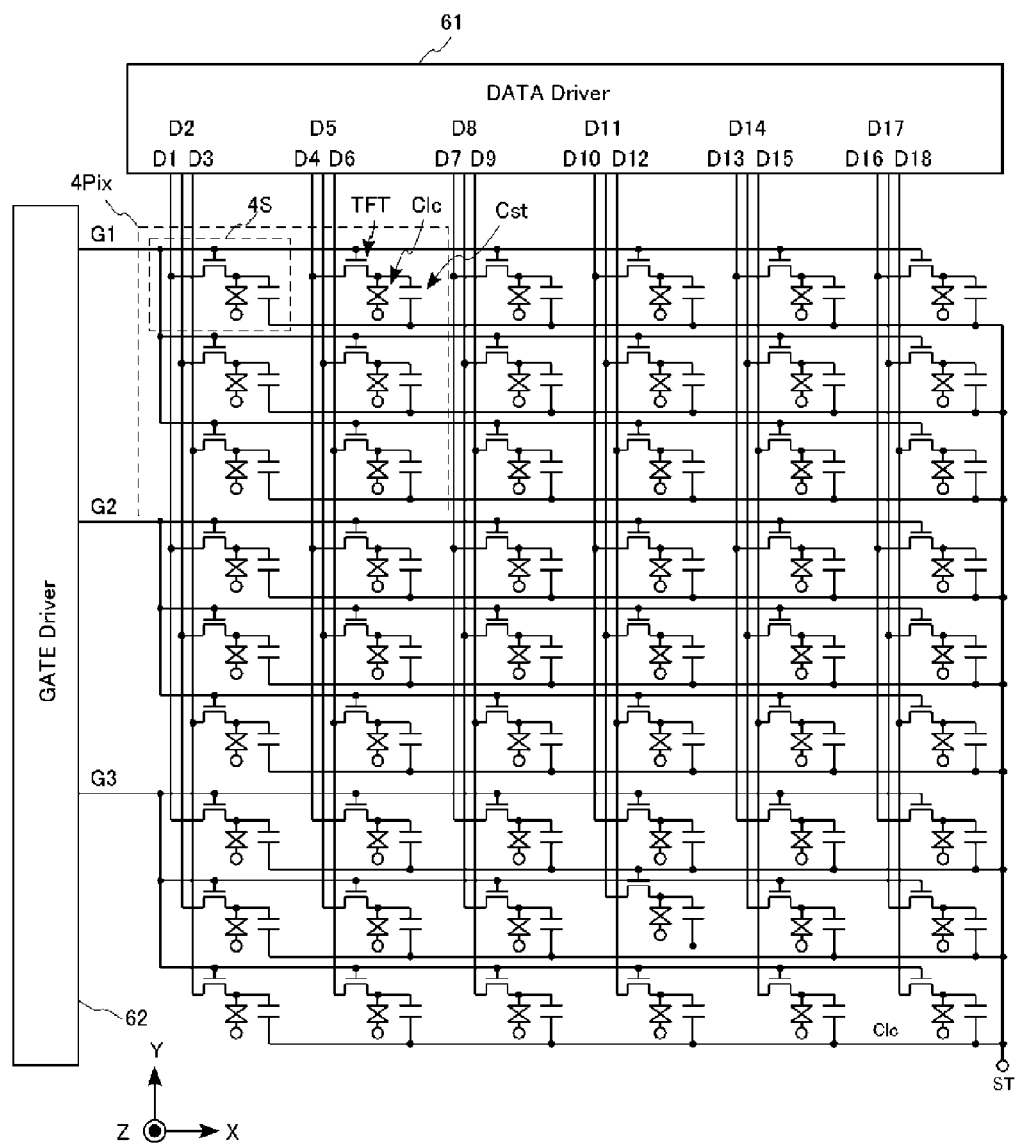
FIG. 2 A circuit diagrams showing the structure of the liquid crystal display device according to Embodiment 1 of the present invention.

The liquid crystal panel 2 has, for example, a circuit as shown in FIG. 2. The liquid crystal panel 2 has 3×3 pixels in the X-axis and Y-axis directions. A pixel 4Pix of the liquid crystal panel 2 consists of six subpixels 4S. The subpixels 4S are arranged in a matrix of 2×3 in the X-axis and Y-axis directions within each pixel 4Pix. A set of three subpixels 4S arranged in the Y-axis direction displays a right-eye or left-eye color image.

Each subpixel 4S has a pixel thin film transistor TFT, a liquid crystal capacitor Clc, and a storage capacitor Cst. A gate line G (the collective term for gate lines G1, G2, . . . ) is provided for a row of subpixels arranged in the X-axis direction. The pixel thin film transistors TFT of all subpixels 4S in one row are connected to the common gate line G. Three data lines D (the collective term for data lines D1, D2, . . . ) are provided for a column of subpixels arranged in the Y-axis direction. The pixel thin film transistors TFT of all subpixels 4S in one column are connected to one of the three data lines D.

Three gate lines belonging to the same pixel 4Pix and connected to three subpixels are connected within the liquid crystal panel 2 and driven by the same gate signal. The pixel thin film transistor TFT constituting a subpixel 4S is connected to a gate line G at the gate terminal, to a data line D at the drain terminal, and to a liquid crystal capacitor Clc and storage capacitor Cst at the source terminal.

The other terminal of a storage capacitor Cst is connected to a common terminal ST. However, it can be connected to different wires depending on the row of subpixels 4S or to different wires depending on the column of subpixels 4S. The other electrode forming a liquid crystal capacitor Clc is a common electrode on the CF substrate 22. However, the common electrode can be provided on the TFT substrate 21. The above wiring scheme can be selected on an arbitrary basis depending on the liquid crystal mode or drive method.

Figure 3:
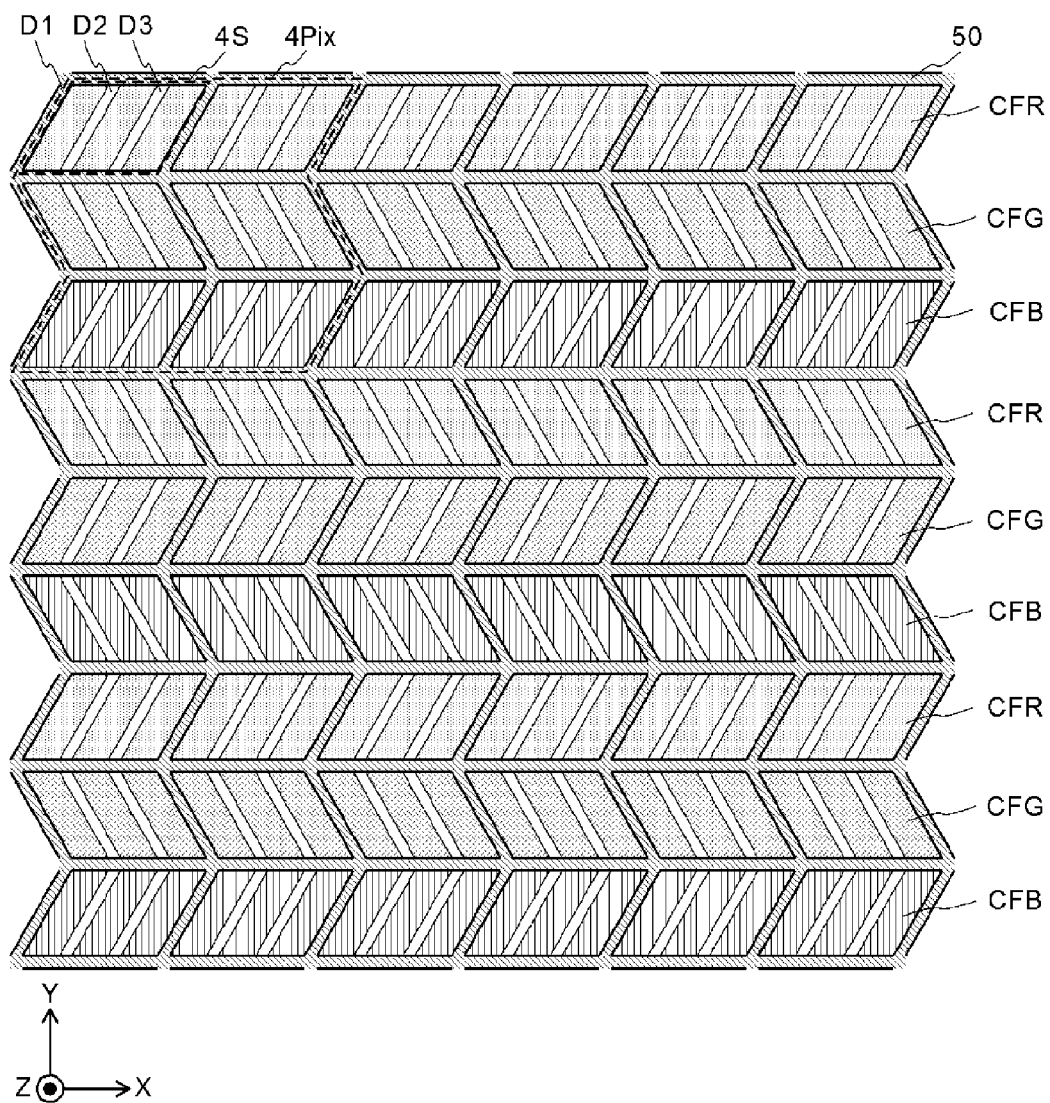
FIG. 3 A plane view showing the pixel layout of the liquid crystal display device according to Embodiment 1 of the present invention.

The CF substrate 22 of the liquid crystal panel 2 has the layout as shown in FIG. 3 in which red, green, and blue resist layers CFR, CFG, and CFB and a shielding layer (a black matrix) 50 are layered. Each subpixel 4S is zoned by the shielding layer 50. The subpixels 4S arranged in three rows and two columns constitute a pixel 4Pix. The red, green, and blue resists CFR, CFG, and CFB are provided on the basis of the row of subpixels 4S. The color resists extend in stripes in the X-axis direction. Among the three data lines D1, D2, and D3 provided for a column of subpixels 4S, one is provided under the shielding layer 50, and the other two are so provided diagonally as to divide the opening of the shielding part 50 equally.

Figure 4:
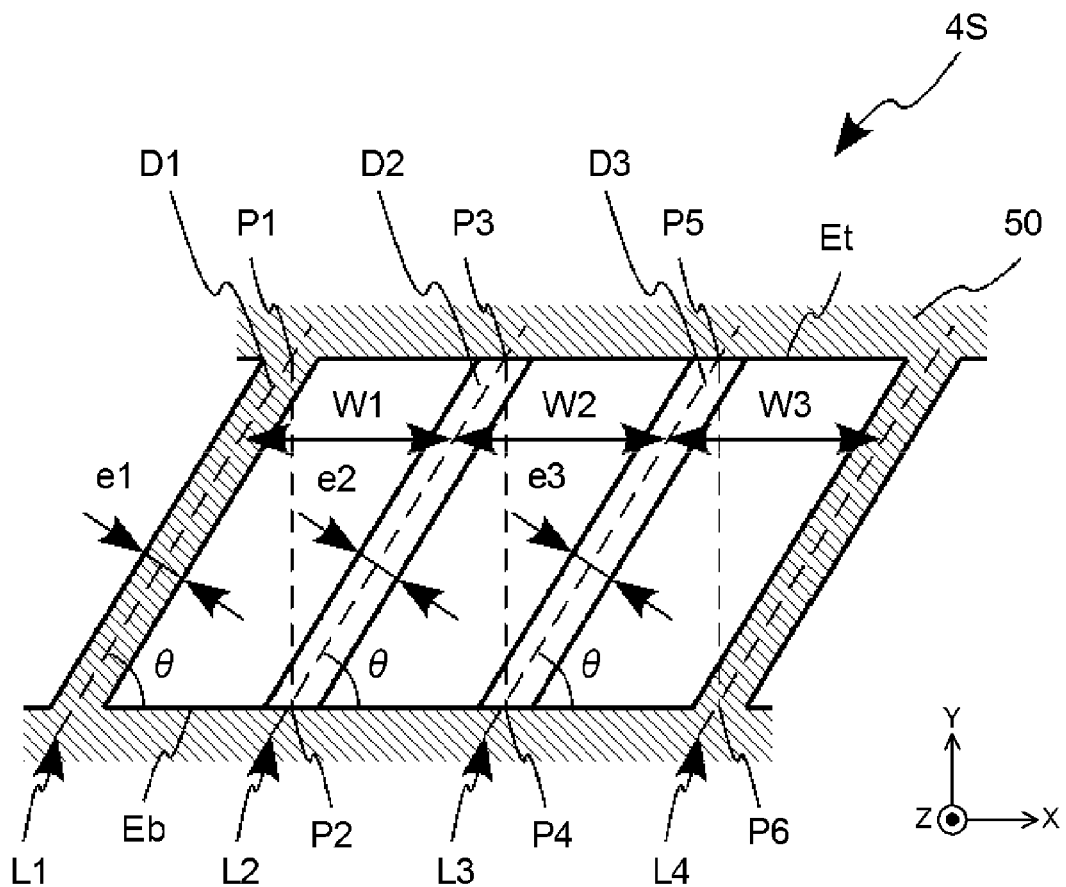
FIG. 4 A plane view showing the layout of a subpixel of the liquid crystal display device according to Embodiment 1 of the present invention.

More specifically, as shown in FIG. 4, a subpixel 4S is zoned by the shielding layer 50 on the CF substrate 22 and has a parallelogram opening. In other words, the sides Et and Eb defining the opening is parallel to each other. The three data lines D1, D2, and D3 provided for each column of subpixels 4S are each placed diagonally at an angle θ with respect to the side Eb defining the opening. The width e1 of the shielding layer 50 above the data line D1 is equal to the widths e2 and e3 of the data lines D2 and D3. Furthermore, points P1 and P2 have the same X-coordinate provided that P1 is the intersection between the center line L1 of the shielding layer 50 above the data line D1 and the side Et and P2 is the intersection between the center line L2 of the data line D2 and the side Eb. Similarly, points P3 and P4 have the same X-coordinate provided that P3 is the intersection between the center line L2 of the data line D2 and the side Et and P4 is the intersection between the center line L3 of the data line D3 and the side Eb. Furthermore, points P5 and P6 have the same X-coordinate provided that P5 is the intersection between the center line L3 of the data line D3 and the side Et and P6 is the intersection between the center line L4 of the shielding layer 50 bordering the adjacent subpixel 4S and the side Eb.

In other words, the line segment connecting the points P1 and P2, line segment connecting the points P3 and P4, line segment connecting the points P5 and P6 are parallel to the Y-axis direction. Therefore, the inclination of the inclined sides of the subpixel 4S with respect to the Y-axis direction is equal to the inclination of the data lines D and the inclined sides of the subpixel 4S are parallel to the data lines D. Furthermore, the distances W1, W2, and W3 between the data lines D are equal to each other.

Figure 5:
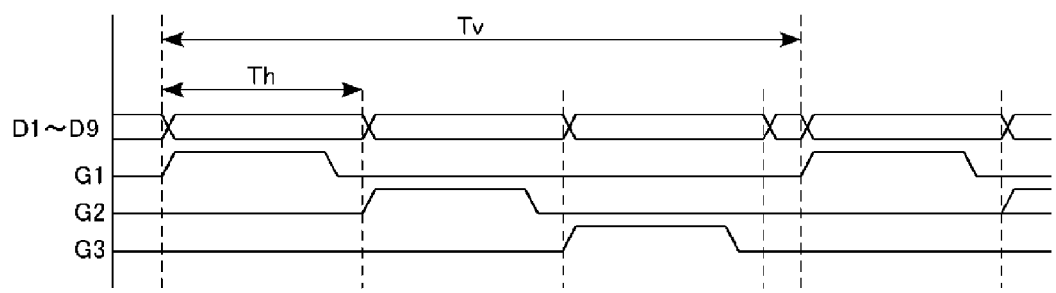
FIG. 5 A timing chart showing the operation of the liquid crystal display device according to Embodiment 1 of the present invention.

Operation of the liquid crystal display device 1A according to this embodiment will be described hereafter. The liquid crystal display device 1A has 3×3 pixels in the X-axis and Y-axis directions. A row of three subpixels 4S forming a pixel row is driven by the same gate line G. Therefore, a frame time period Tv to write signals for one screen in the liquid crystal display device 1A is divided into at least three horizontal time periods Th as shown in FIG. 5. With any one gate signal being given a potential to turn on the pixel thin film transistor TFT for a horizontal time period Th, the pixel thin film transistors TFT of a row of three subpixels 4S are turned on. While these pixel thin film transistors TFT are on, video signals are applied to the nine data lines D1 to D9 to write the video signals in the liquid crystal capacitors Clc and storage capacitors Cst. This operation is conducted for all gate lines G to write video signals for one screen.

The liquid crystal display device 1A can write video signals in three subpixels 4S concurrently. Therefore, the liquid crystal display device 1A according to this embodiment can have a horizontal time period Th approximately three times larger than the prior art with which a frame time period Tv is divided into nine horizontal time periods as many as the number of rows of subpixels. Then, enough time is given to write video signals in the subpixels 4S and insufficient writing is less likely to occur.

Figure 6:
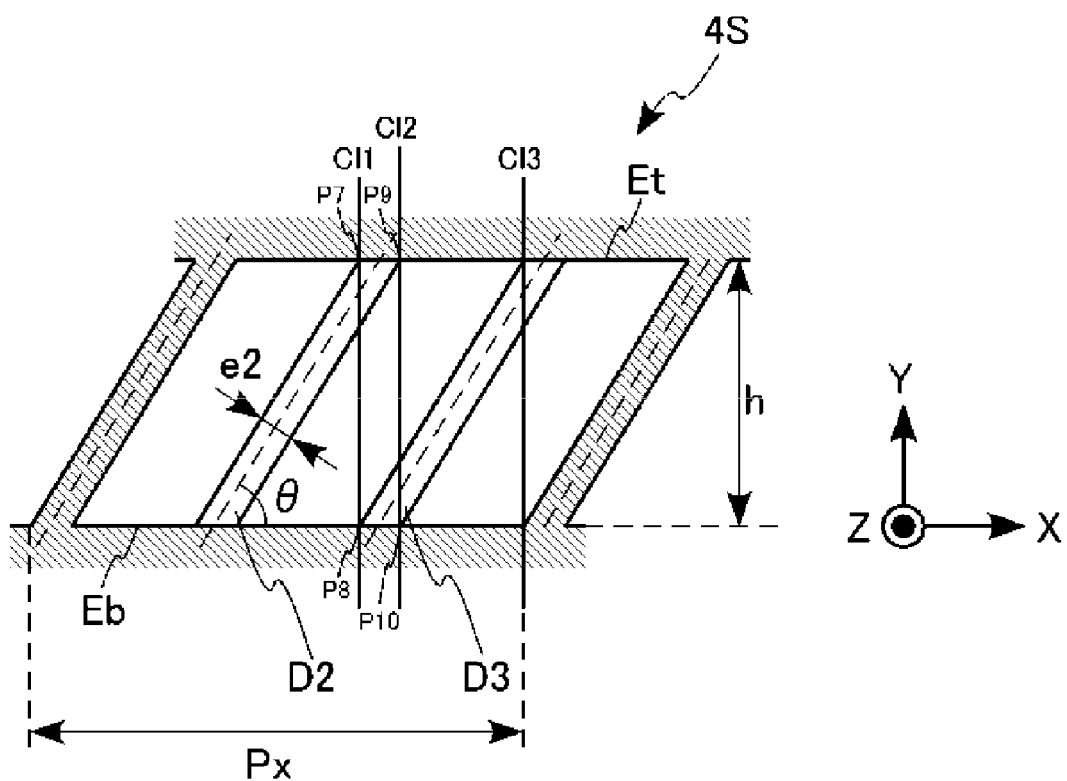
FIG. 6 A plane view showing the layout of a subpixel of the liquid crystal display device according to Embodiment 1 of the present invention.

The width of the opening of a subpixel 4S according to this embodiment will be described hereafter. In FIG. 6, points P7 and P9 are the intersections between the side Et of a subpixel 4S and the data line D2 and points P8 and P10 are the intersections between the side Eb and the data line D3. A virtual line C11 passing through the intersections P7 and P8 and a virtual line C12 passing through the intersections P9 and P10 are parallel to the Y-axis. This is because the sides Et and Eb are parallel to each other, the data lines D2 and D3 are parallel to each other, and the data lines D are provided at equal intervals and have the same width.

Here, the intersection P9 is situated on the +X side of the intersection P7 and the intersection P10 is situated on the +X side of the intersection P8. Since the virtual lines C11 and C12 are parallel to the Y-axis, the intersections P7 and P8 have the same X-coordinate and the intersections P9 and P10 have the same X-coordinate.

Here, both data lines D2 and D3 serving as the shielding part cross the region of the subpixel 4S that is enclosed by the virtual lines C11 and C12. The data lines D2 and D3 are parallel to each other. Therefore, the width Y12 in the Y-axis direction of the opening in this region is expressed by the mathematical formula below:

$$Y12 = h - e2/\cos\theta \qquad \text{[Math 2]}$$

On the other hand, a virtual line C13 passing through the intersection on the −X side between the side Et of the subpixel 4S and the data line D3 and the end of the side Eb on the +X side is parallel to the Y-axis. Similarly to the above, this is because the inclined sides of the subpixel 4S are parallel to the data line D3. Here, only the data line D3 serving as the shielding part crosses the region of the subpixel 4S that is enclosed by the virtual lines C12 and C13. The width Y23 in the Y-axis direction of the opening in this region is expressed by the mathematical formula below:

$$Y23 = h - e3/\cos\theta \qquad \text{[Math 3]}$$

As described above, the widths e1, e2, and e3 of the data lines D are equal. Therefore, the width in the Y-axis direction of the opening of a subpixel 4S is always equal regardless of the X-coordinate. In other words, the ratio of the width in the Y-axis direction of the opening to the width in the Y-axis direction of the shielding part in a subpixel 4S is contact regardless of the position in the X-axis direction.

Therefore, the liquid crystal display device 1A according to this embodiment has a contact ratio of the width of the opening to the width of the shielding part regardless of the position in the X-axis direction, reducing moire and improving the display quality.

Furthermore, the liquid crystal display device 1A according to this embodiment does not significantly drop the aperture rate even through three data lines D are provided for a column of subpixels 4S. The reason is as follows. It is assumed that Px is the pitch of subpixels 4S in the X-axis direction. The width of the opening in the Y-axis direction in the liquid crystal display device 1A according to this embodiment can be presented by the above mathematical formula 3. Therefore, the area S of the opening of a subpixel 4S is presented by the mathematical formula below:

$$S = (h - e3/\cos\theta) \times Px \qquad \text{[Math 4]}$$

Figure 52:
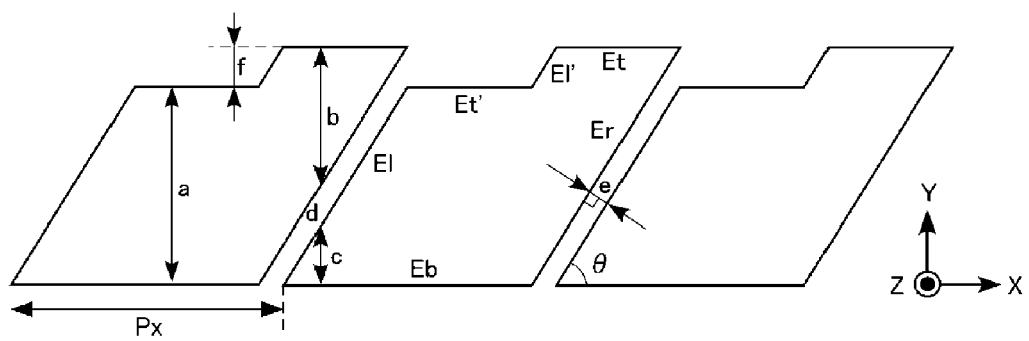
FIG. 52 A plane view showing the pixel layout of a prior art liquid crystal display device.

On the other hand, the area SC of the opening of a prior art pixel in FIG. 52 is discussed. Assuming that Px is the pitch of pixels in the X-axis direction, the area SC of the opening is presented by the formula below:

$$SC = a \times Px \qquad \text{[Math 5]}$$

Here, as shown in FIG. 6, the width h of a subpixel 4S of the liquid crystal display device 1A according to this embodiment is equal to the total of widths a and f in FIG. 52. On the other hand, since the width f is equal to the width d and the width d is presented by the above mathematical formula 1, the SC is presented by the formula below in which Px is the pitch of pixels in the X-axis direction:

$$SC = (h - e/\cos\theta) \times Px \qquad \text{[Math 6]}$$

Here, the width e3 in the above mathematical formula 4 and the width e in the above mathematical formula 6 are the width of a data line D. Therefore, the width e3 can be equal to the width e. In such a case, the opening areas S and SC are equal. In other words, in the liquid crystal display device 1A according to this embodiment, the opening is not reduced even through three data lines D are provided for a column of subpixels 4S. Therefore, the aperture rate does not drop.

The characteristics of the subpixel 4S discussed with reference to FIGS. 4 and 6 can also be described as follows. Assuming that Px is the pitch of subpixels 4S in the X-axis direction, h is the distance between two lines Et and Eb defining the opening and extending in parallel to the X-axis, and the opening is divided by the shielding layer 50 or data lines having an inclination 0 with respect to the X-axis and having an equal width to each other into n divisions, the equation below is obtained. The liquid crystal display device 1A according to this embodiment represents the case in which n=3.

$$n \times h/\tan\theta = Px \qquad \text{[Math 7]}$$

Figure 7:
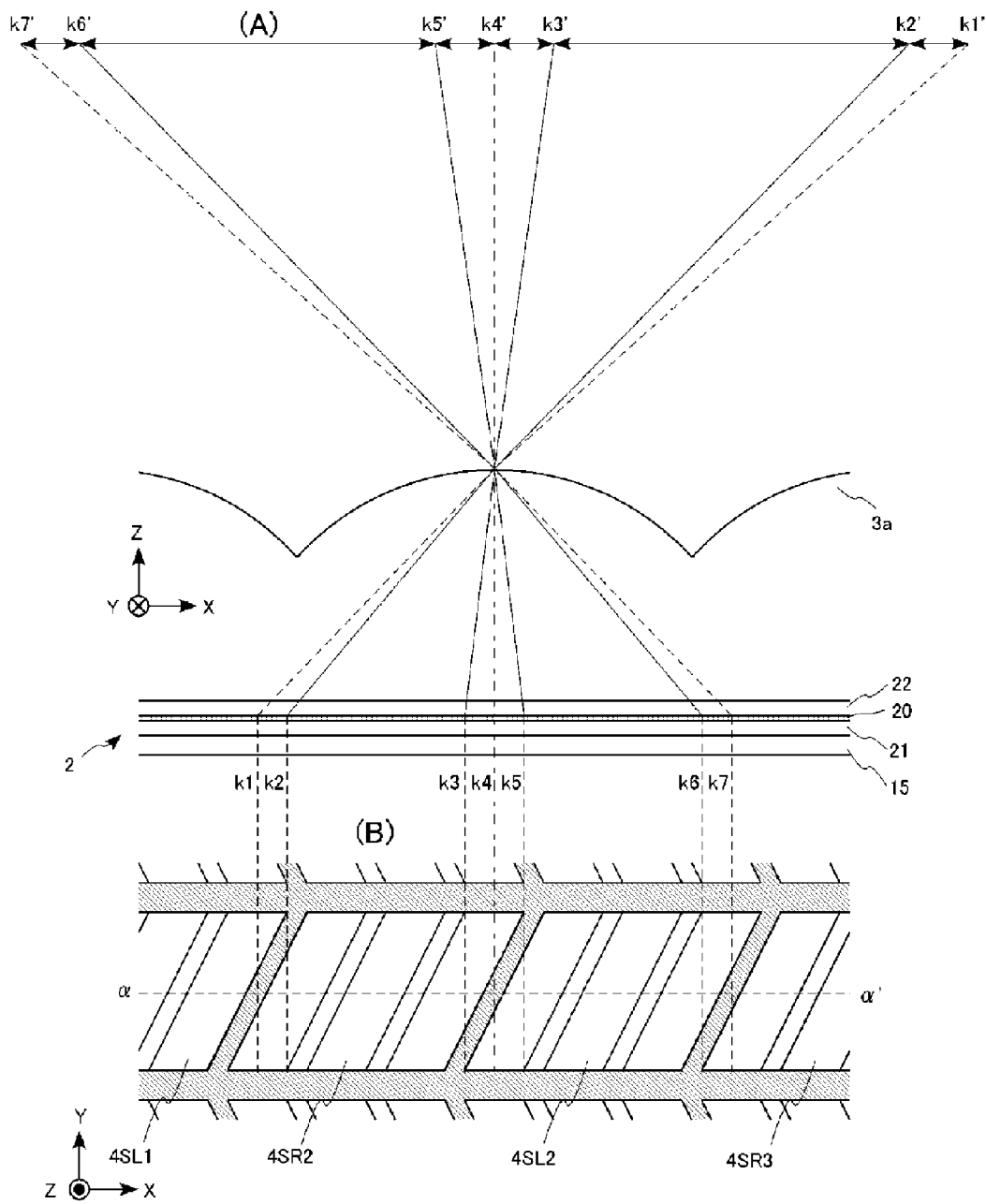
FIG. 7 An illustration for explaining the trajectory of light output from the liquid crystal display device according to Embodiment 1 of the present invention.

The region where adjacent subpixels 4S overlap with each other will be described hereafter. As shown in FIG. 7, light emitted from the liquid crystal panel 2 is projected on the observer via individual lenses 3a forming the lens array sheet 3. More specifically, light emitted from a point k1 on the liquid crystal panel 2 is projected at a point k1' on the observer. Similarly, light emitted from points k2 to k7 are projected at points k2' to k7'.

Here, as shown in FIG. 7, a subpixel 4SR2 and a subpixel 4SL1 adjacent on the −X side overlap in the Y-axis direction between the points k1 and k2. At the point k1, the ratio of the width of the opening of the subpixel 4SL1 to the width of the entire opening is 50%. The value of 3D crosstalk depends on this opening ratio. The value of 3D crosstalk decreases from the point k1 to the point k2 and reaches zero at the point k2. There is no adjacent subpixel 4S overlapping in the Y-axis direction in a section between the points k2 and k3; therefore, 3D crosstalk is 0%. The subpixel 4SR2 and a subpixel 4SL2 adjacent on the +X side overlap in the Y-axis direction in a section between the points k3 and k4. Therefore, 3D crosstalk increases from the point k3 to the point k4 and reaches 100% at the point k4.

Here, specific numbers are given on the assumption that the value of 3D crosstalk is determined only by the width of the opening for the purpose of convenience. On the other hand, in practice, the value of 3D crosstalk is influenced by the contrast of liquid crystal and light scattered by the TFT substrate 21, CF substrate 22, polarizing plate, and lens array sheet 3. However, their influence on the value of 3D crosstalk was less than several % according to assessment by the inventors of the present invention.

Therefore, it can be said that the value of 3D crosstalk is mainly determined by the width of the opening in the liquid crystal display device 1A according to this embodiment. As described above, the liquid crystal display device 1A according to this embodiment allows for a large section in which adjacent subpixels do not overlap with each other in the Y-axis direction, reducing 3D crosstalk. For example, placing the right eye between the points k2' and k3' and the left eye between the points k5' and k6', the observer can view an image with no 3D crosstalk. Needless to say, the observer can more easily recognize an image as 3D as 3D crosstalk is reduced.

Figure 53:
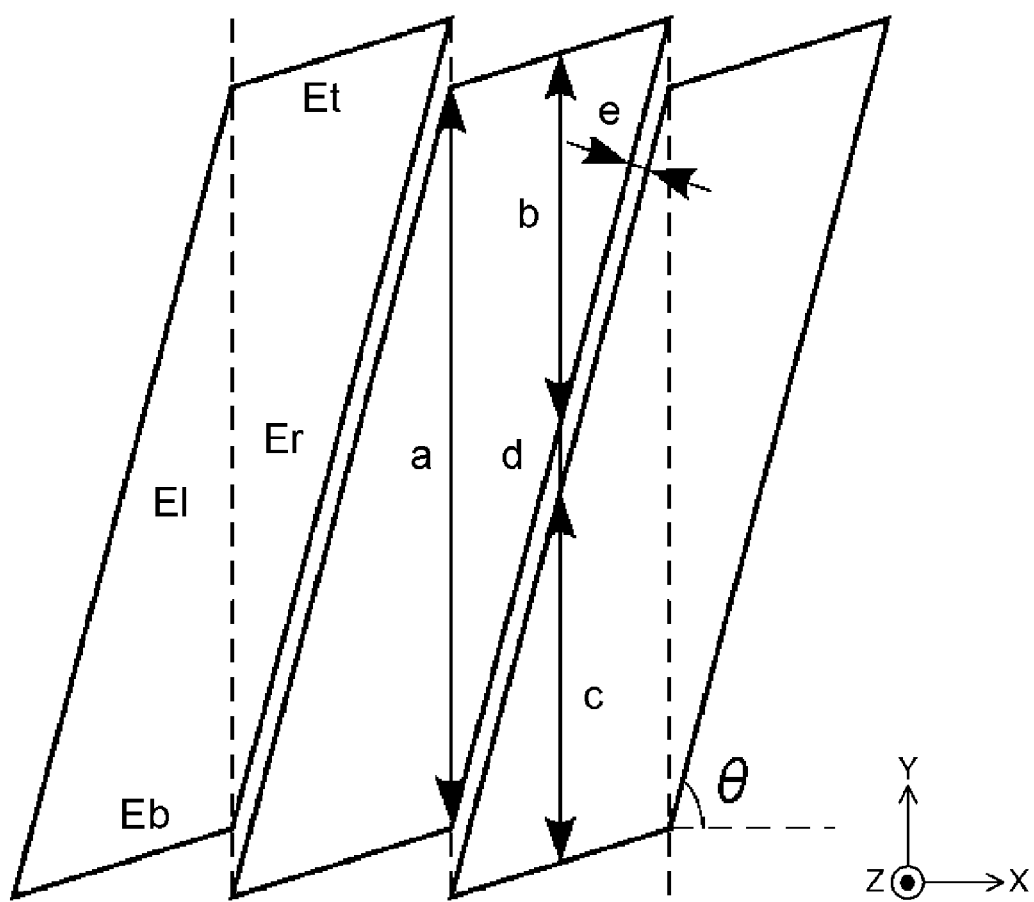
FIG. 53 A plane view showing the pixel layout of a prior art liquid crystal display device.
Figure 54:
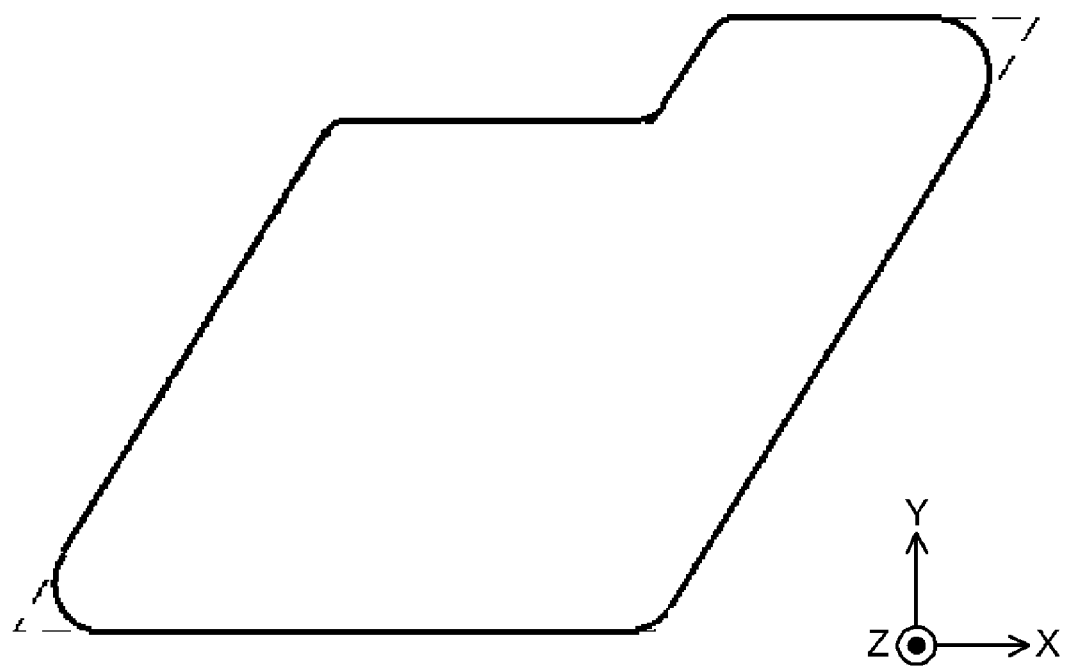
FIG. 54 A plane view schematically showing the opening of a subpixel of a prior art liquid crystal display device.

In a prior art layout in which a subpixel always overlaps in the Y-axis direction with subpixels adjacent in the X-axis direction (see FIG. 53), there is almost no region where crosstalk is 0%.

Figure 8:
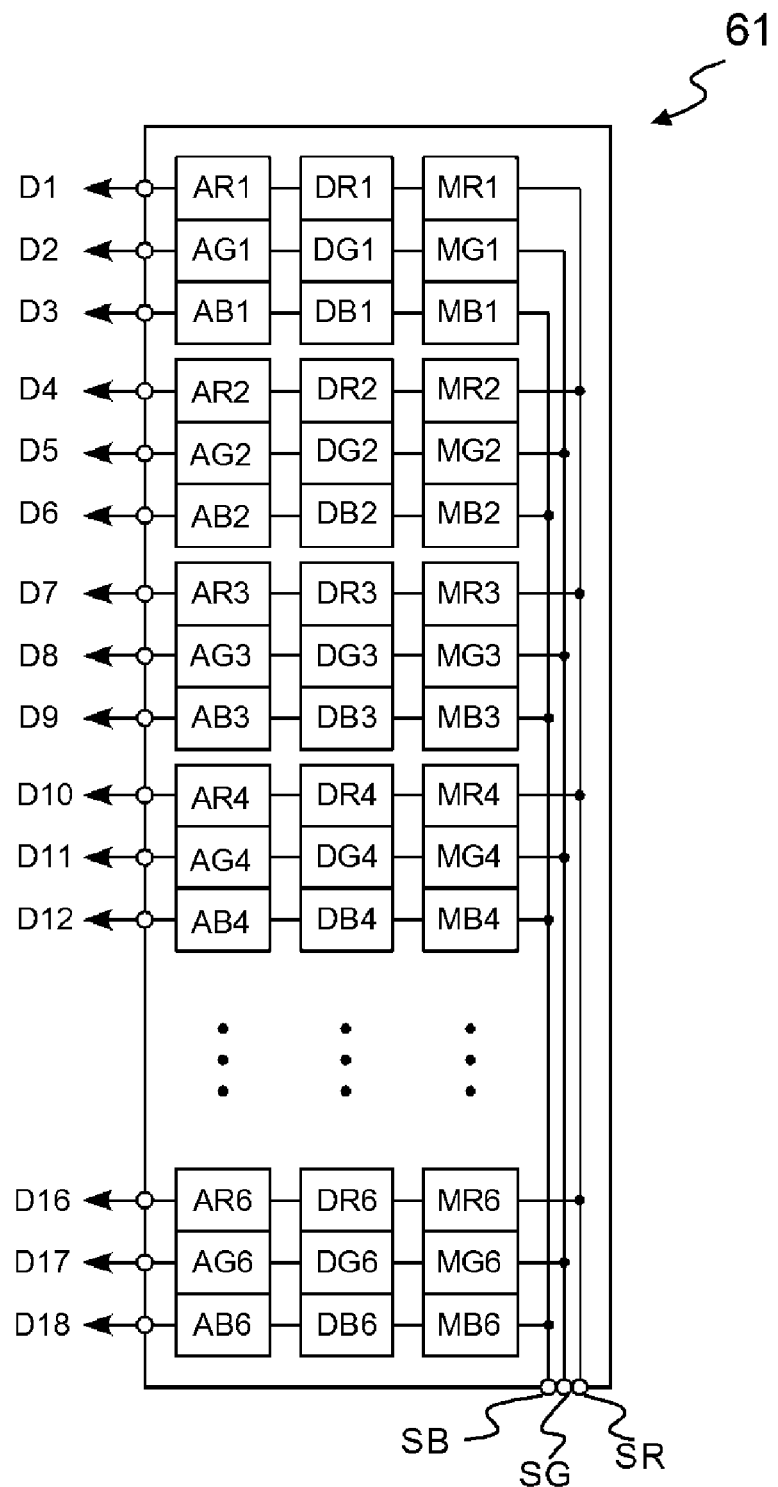
FIG. 8 A circuit diagram showing an exemplary data driver applicable to the liquid crystal display device according to Embodiment 1 of the present invention.

A data driver 61 driving the data lines D will be described hereafter. The data driver 61 applicable to the liquid crystal display device 1A according to this embodiment is composed of, as shown in FIG. 8, a set of memories MR1 to MR6, MG1 to MG6, and MB1 to MB6, a set of DACs (digital-analog converters) DR1 to DR6, DG1 to FG6, and DB1 to DB6, and a set of amplifiers AR1 to AR6, AG1 to AG6, and AB1 to AB6. A set of memories, DACs, or amplifiers consists of memories, DACs, or amplifiers as many as the number of drain lines of the liquid crystal panel 2.

The data driver 61 retains in the memories digitalized video signals SR, SG, and SB supplied from an external source in sequence and corresponding to the red, green, and blue colors. After the video signals for one row of pixels are retained in all memories, the retained video signals are transferred to the DACs at a time and their output is supplied to the data lines D1 to D18 of the liquid crystal panel 2 via the amplifiers.

Figure 9:
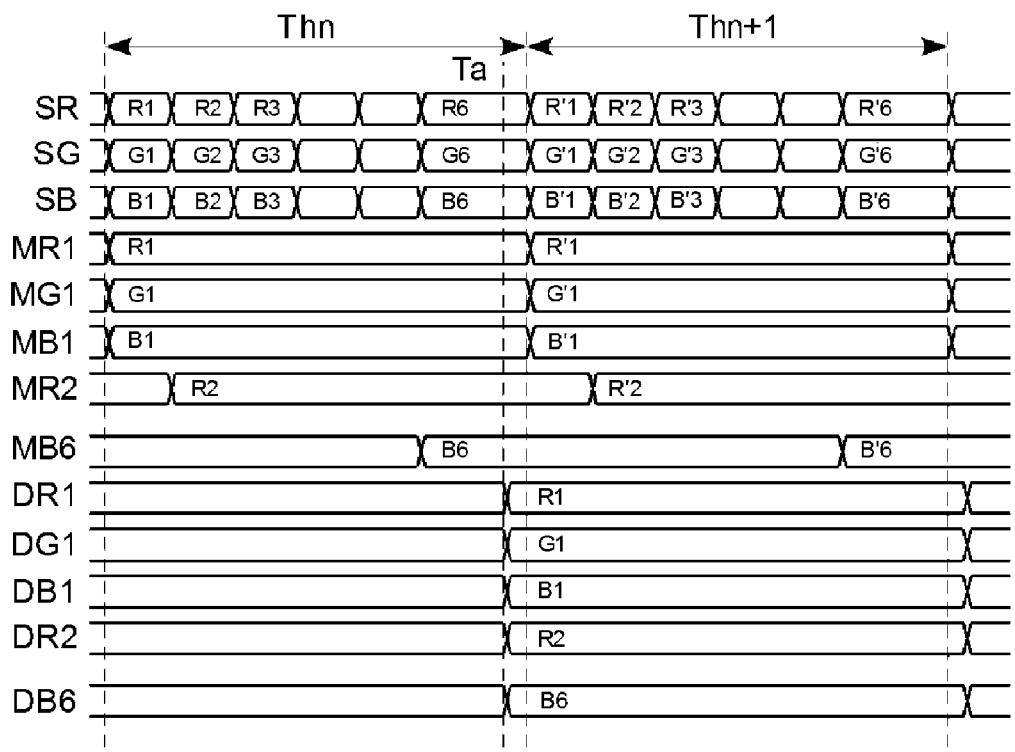
FIG. 9 A timing chart showing the operation of the data driver applicable to the liquid crystal display device according to Embodiment 1 of the present invention.

The data driver 61 having the above structure operates as shown in FIG. 9. SR, SG, and SB present times for video signals to be supplied from a signal source. MR1 to MB1 present transition in data retained in the memories. DR1 to DB6 present transition in data to be output from the DAC circuits. First, video signals R1 to R6, G1 to G6, and B1 to B6 are retained in the memories in sequence in a horizontal time period Thn during which video signals for a row of pixels of the liquid crystal panel 2 are supplied. After all video signals for a row of pixels are retained in the memories, the video signals are transferred to the DACs concurrently at a time Ta. Then, the video signals are continuously supplied to the liquid crystal display device 1A via the amplifiers over most of the next horizontal time period (Thn+1).

As described above, the data driver 61 applicable to the liquid crystal display device 1A according to this embodiment can simply write video signals for a row of pixels in the data lines D concurrently. This is because the liquid crystal panel 2 can write signals in a row of subpixels to display the red, a row of subpixels to display the green, and a row of subpixels to display the blue concurrently. Then, only one set of memories is required and there is no need of a selection circuit for switching video signals to enter in the DACs. Furthermore, since the video signals are simply written in the data lines D in a horizontal time period, the operation frequency required for the DACs and amplifiers can be lowered. Consequently, the circuit area necessary for incorporating the DACs and amplifiers in a semiconductor element can be reduced, reducing the cost.

The above explanation is summarized as follows. In the liquid crystal display device 1A according to this embodiment, the number of color resists is equal to the number of subpixels in which signals are written concurrently. Therefore, red, green, and blue video signals for one row of pixels supplied from an external source can be written in the liquid crystal panel 2 concurrently. Then, only the memories for retaining video signals for one row of pixels are required, reducing the circuit size of the data driver and reducing the cost.

In the above explanation, a liquid crystal display device displaying right-eye and left-eye images at a resolution of 3×3 in the X-axis and Y-axis directions is described. The resolution can be changed as necessary. Furthermore, in the above case, two, right and left, images are displayed. A total of 2m images, m images for each eye, can be displayed. In such a case, the subpixels 4S constituting a pixel 4Pix are arranged in three rows and 2m columns. Here, what is important is that the color resists are formed in stripes which extend in the X-axis direction (the direction perpendicular to the extending direction of the cylindrical lenses 3a) and the subpixels 4S increased in number to display more images are arranged in an increased number of columns in the X-axis direction.

Furthermore, in the above case, the color resists corresponding to three primary colors of light, red, green, and blue, are used as a method of realizing color display. Four or more color resists can be used. If n color resists are used, the subpixels 4S constituting a pixel 4Pix are arranged in n rows and the drive is timed to turn on the n rows of subpixels concurrently.

By the way, a liquid crystal display device is driven so that the polarity of a voltage applied to the pixels 4Pix with respect to the common electrode changes on the bases of a frame or on the bases of multiple frames, whereby any DC component is applied to the liquid crystal. In doing so, the polarity is generally set so that the polarities of subpixels 4S adjacent in the Y-axis direction or in the X-axis direction are different.

In the liquid crystal display device 1A according to this embodiment, if an odd number of color resists are used and the polarities of voltages written in subpixels 4S adjacent in the Y-axis direction with respect to the common electrode are different, the number of subpixels 4S in which a positive voltage is written is not equal to the number of subpixels 4S in which a negative voltage is written. Then, when video signals are written in the subpixels 4S, the potential of the common electrode fluctuates. This potential fluctuation converges according to the time constant of the common electrode. However, it may not always converge within a horizontal time period. In such a case, if the number of subpixels 4S in which a positive voltage is written is not equal to the number of subpixels 4S in which a negative voltage is written, the potential fluctuation of the common electrode in a horizontal time period varies in value, which is recognized by the observer as flickers or horizontal streaks.

On the other hand, if an even number of color resists are used, the number of subpixels 4S in which a positive voltage with respect to the common electrode is written is always equal to the number of subpixels 4S in which a negative voltage is written and, then, flickers or horizontal streaks can be reduced. Setting of video signals to be written in subpixels 4S adjacent in the Y-axis direction to different polarities with respect to the common electrode potential is used when the liquid crystal is subject to gate line inversion drive. In the gate line inversion drive, video signals to be written in subpixels 4S adjacent in the X-axis direction have the same polarity with respect to the common electrode potential, whereby an electric field in the X-axis direction does not occur easily between the adjacent subpixels 4S. This means that the shielding part between subpixels 4S adjacent in the X-axis direction can be narrowed. As in the liquid crystal display device 1A according to this embodiment, the narrowed shielding part contributes to high image quality and is particularly effective. In other words, the liquid crystal display device 1A according to this embodiment can reduce flickers and/or horizontal streaks particularly when an even number of color resists are used.

Embodiment 2

Figure 10:
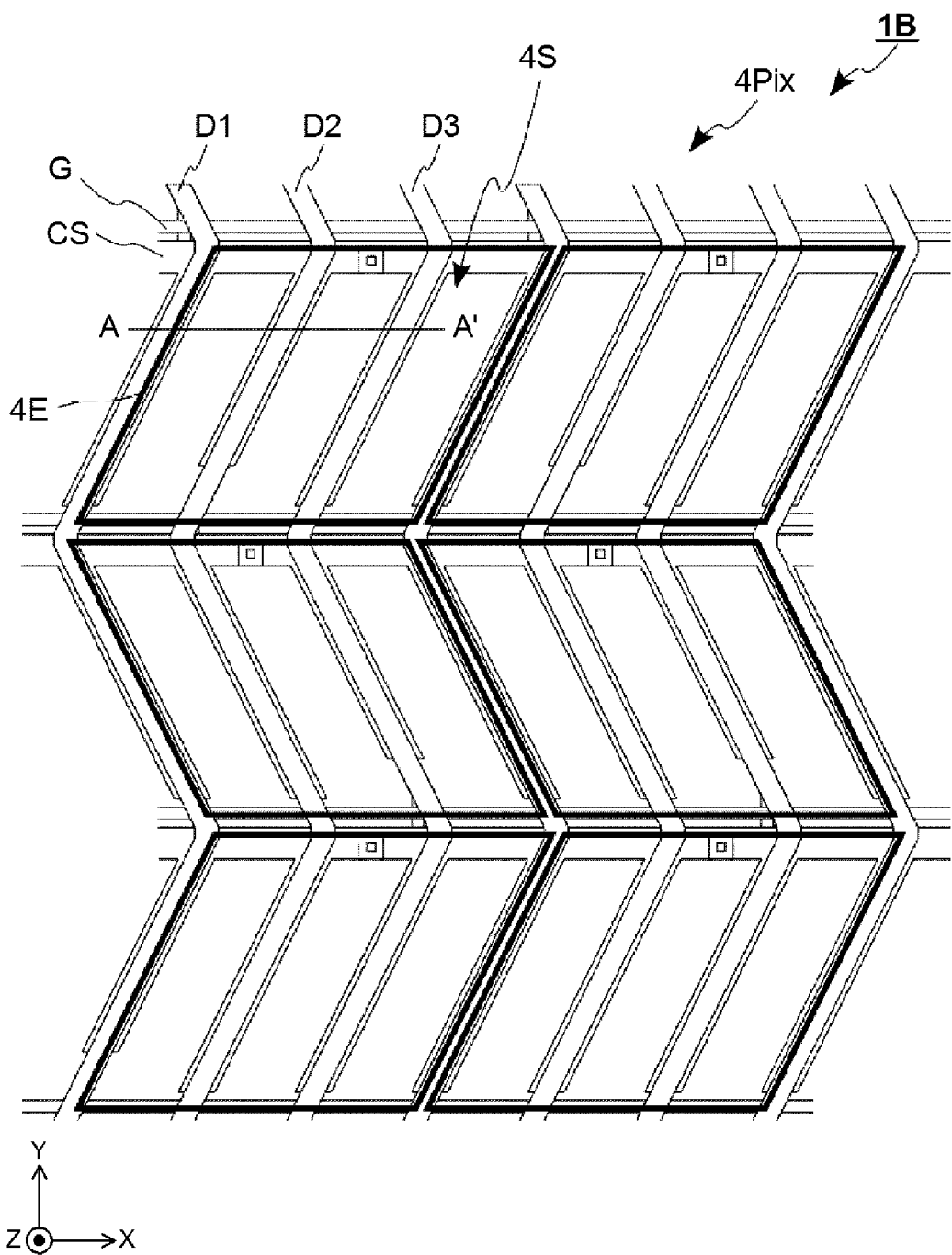
FIG. 10 A plane view showing the pixel layout of the liquid crystal display device according to Embodiment 2 of the present invention.

A liquid crystal display device 1B according to this embodiment is composed of pixels 4Pix each consisting of subpixels 4S arranged in three rows and two columns as shown in FIG. 10. Each subpixel 4S has a parallelogram opening. Among three data lines D1, D2, and D3 provided in a subpixel 4S and having the same width, the data line D1 is provided on the boarder of an adjacent subpixel 4S, and the other two data lines D2 and D3 divide the opening equally.

A storage capacitor line CS is provided for a row of subpixels 4S arranged in the X-axis direction in parallel to the gate line G. Here, the width of the data lines D, inclination of the data lines D and gate line G, and distance between the data lines D have the same relationship as described in the above Embodiment 1.

Figure 11:
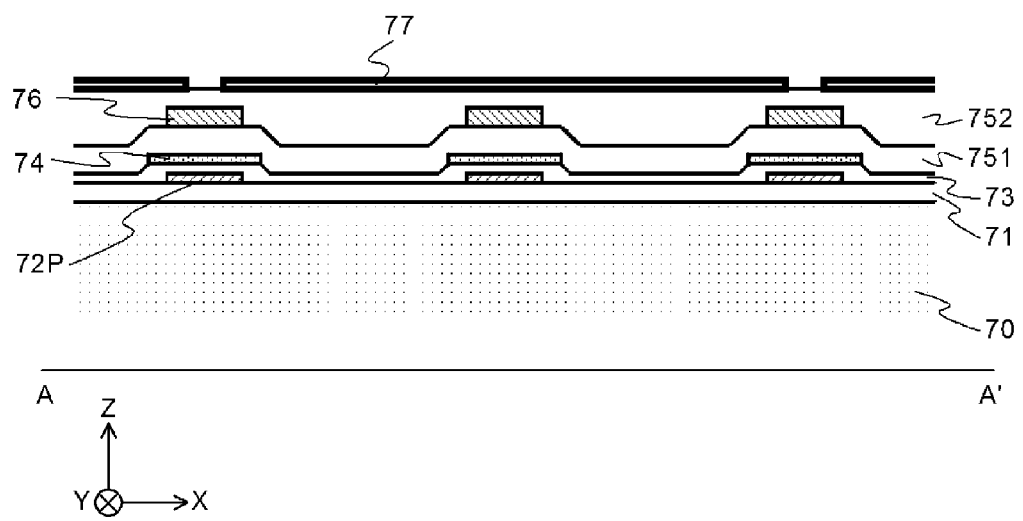
FIG. 11 A cross-sectional view showing a cross section of the pixel part of the liquid crystal display device according to Embodiment 2 of the present invention.

The liquid crystal display device 1B is produced in a P—Si (polysilicon) TFT process as shown in FIG. 11, having a laminate structure consisting of a undercoating film 71, a P—Si film 72P, a gate insulating film 73, a gate metal film 74, a first interlayer film 751, a wiring metal film 76, a second interlayer film 752, and a transparent conductive film 77 on a glass substrate 70.

A production process of the above liquid crystal display device 1B will be described hereafter. First, a undercoating film 71 is formed on a glass substrate 70 and, then, a precursor a-Si (amorphous silicon) film as a source of a P—Si film 72P is formed.

Figure 12A:
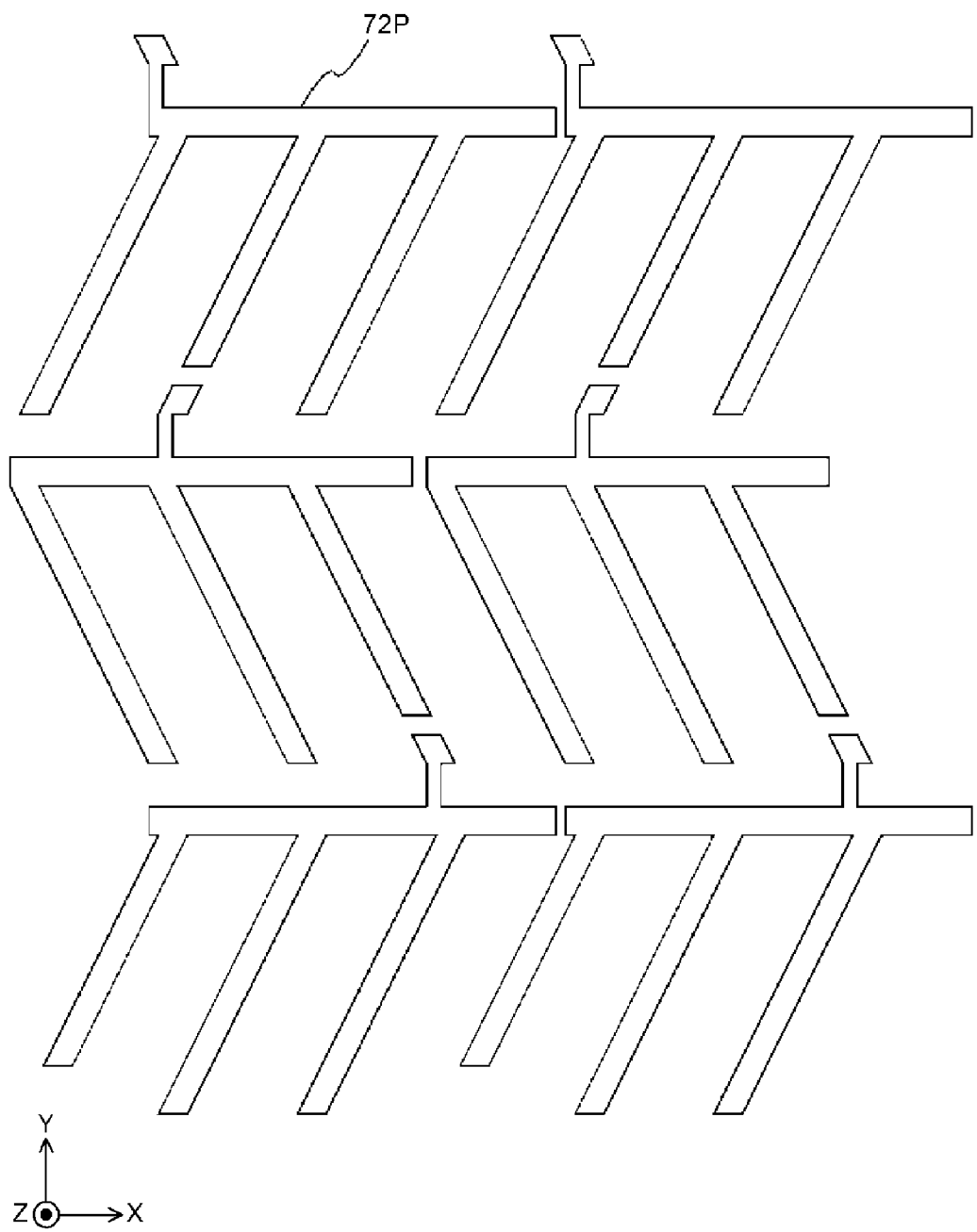
FIG. 12A A plane view showing the state after the patterning of the P—Si film is completed for explaining the production process of the liquid crystal display device according to Embodiment 2 of the present invention.

Then, the a-Si film is recrystallized by an excimer laser or the like and transformed into a P—Si film 72P, which is patterned into a form as shown in FIG. 12A.

Here, the undercoating film 71 can consist of $SiO_2$, SiN, or a laminated film of these. After the P—Si film 72P is patterned, impurities are implanted in the regions where the source and drain of pixel thin film transistors TFT and the storage capacitors Cst are formed as necessary.

Figure 12B:
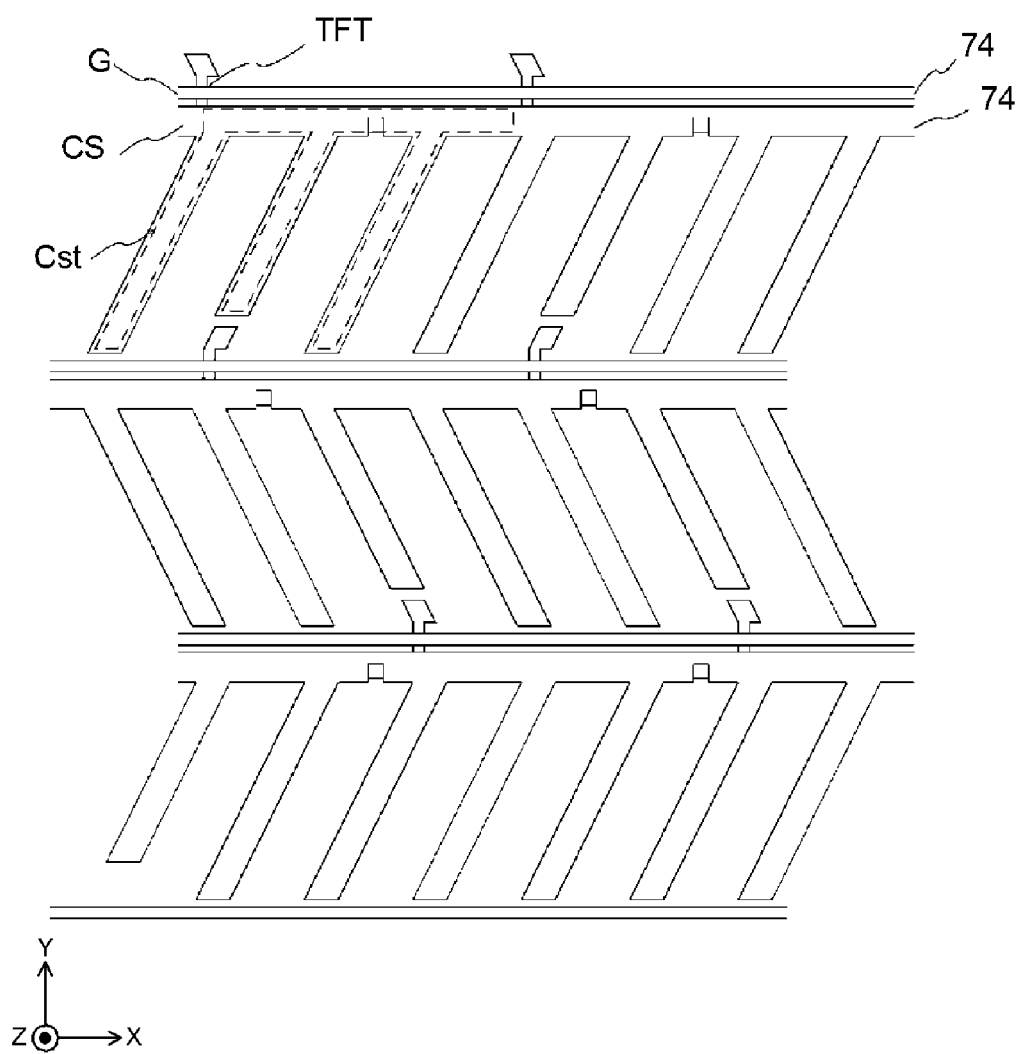
FIG. 12B A plane view showing the state after the patterning of the gate metal film is completed for explaining the production process of the liquid crystal display device according to Embodiment 2 of the present invention.

Then, a gate insulating film 73 is formed, a gate metal film 74 is layered thereon, and the gate metal film 74 is patterned as shown in FIG. 12B. The gate metal film 74 can consist of Cr, Al, WSi, or polysilicon to which an impurity is added to a high concentration. Consequently, a pixel thin film transistor TFT is formed at the intersection between the P—Si film 72P and gate line G and a storage capacitor Cst is formed in a region where the P—Si film 72P and storage capacitor line CS overlap with each other. Here, the storage capacitor Cst is formed in the region marked by the dotted lines in FIG. 12B.

Figure 12C:
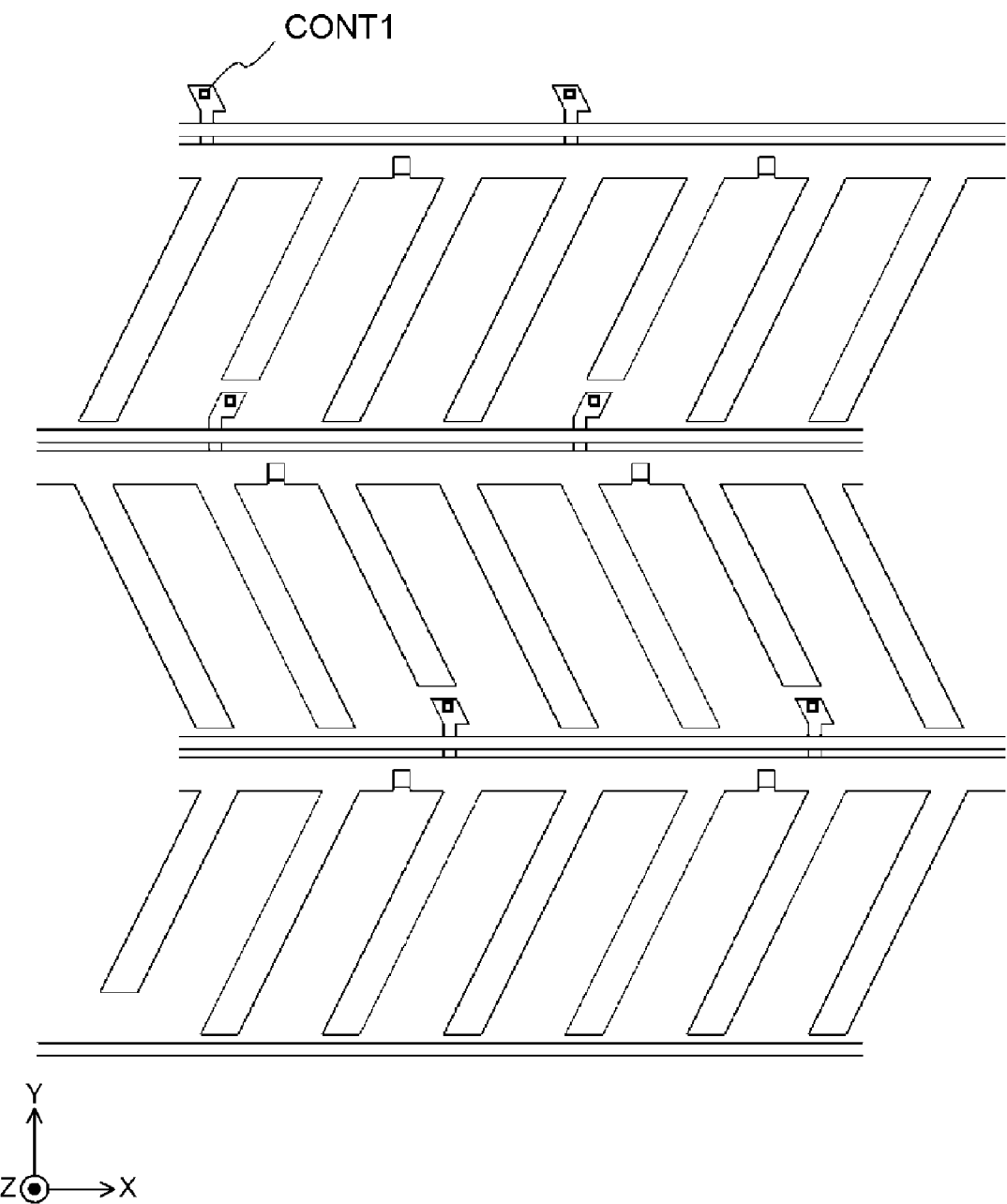
FIG. 12C A plane view showing the state after the patterning of the first contact is completed for explaining the production process of the liquid crystal display device according to Embodiment 2 of the present invention.

After a first interlayer film 751 is formed on the gate metal film 74, as shown in FIG. 12C, a first contact CONT1 is formed. The first interlayer film 751 can consist of $SiO_2$, SiN, or a laminated film of these. The first contact CONT1 runs through the first interlayer film 751 and gate insulating film 73. The first contact CONT1 electrically connects a wiring metal film 76 formed on the first interlayer film 751 and the P—Si film 72P.

Figure 12D:
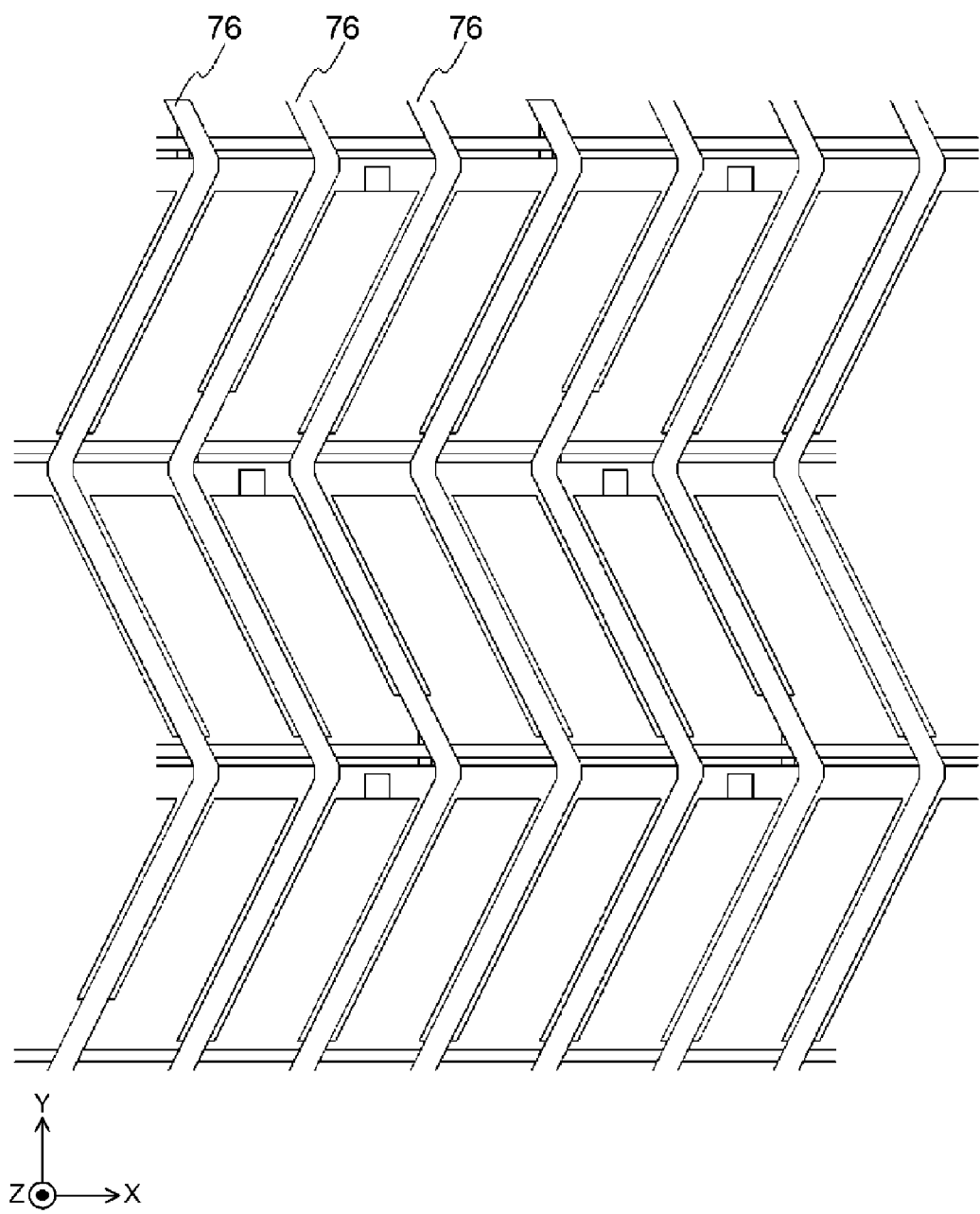
FIG. 12D A plane view showing the state after the patterning of the wiring metal film is completed for explaining the production process of the liquid crystal display device according to Embodiment 2 of the present invention.

The wiring metal film 76 is patterned as shown in FIG. 12D. The wiring metal film 76 can consist of Al, Cr, or the like. Low resistance and the ohmic property with the P—Si film 72P are taken into consideration for selection.

Figure 12E:
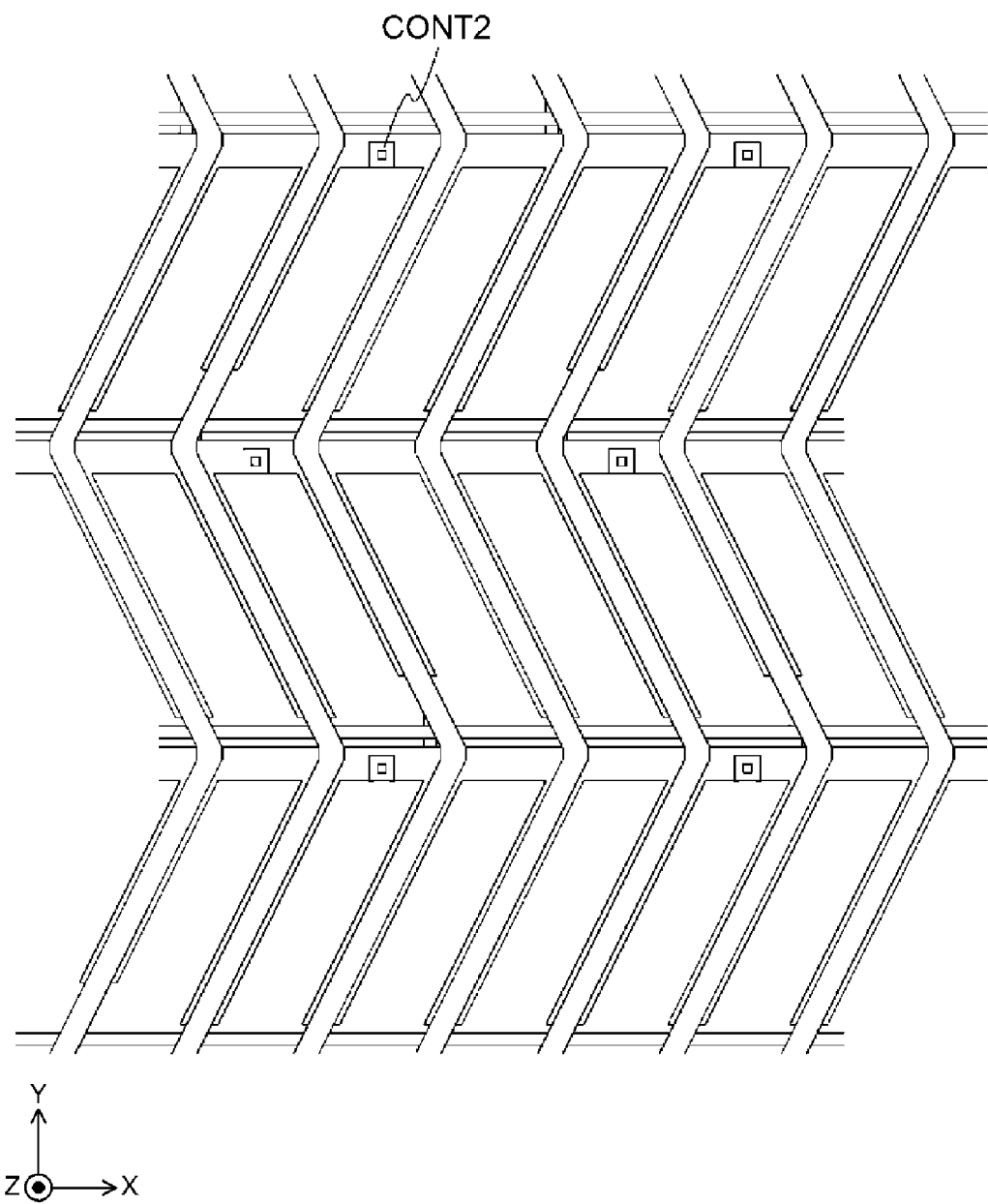
FIG. 12E A plane view showing the state after the patterning of the second contact is completed for explaining the production process of the liquid crystal display device according to Embodiment 2 of the present invention.

After a second interlayer film 752 is formed thereon, as shown in FIG. 12E, a second contact CONT2 is formed. The second contact CONT2 is a contact hole to electrically connect a transparent conductive film 77 to the P—Si film 72P. The second contact CONT2 runs through the first interlayer film 751, second interlayer film 752, and gate insulating film 73. The second interlayer film 752 can consist of $SiO_2$, SiN, a flattened organic film, or a laminated film of these. Particularly, when the second interlayer film 752 consists of a flattened organic film, the transparent conductive film 77 has a flat base and, advantageously, the orientation property of liquid crystal molecules is improved.

Figure 12F:
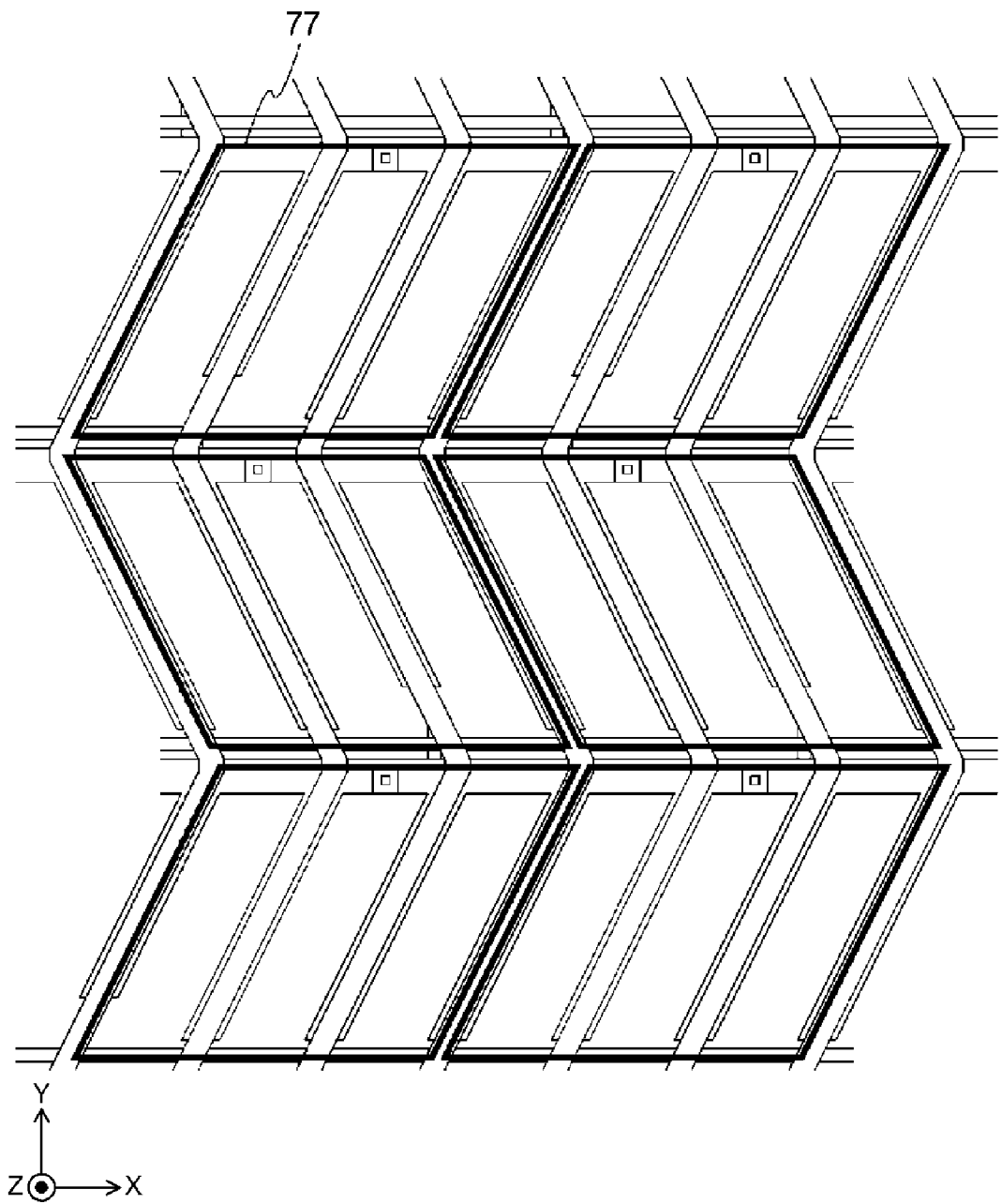
FIG. 12F A plane view showing the state after the patterning of the transparent conductive film is completed for explaining the production process of the liquid crystal display device according to Embodiment 2 of the present invention.

Finally, as shown in FIG. 12F, the transparent conductive film 77 forming a pixel electrode 4E is patterned. The transparent conductive film 77 can consist of ITO or the like.

Figure 13:
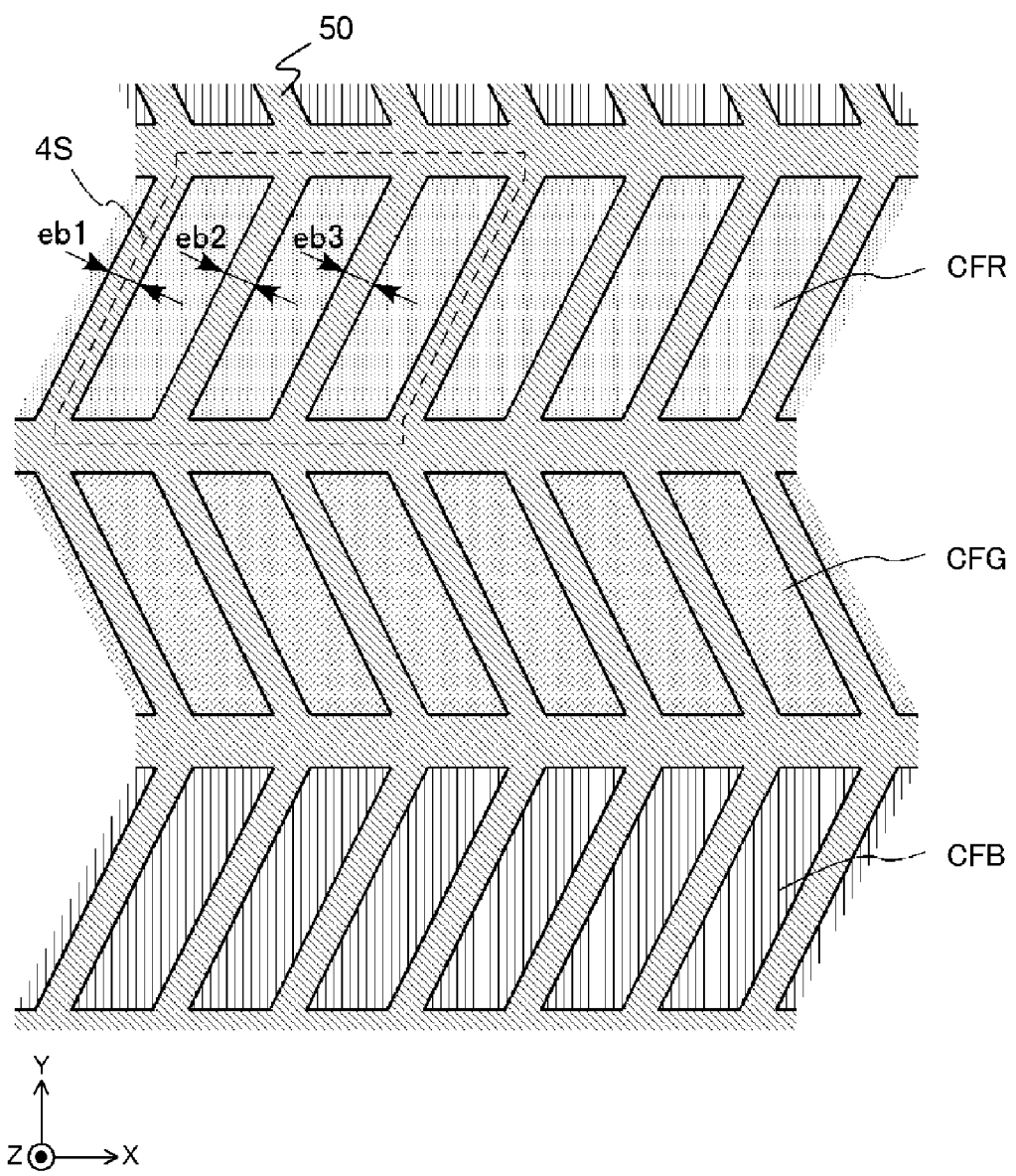
FIG. 13 A plane view showing the layout of the CF substrate of the liquid crystal display device according to Embodiment 2 of the present invention.

The liquid crystal display device 1B according to this embodiment can employ the shielding layer 50 of the CF substrate 22 having the pattern shown in FIG. 3 or a pattern shown in FIG. 13. In other words, the shielding layer 50 can be provided on the data lines D diagonally dividing the opening of a subpixel 4S. The shielding layer 50 provided on the data lines D is parallel to the data lines D and the widths eb 1 to eb3 of the shielding layer 50 are equal.

The liquid crystal display device 1B according to this embodiment is the same in other structure and operation as the above-described liquid crystal display device 1A according to Embodiment 1.

The liquid crystal display device 1B according to this embodiment can yield the same effects as in Embodiment 1, namely "making insufficient writing less likely to occur," "preventing drop in the aperture rate," "preventing occurrence of moire," "reducing the circuit size of the data driver 61 and reducing the cost."

By the way, in the prior art (see FIG. 52), as described above, the opening is reduced by a portion f equivalent to the width d of the shielding part in the Y-axis direction (the extending direction of the cylindrical lenses) that is necessary for providing a data line D in order to reduce occurrence of moire. Generally, the storage capacitor Cst is formed in that portion to prevent drop in the aperture rate.

In the liquid crystal display device 1B according to this embodiment, the storage capacitor Cst is formed under the data line D. Therefore, there is no need of adjusting the width of the opening and two data lines D diagonally dividing the opening does not cause the aperture rate to significantly drop. Therefore, the liquid crystal display device 1B according to this embodiment can prevent drop in the aperture rate and provide a sufficient storage capacitor Cst. Provision of a storage capacitor Cst of a sufficient size contributes to effects such as reduced flickers and improved contrast.

Here, the above-described production process is not confined to the above description. For example, the contact between the transparent conductive film 77 and P—Si film 72P can electrically be realized via the wiring metal film 76. Furthermore, the pixel thin film transistor TFT can have a LDD structure where necessary or a multigate structure. Furthermore, the gate metal and wiring metal can consist of a laminated film of multiple metal films. Some production processes such as hydrogenaration and activation for the purpose of improving the properties of the pixel thin film transistor TFT have no direct relation to the characteristics of the liquid crystal display device 1B according to this embodiment and therefore their explanation is omitted.

Embodiment 3

Figure 14:
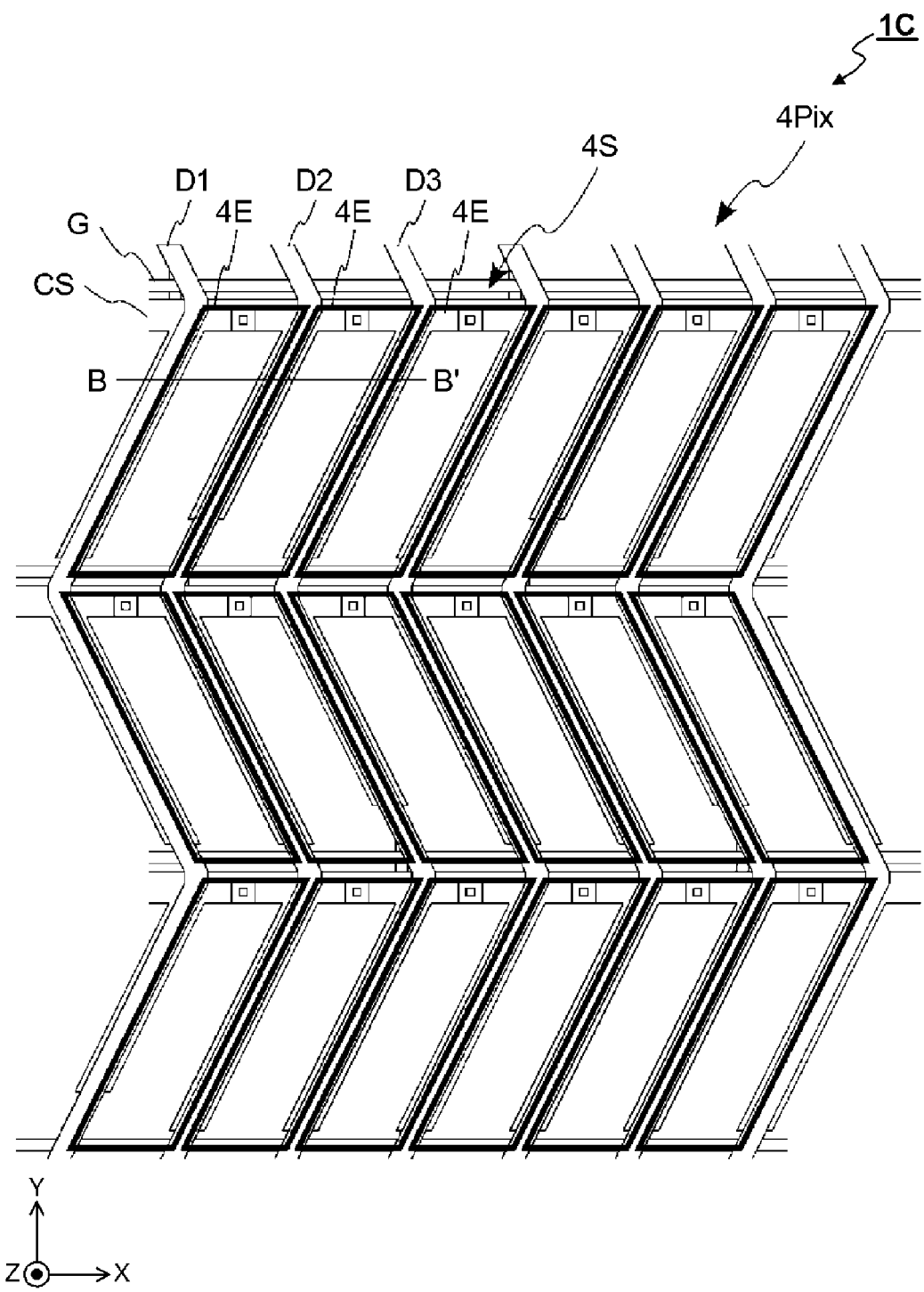
FIG. 14 A plane view showing the pixel layout of the liquid crystal display device according to Embodiment 3 of the present invention.

A liquid crystal display device 1C according to this embodiment is constructed to have multiple pixel electrodes 4E in a subpixel 4S as shown in FIG. 14. In the liquid crystal display device 1B according to Embodiment 2, the transparent conductive film 77 serving as the pixel electrode 4E is separated on the basis of a subpixel 4S. On the other hand, in the liquid crystal display device 1C according to this embodiment, the pixel electrode 4E is divided into three in a subpixel 4S.

Figure 15:
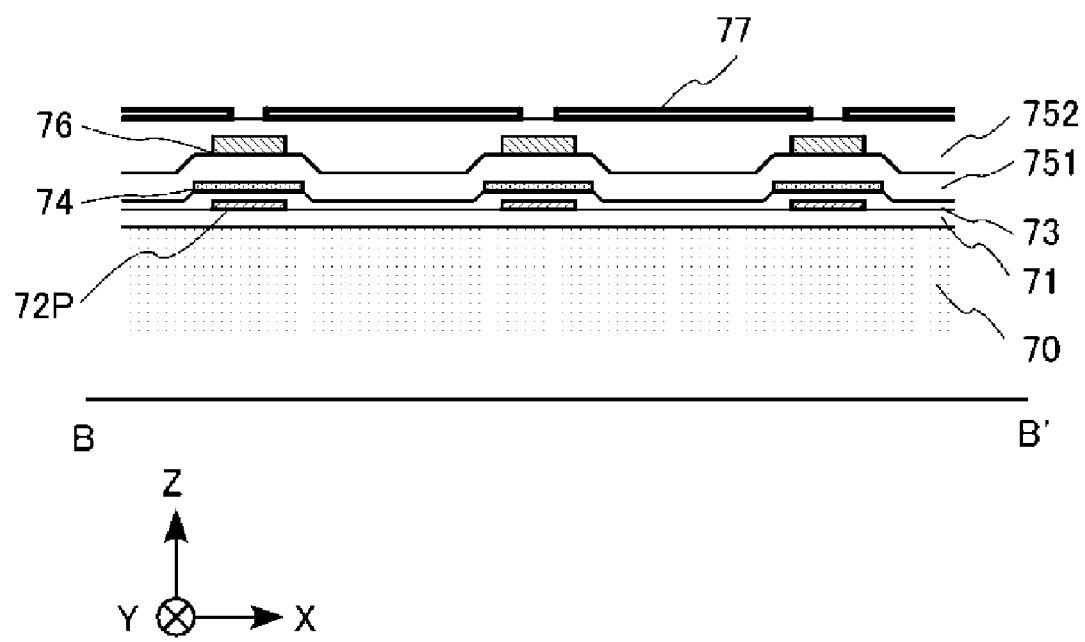
FIG. 15 A cross-sectional view showing a cross section of the pixel part of the liquid crystal display device according to Embodiment 3 of the present invention.

The transparent conductive film 77 is spaced above the data lines D in a subpixel 4S as shown FIG. 15. The divided, individual pixel electrodes 4E are each electrically connected to the P—Si film 72P via the second contact CONT2. The pixel electrodes 4E and P—Si film 72P can electrically be connected via the wiring metal film 76. The liquid crystal display device 1C can employ not only the pattern shown in FIG. 3 but also the pattern shown in FIG. 13 as the layout of the CF substrate 22.

The liquid crystal display device 1C according to this embodiment is the same in other structure and operation as the above-described liquid crystal display device 1A according to Embodiment 1.

The liquid crystal display device 1C according to this embodiment can yield the same effects as in Embodiments 1 and 2.

By the way, an image of belts in the Y-axis direction may appear due to the capacitive coupling between the data line D and the pixel electrode 4E/storage capacitor Cst. This phenomenon is generally called "vertical crosstalk." The vertical crosstalk occurs because the capacitive coupling between the data line D and the pixel electrode 4E/storage capacitor Cst causes fluctuation in the voltage retained in a pixel 4Pix according to voltage fluctuation of the data line D.

The liquid crystal display device 1C according to this embodiment has slits in the transparent electrode (the pixel electrode 4E) above the data lines D. Therefore, the capacitive coupling is reduced in value and the vertical crosstalk can be diminished.

Embodiment 4

Figure 16:
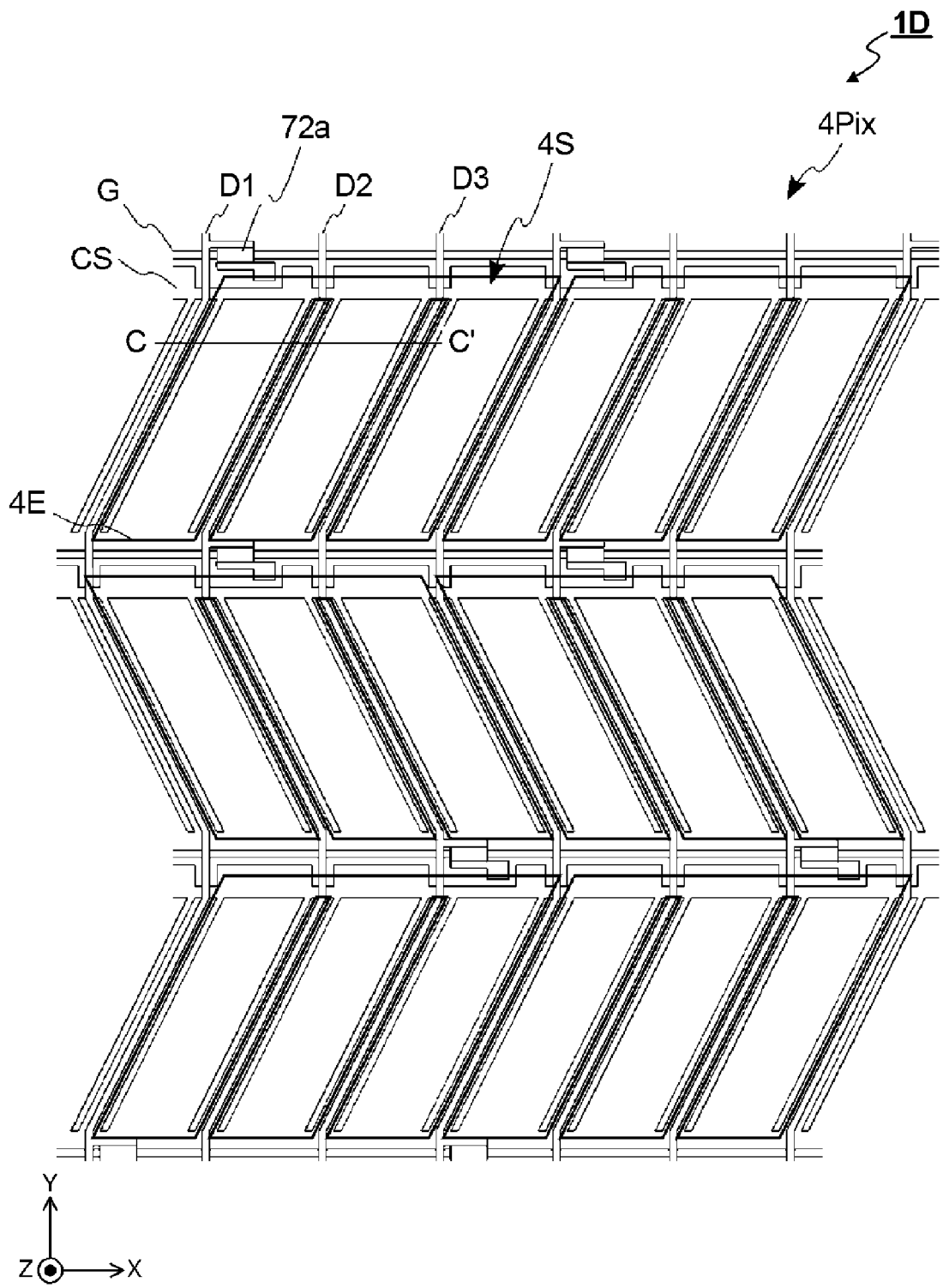
FIG. 16 A plane view showing the pixel layout of the liquid crystal display device according to Embodiment 4 of the present invention.

In a liquid crystal display device 1D according to this embodiment, each subpixel 4S has a parallelogram opening as shown in FIG. 16. Furthermore, one of three data lines D1, D2, and D3 having the same width is provided on the boarder of an adjacent subpixel 4S, and the other two data lines divide the opening equally. Here, a pixel 4Pix consists of subpixels 4S arranged in three rows and two columns. The liquid crystal display device 1D has a structure that can be produced in an a-Si-TFT process.

A storage capacitor line CS is provided for a row of subpixels 4S arranged in the X-axis direction in parallel to the gate line G. Here, the width of the data lines, inclination of the data lines D and gate line G, and distance between the data lines D have the same relationship as described in the above Embodiment 1.

The TFT substrate 21 of the liquid crystal display device 1D has a laminate structure consisting of a gate metal film 74, a gate insulating film 73, an a-Si film 72a, a wiring metal film 76, an interlayer film 75, and a transparent conductive film 77 on a glass substrate 70.

Figure 18A:
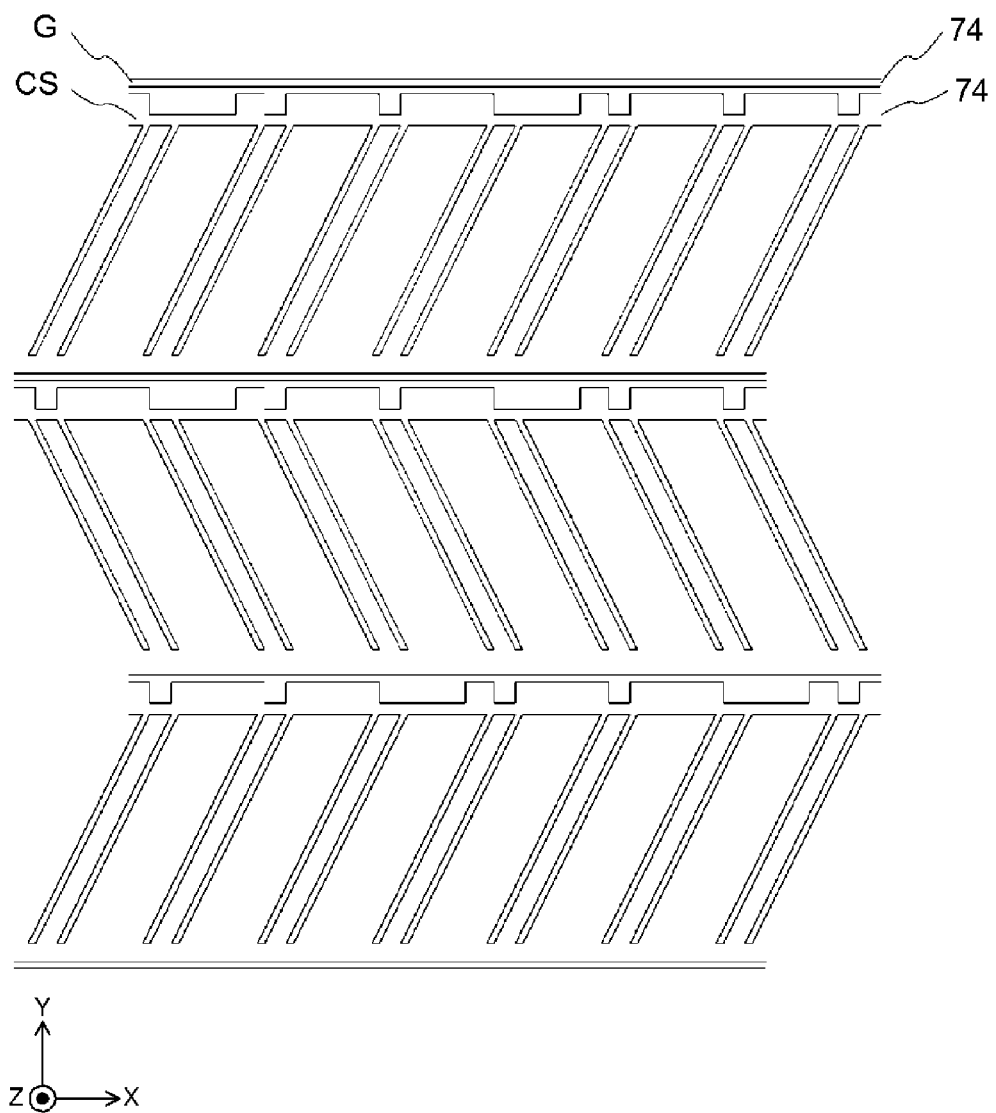
FIG. 18A A plane view showing the state after the patterning of the gate metal film is completed for explaining the production process of the liquid crystal display device according to Embodiment 4 of the present invention.

A production process of the TFT substrate 21 will be described hereafter. First, a gate metal film 74 is formed on a glass substrate 70 and, then, patterned as shown in FIG. 18A. The gate metal film 74 can consist of Cr, Al, or the like.

Figure 18B:
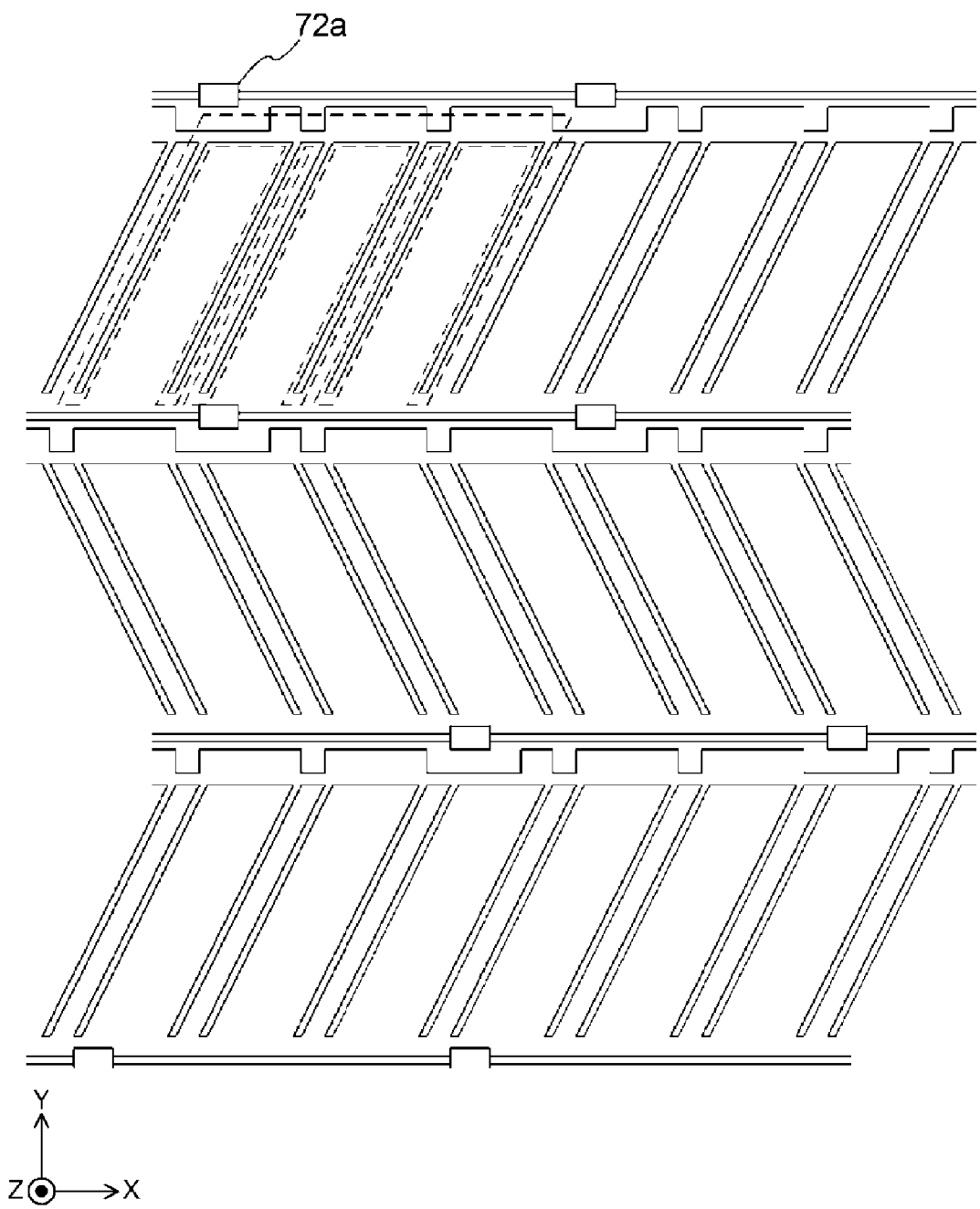
FIG. 18B A plane view showing the state after the patterning of the a-Si film is completed for explaining the production process of the liquid crystal display device according to Embodiment 4 of the present invention.

Then, a gate insulating film 73 is formed and an a-Si film 72a is formed. The gate insulating film 73 can consist of SiO$_2$, SiN, or a laminated film of these. Then, the a-Si film 72a is formed and patterned as shown in FIG. 18B. The region where the a-Si film 72a and a gate metal film 74 overlap with each other forms a pixel thin film transistor TFT. Here, the storage capacitor Cst is formed in the region marked by the dotted lines.

Figure 18C:
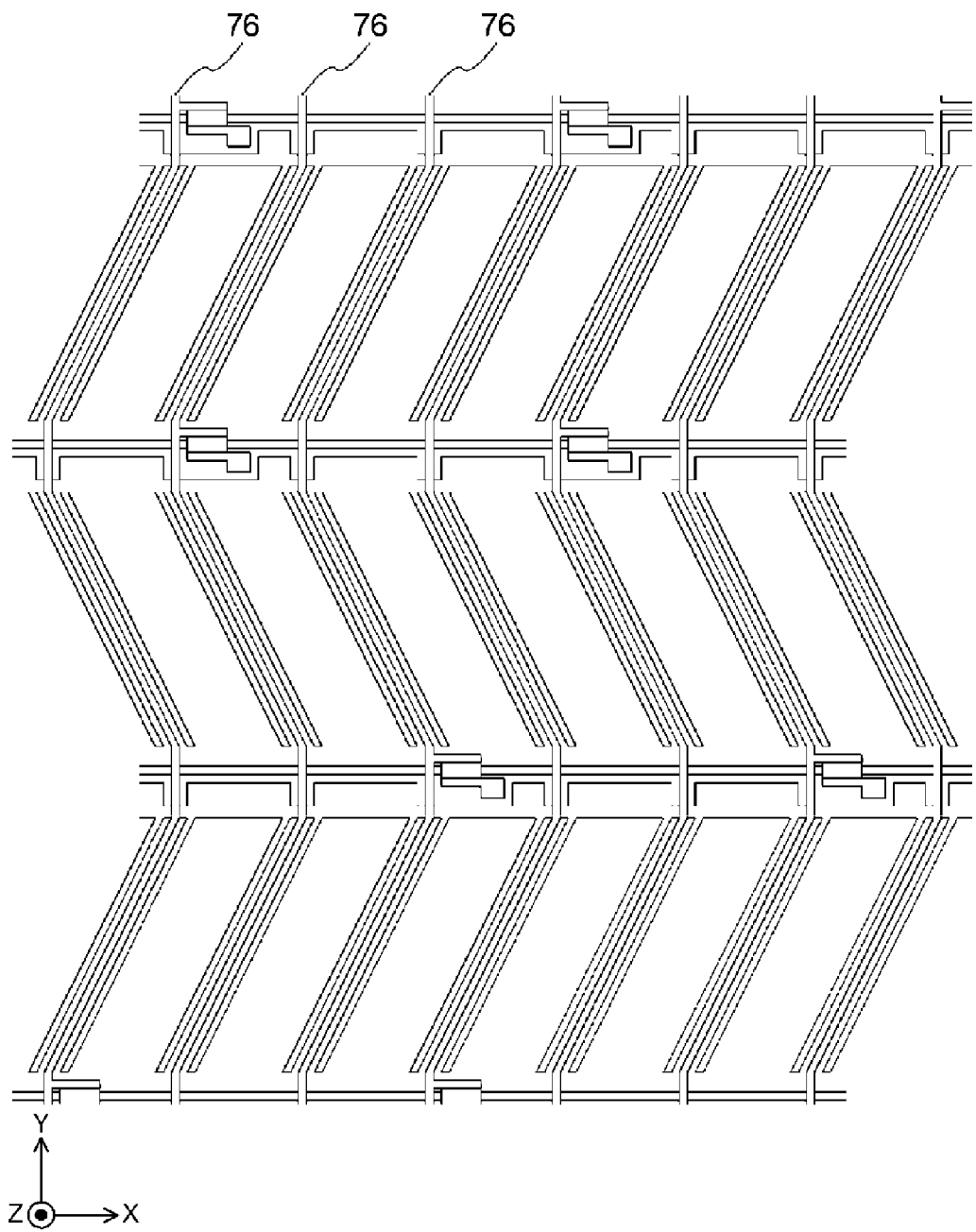
FIG. 18C A plane view showing the state after the patterning of the wiring metal film is completed for explaining the production process of the liquid crystal display device according to Embodiment 4 of the present invention.

Then, a wiring metal film 76 is formed and patterned as shown in FIG. 18C. The wiring metal film 76 can consist of Cr, Al, or the like. Furthermore, the wiring metal film 76 may be used as a mask to etch the back channel part of a pixel thin film transistor TFT in some cases.

Figure 18D:
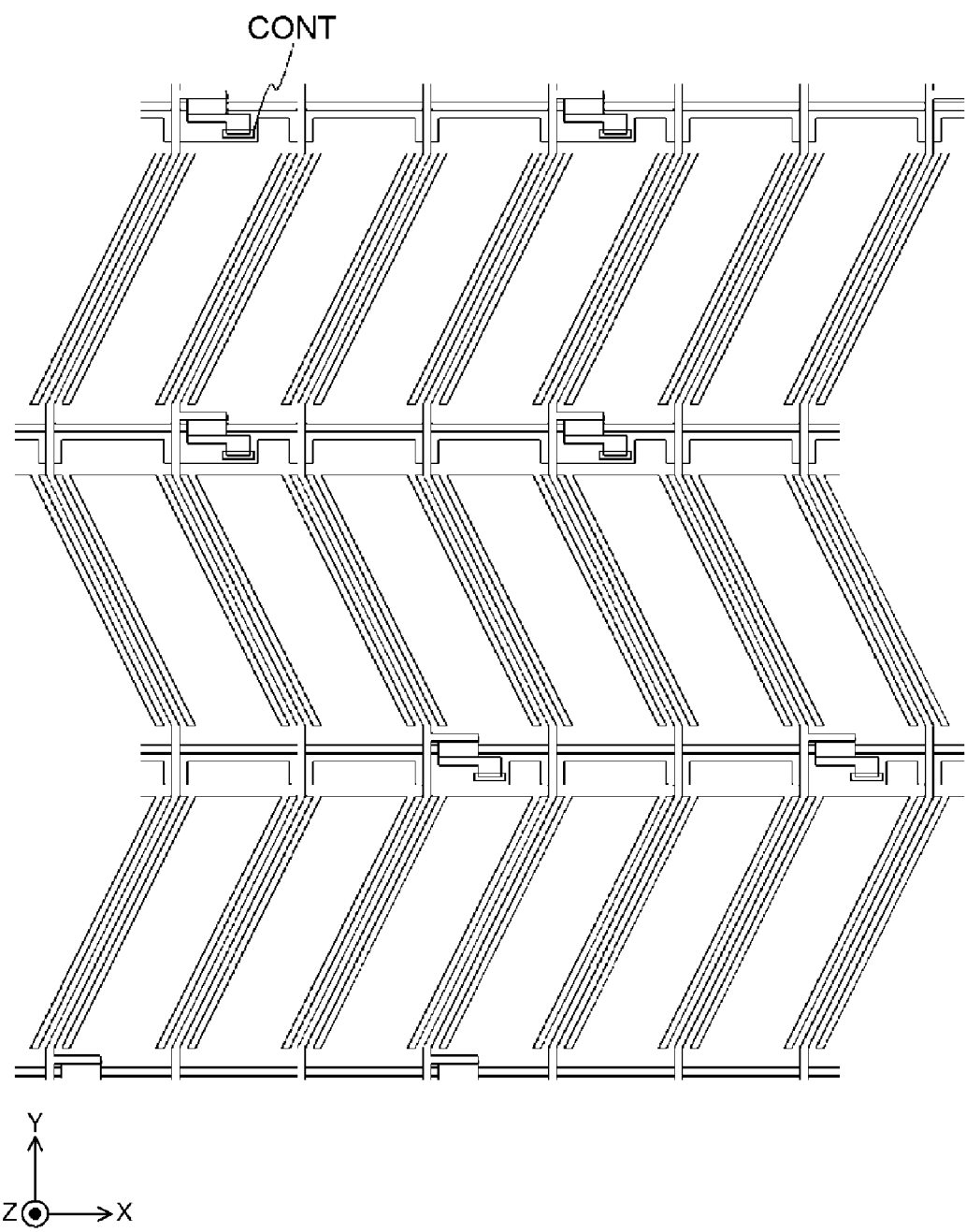
FIG. 18D A plane view showing the state after the patterning of the contact is completed for explaining the production process of the liquid crystal display device according to Embodiment 4 of the present invention.

Then, an interlayer film 75 is formed and a contact CONT is formed so as to run through the interlayer film 75 as shown in FIG. 18D. The interlayer film 75 can consist of SiO$_2$, SiN, a flattened organic film, or a laminated film of these.

Figure 17:
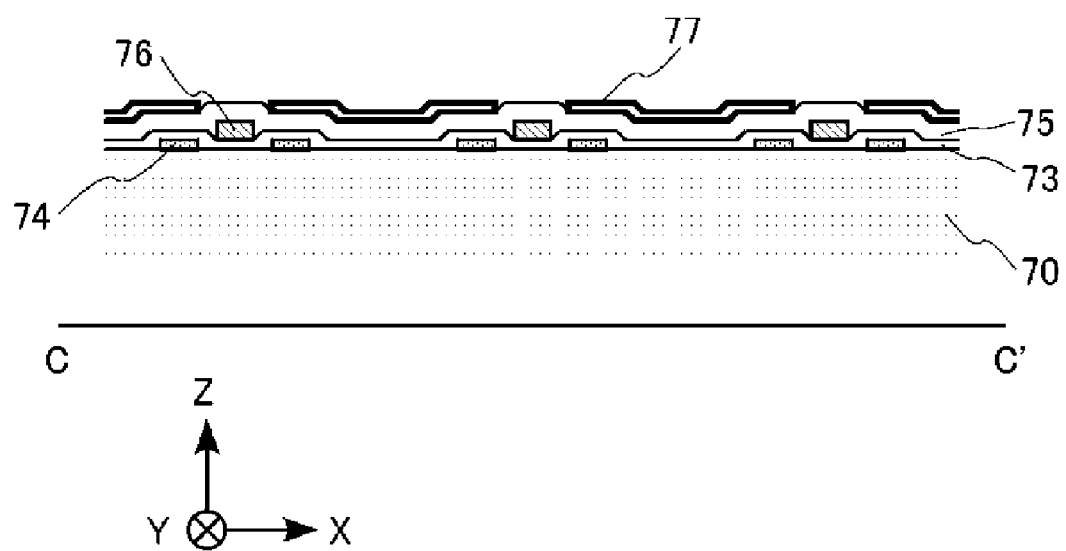
FIG. 17 A cross-sectional view showing a cross section of the pixel part of the liquid crystal display device according to Embodiment 4 of the present invention.
Figure 18E:
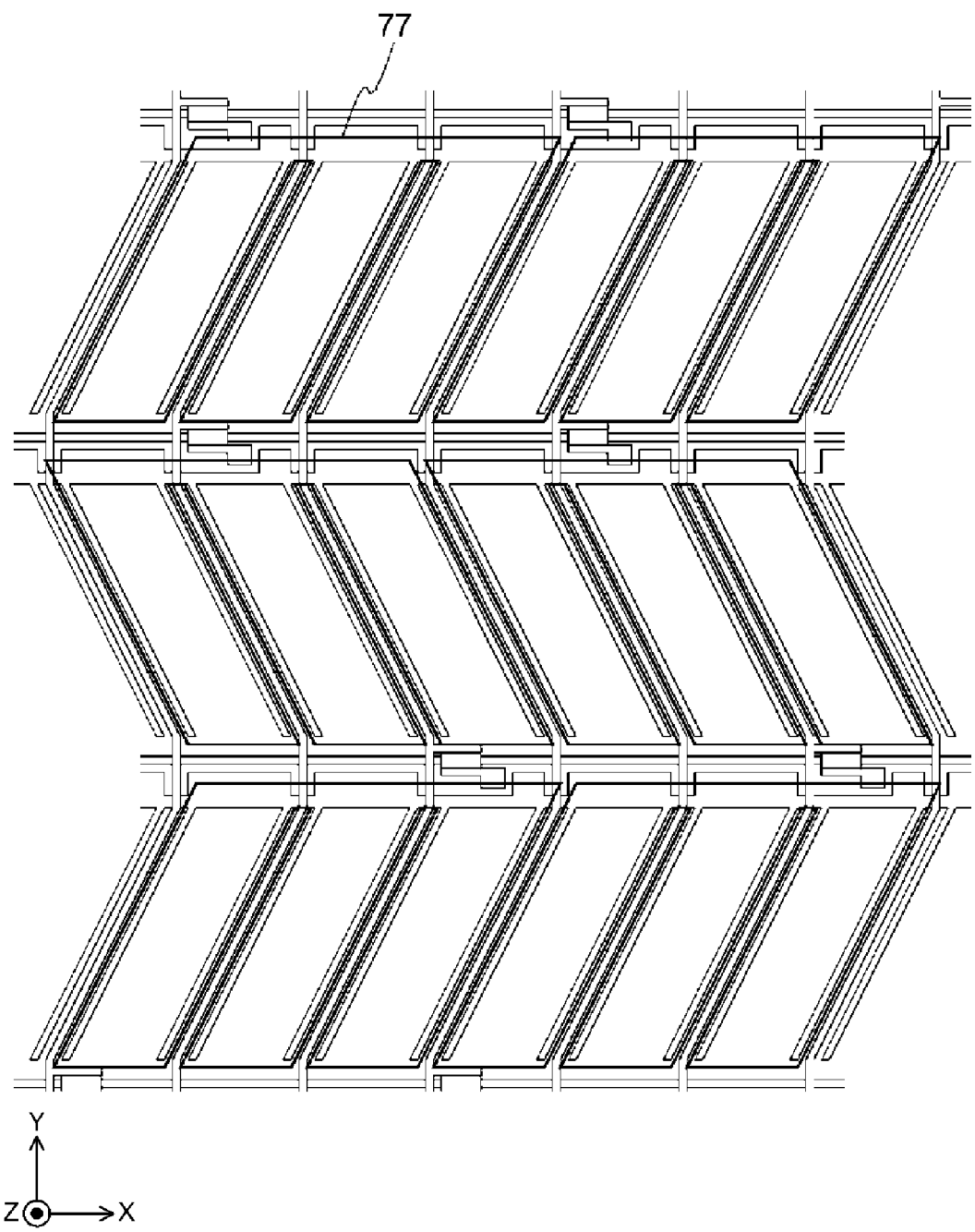
FIG. 18E A plane view showing the state after the patterning of the transparent conductive film is completed for explaining the production process of the liquid crystal display device according to Embodiment 4 of the present invention.

Finally, a transparent conductive film 77 forming a pixel electrode 4E is formed and patterned as shown in FIG. 18E. As shown in FIG. 18A, the storage capacitor line CS is branched from the portion parallel to the gate line G and extended in parallel to the data line D. Furthermore, as shown in FIGS. 17 and 18E, the transparent conductive film 77 or pixel electrode 4E has slits near the data lines D so as to overlap with the wiring metal film 76 or data lines D in a smaller area.

Figure 19:
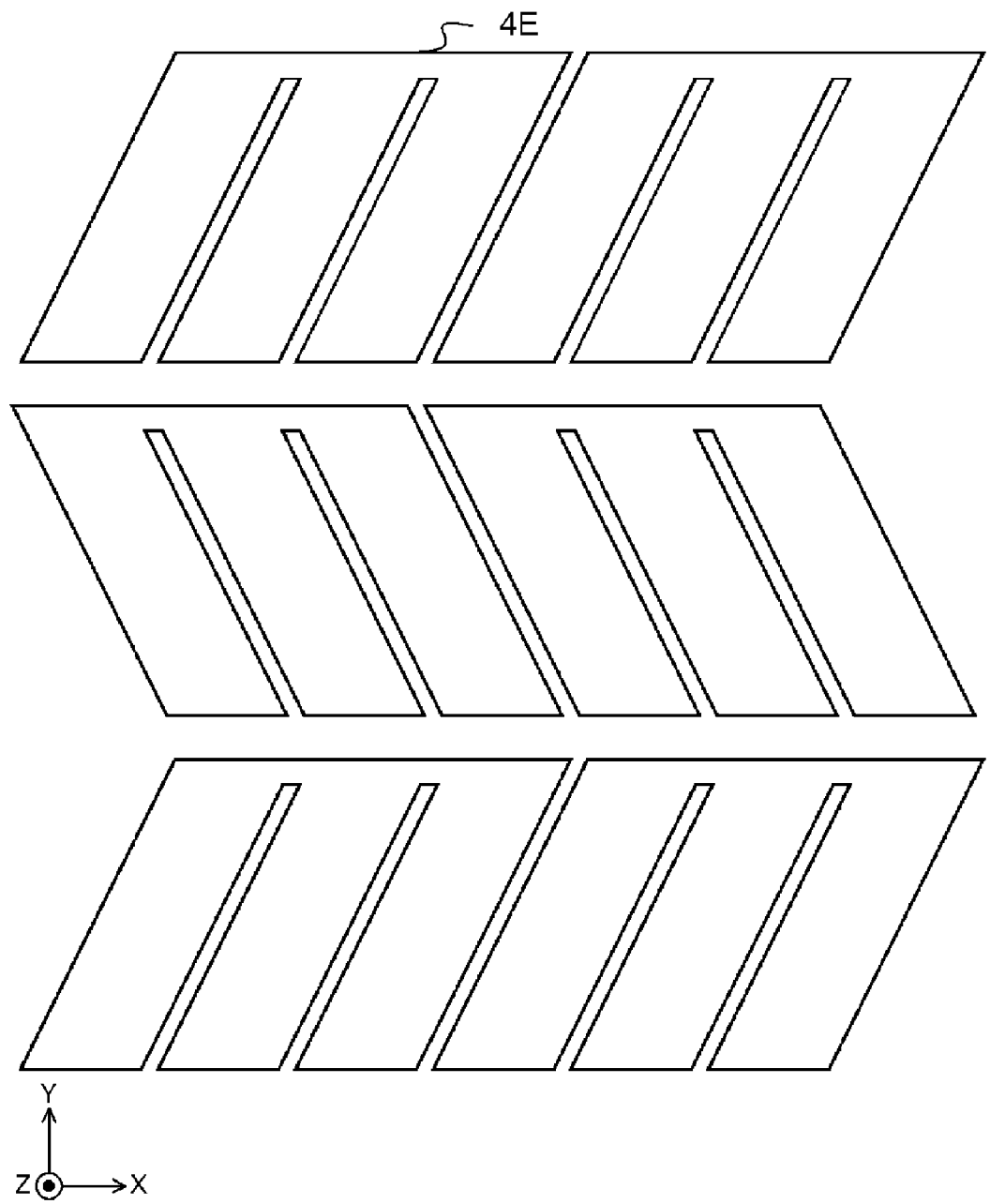
FIG. 19 A plane view showing the layout of the transparent conductive film that is the pixel electrode of the liquid crystal display device according to Embodiment 4 of the present invention.

Then, with the above slits being formed, the transparent conductive film 77 or pixel electrode 4E has a contour with cutouts as shown in FIG. 19. The storage capacitor Cst constituting a subpixel 4S is formed by the part where the pixel electrode 4E and the gate metal or storage capacitor line overlap with each other as shown in FIG. 18B. In this embodiment, the storage capacitor Cst is adjacent to the data line D; therefore, large capacitance can be assured. Here, the pattern shown in FIG. 13 can be used as the layout of the CF substrate 22.

The production process is not confined to the above described one. What is important is that in what manner multiple data lines provided for a column of subpixels 4S divide the opening of a subpixel 4S. The production process can be modified as long as the manner is realized.

The liquid crystal display device 1D according to this embodiment is the same in other structure and operation as the above-described liquid crystal display device 1A according to Embodiment 1.

The liquid crystal display device 1D according to this embodiment can yield the same effects as in Embodiments 1 to 3.

The liquid crystal display device 1D according to this embodiment can be produced in an a-Si-TFT process. An a-Si-TFT process requires approximately five exposure processes while a P—Si-TFT process requires approximately 7 to 12 exposure processes. The production cost depends on the process length. Therefore, the liquid crystal display device 1D according to this embodiment that can be produced in an a-Si-TFT process can be produced at low cost compared with the one produced in a P—Si-TFT process.

Furthermore, in the liquid crystal display device 1D, the transparent conductive film 77 or pixel electrode 4E and the date line D overlap with each other in a smaller area. The magnitude of capacitive coupling between the pixel electrode 4E and data line D depends on vertical crosstalk. The vertical crosstalk is diminished as the capacitive coupling is reduced. Therefore, the liquid crystal display device 1D according to this embodiment can reduce vertical crosstalk at low cost.

Embodiment 5

Figure 20A:
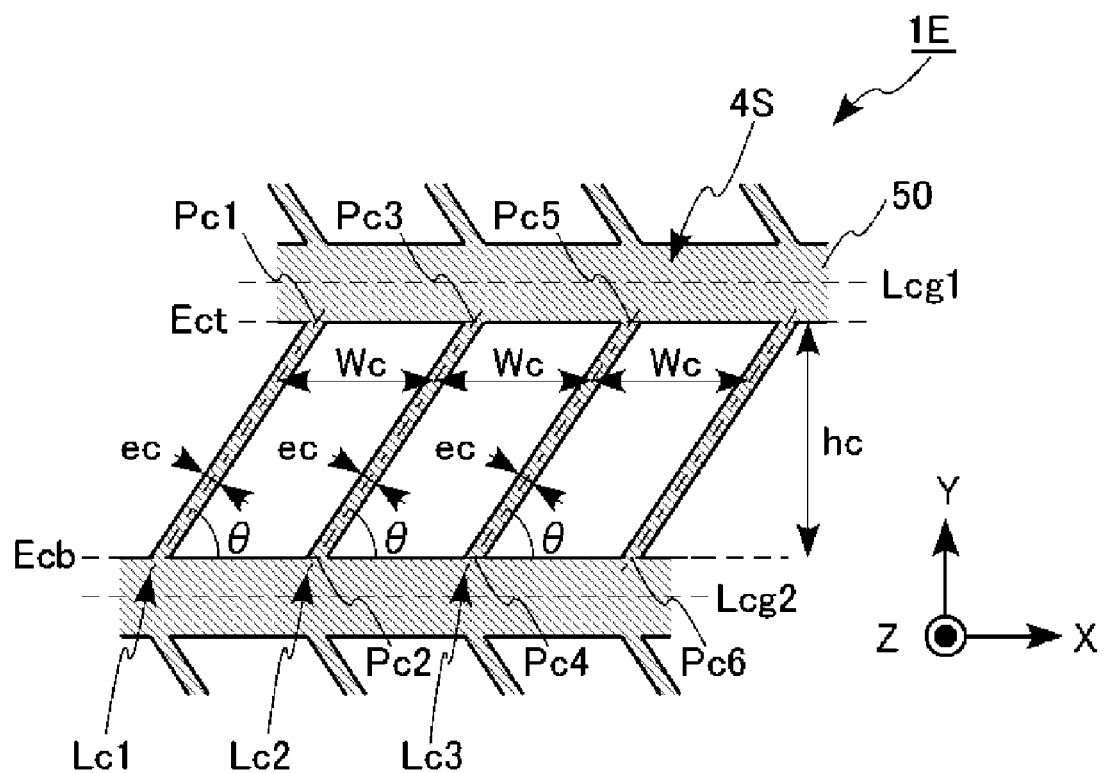
FIG. 20A A plane view showing the layout of the shielding layer of the CF substrate for showing the layout of a subpixel of the liquid crystal display device according to Embodiment 5 of the present invention.
Figure 20B:
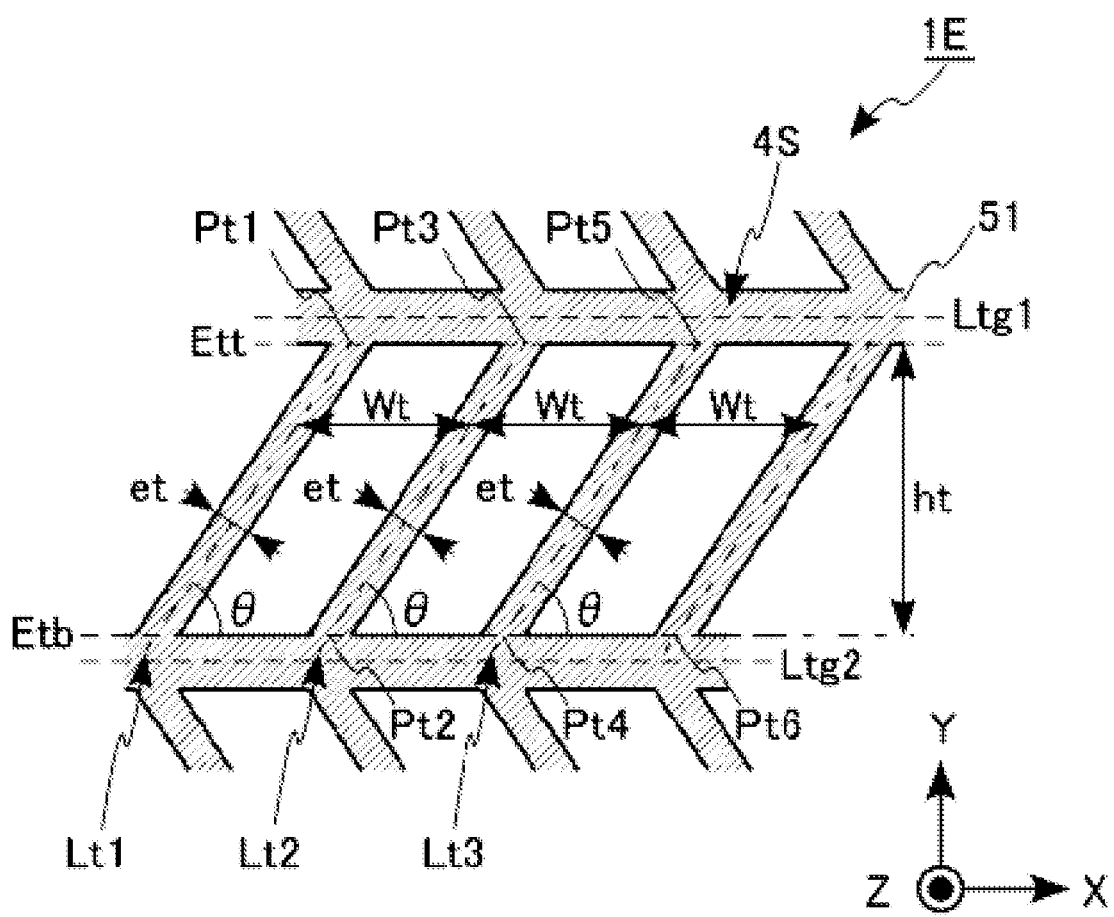
FIG. 20B A plane view showing the layout of the shielding element of the TFT substrate for showing the layout of a subpixel of the liquid crystal display device according to Embodiment 5 of the present invention.

A liquid crystal display device 1E according to this embodiment is constructed with the shielding layer 50 of the CF substrate 22 having the layout as shown in FIG. 20A and with the shielding element 51 of the TFT substrate 21 having the layout as shown in FIG. 20B. Here, the shielding element 51 is a shielding portion consisting of a laminate of films constituting the TFT substrate 21 and transmitting almost no light. The films transmitting almost no light correspond to the P—Si film 72P, gate metal film 74, and wiring metal film 76 in the production process presented in Embodiment 2. Furthermore, the liquid crystal display device 1E can employ the circuit shown in FIG. 2 as the liquid crystal panel circuit configuration.

As shown in FIG. 20A, the shielding layer 50 of the CF substrate 22 has three openings in a subpixel 4S. The openings are zoned by two parallel lines Ect and Ecb defining the upper side (the side on the +Y side) and lower side (the side on the −Y side) of the openings and a pattern of the shielding layer 50 intersecting with the lines Ect and Ecb at an angle θ and having a width ec.

The center lines of the shielding layer 50 having an angle θ with respect to the lines Ect and Ecb are referred to by Lc1 to Lc3; the distances between adjacent center lines are equally Wc. The distance between the lines Ect and Ecb is hc. Among the intersections between the center lines Lc1 to Lc3 and the lines Ect and Ecb, the intersections Pc1 and Pc2 have the same X-coordinate. The intersections Pc3 and Pc4 and intersections Pc5 and Pc6 have the same X-coordinate, respectively.

On the other hand, as shown in FIG. 20B, the shielding element 51 of the TFT substrate 21 has three openings in a subpixel 4S. The openings are zoned by two parallel lines Ett and Etb defining the upper side (the side on the +Y side) and lower side (the side on the −Y side) of the openings and a pattern of the shielding element 51 intersecting with the lines Ett and Etb at an angle θ and having a width et. The center lines of the shielding element 51 having an angle θ with respect to the lines Ett and Etb are referred to by Lt1 to Lt3; the distances between adjacent center lines are equally Wt. The distance between the lines Ett and Etb is ht. Among the intersections between the center lines Lt1 to Lt3 and the lines Ett and Etb, the intersections Pt1 and Pt2 have the same X-coordinate. The intersections Pt3 and Pt4 and intersections Pt5 and Pt6 have the same X-coordinate, respectively.

Here, the width et is larger than the width ec by dp. The width Wc is equal to the width Wt. Furthermore, the difference between ht and hc is twice dl ($2dl$). The dp is set to a value greater than twice de, which is processing accuracy in the production process of the TFT substrate 21 or CF substrate 22. The dl is set in accordance with the accuracy of superimposing the TFT substrate 21 and CF substrate 22 in the production process of the liquid crystal panel 2 and set to a value greater than the superimposing accuracy in the Y-axis direction.

The liquid crystal display device 1E according to this embodiment is the same in other structure and operation as the above-described liquid crystal display device 1A according to Embodiment 1.

The liquid crystal display device 1E according to this embodiment can yield the same effects as in Embodiments 1 to 4.

Figure 21A:
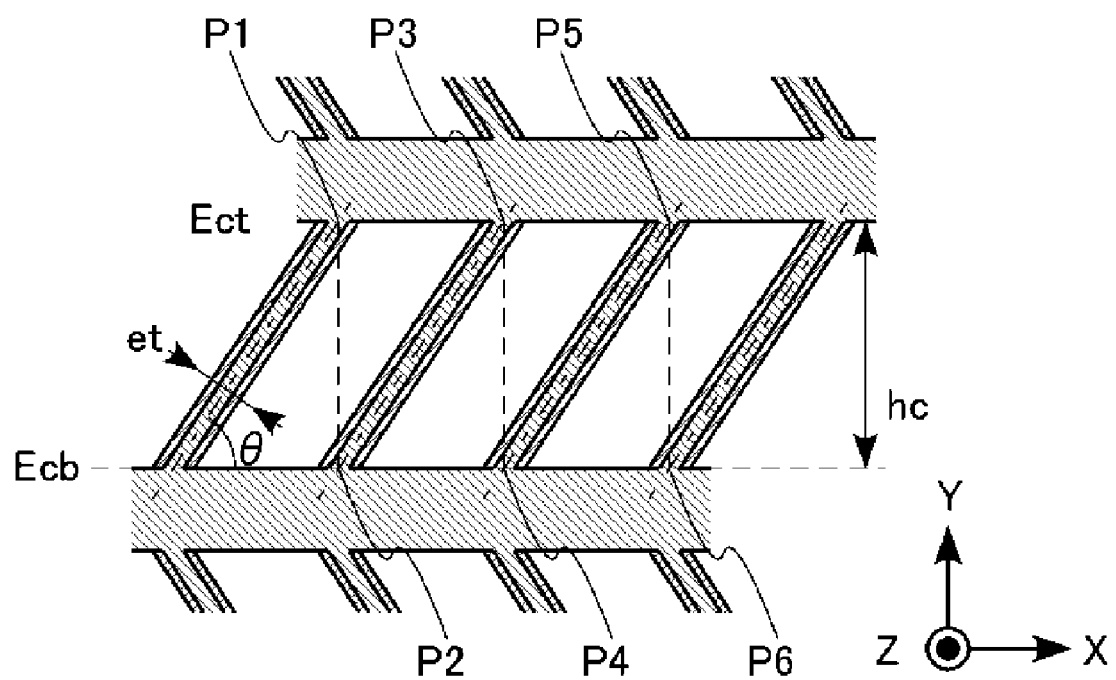
FIG. 21A A plane view showing the layout of a subpixel of the liquid crystal display device according to Embodiment 5 of the present invention when the CF substrate and TFT substrate are in alignment.

A subpixel 4S has the layout as shown in FIG. 21A when the above TFT substrate 21 and CF substrate 22 are superimposed in alignment. Here, the expression "in alignment" refers to the state in which the center lines Lcg1 and Lcg2 of the shielding layer 50 of the CF substrate 22 parallel to the lines Etc and Ecb are aligned with the center lines Ltg1 and Ltg2 of the shielding element 51 of the TFT substrate 21 parallel to the lines Ett and Etb, and the Lc1 to Lc3 of the CF substrate 22 are aligned with the Lt1 to Lt3 of the TFT substrate 21, respectively. In the case of FIG. 21A, the distance ht between the lines defining the upper and lower sides of the opening of the TFT substrate 21 is larger than the distance hc between the lines defining the upper and lower sides of the opening of the CF substrate 22. Therefore, the distance between the lines defining the upper and lower sides of the opening is hc after the two substrates are superimposed.

Here, the width of the opening in the Y-axis direction in a cross section of the opening at a line parallel to the Y-axis is discussed. As described in Embodiment 1, the width of the opening in the Y-axis direction is hc−et/cos θ at any line parallel to the Y-axis. Therefore, the ratio between the width of the opening and the width of the shielding part in the Y-axis direction in a subpixel 4S is constant regardless of the position in the X-axis direction (the extending direction of the gate line G).

Figure 21B:
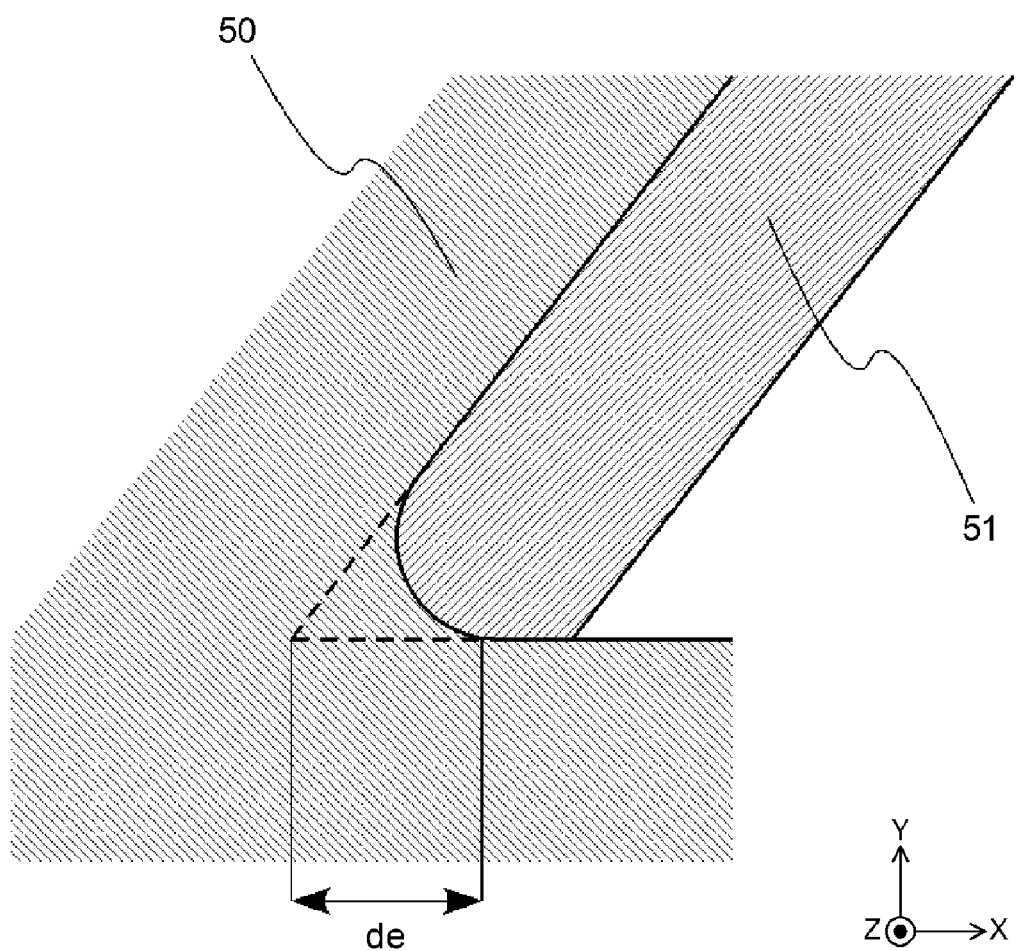
FIG. 21B An enlarged view of a corner of the opening of a subpixel of the liquid crystal display device according to Embodiment 5 of the present invention.

Here, attention is paid to the acute angle corners of the opening (the corners having an angle θ). The corners having an angle θ actually have a structure as shown in FIG. 21B. As shown by the dotted lines, the shielding layer 50 of the CF substrate 22 is designed to have an acute angle; however, an error de occurs because of processing accuracy. The opening of a subpixel 4S is defined by the shielding layer 50 of the CF substrate 22 and the shielding element 51 of the TFT substrate 21. In the liquid crystal display device 1E according to this embodiment, the shielding layer 50 of the CF substrate 22 has a width smaller than the shielding element 51 of the TFT substrate 21 by twice de or more. Therefore, the corners of the opening are formed by the crossover of the shielding layer 50 of the CF substrate 22 and the shielding element 51 of the TFT substrate 21.

Therefore, in the liquid crystal display device 1E according to this embodiment, even if an error occurs in accordance with processing accuracy of the pattern of the shielding layer 50, the shape of the opening is not affected. Then, the ratio between the opening and the shielding part in the Y-axis direction can be constant regardless of the position in the X-axis direction. Consequently, the liquid crystal display device 1E can reduce moire even if the actual pattern deviates from the designed measurement under the influence of processing accuracy of the TFT substrate 21 or CF substrate 22.

Furthermore, moire can be reduced even if the TFT substrate 21 and CF substrate 22 are out of alignment.

In the above case, the shielding entity defining the corners of the opening consists of the shielding layer 50 of the CF substrate 22 and shielding element 51 of the TFT substrate 21. The shielding entity is not restricted thereto and can simply consist of multiple shielding entities of the TFT substrate 21. More specifically, the gate metal film 74 and wiring metal film 76 can be used.

The case in which the CF substrate 22 and TFT substrate 21 are out of alignment only in the X-axis direction will be discussed hereafter. When the CF substrate 22 is shifted with respect to the TFT substrate 21 in the −X direction, the resulting layout is as shown FIG. 22. Because the CF substrate 22 is shifted in the −X direction, the areas where the diagonal shielding layer 50 and shielding element 51 shield light are increased, having a width e. The center lines of such areas are referred to by L1 to L3. The intersection P1 between the center line L1 and line Ect and the intersection P2 between the center line L2 and line Ecb have the same X-coordinate. Similarly, the intersections P3 and P4 and intersections P5 and P6 have the same X-coordinate, respectively.

The center lines L1 to L3 are parallel to each other and parallel to the lines Lc1 to Lc3 and Lt1 to Lt3. The width of the opening in the Y-axis direction after the superimposition is hc. Here, the following relationship is obtained in which L is the length of the center lines L1 to L3 between the lines Ect and Ecb:

$$L \times \cos \theta = Wc = Wt \qquad \text{[Math 8]}$$

$$L \times \sin \theta = hc \qquad \text{[Math 9]}$$

Therefore, as in the case of superimposition in alignment, the width of the opening in the Y-axis direction in a cross section of the opening at a line parallel to the Y-axis is constant, hc−e/cos θ, regardless of the position in the X-axis direction; no moire occurs.

Next, the case in which the CF substrate 22 and TFT substrate 21 are out of alignment only in the Y-axis direction will be discussed. When the CF substrate 22 is shifted with respect to the TFT substrate 21 in the +Y direction by a length dy, the resulting subpixel layout is as shown FIG. 23. Here, it is assumed that dy is smaller than dl. Here, the distance hc between the lines defining the upper and lower sides of the opening of the CF substrate 22 is smaller than the distance ht between the lines defining the upper and lower sides of the opening of the TFT substrate 21 by a length 2dl. Therefore, if dy is smaller than dl, the distance between the lines defining the upper and lower sides of the opening after the superimposition is constant, hc.

On the other hand, the width of the areas where the diagonal shielding layer 50 and shielding element 51 shield light is increased as the CF substrate 22 is shifted with respect to the TFT substrate 21 in the Y-axis direction. The increment in width is assumed to be e. Furthermore, the center lines of the diagonal, light-shielding areas are referred to by L1 to L3. The intersection P1 between the center line L1 and line Ect and the intersection P2 between the center line L2 and line Ecb have the same X-coordinate. Similarly, the intersections P3 and P4 and intersections P5 and P6 have the same X-coordinate, respectively.

The center lines L1 to L3 are parallel to each other and parallel to the lines Lc1 to Lc3 and Lt1 to Lt3. The distance between the lines defining the upper and lower sides of the opening after the superimposition is hc. Here, the above mathematical equations 7 and 8 are satisfied in which L is the length of the center lines L1 to L3 between the lines Ect and Ecb. Therefore, as in the case of superimposition in alignment, the width of the opening in the Y-axis direction in a cross section of the opening at a line parallel to the Y-axis is constant, hc−e/cos θ, regardless of the position in the X-axis direction; no moire occurs.

The cases in which the CF substrate 22 and TFT substrate 21 are out of alignment only in the X-axis direction or in the Y-axis direction are discussed above. The above effect can be obtained in the case in which the CF substrate 22 and TFT substrate 21 are out of alignment both in the X-axis direction and in the Y-axis direction. However, if rotational misalignment about the Z-axis occurs, the width of the opening in the Y-axis direction varies depending on the position in the X-axis direction. Then, moire cannot completely be eliminated. However, the CF substrate 22 and TFT substrate 21 are superimposed with an alignment error of up to several μm both in the X-axis direction and in the Y-axis direction in the production process of the liquid crystal panel 2. Therefore, rotational misalignment can be ignored. For example, if the display area is 10 inches in diagonal (150 mm high, 200 mm wide) and the alignment error is 5 μm, the rotation angle due to this misalignment is approximately 0.0014 degrees; its influence can be ignored.

Figure 22:
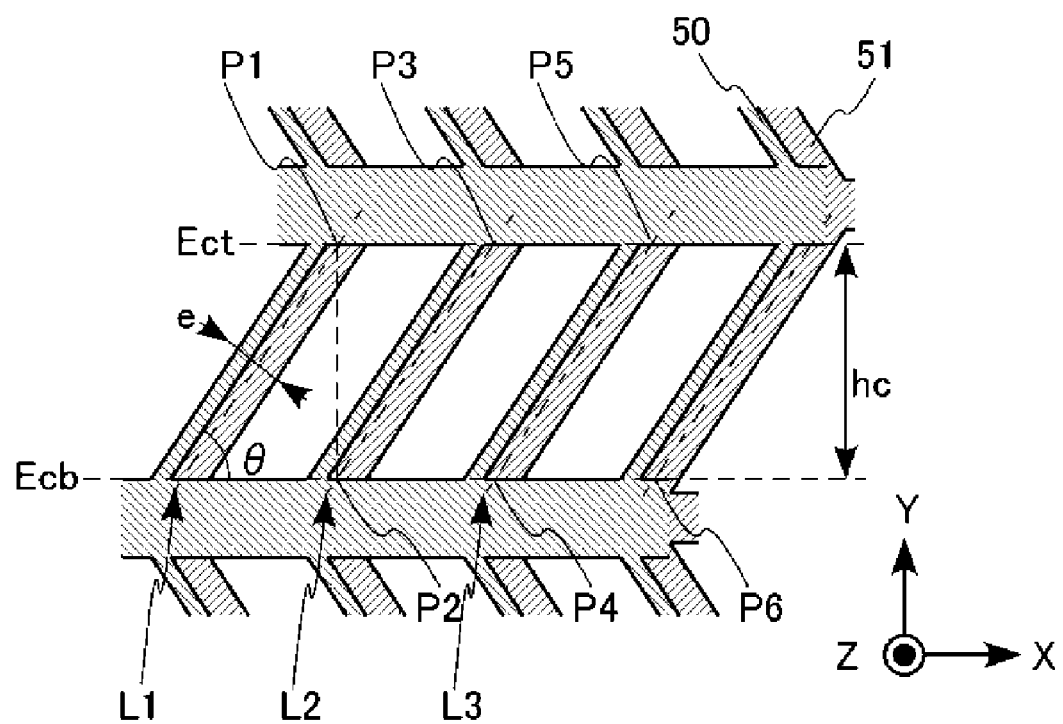
FIG. 22 A plane view showing the layout of a subpixel of the liquid crystal display device according to Embodiment 5 of the present invention when the CF substrate and TFT substrate are out of alignment in the X-axis direction.
Figure 23:
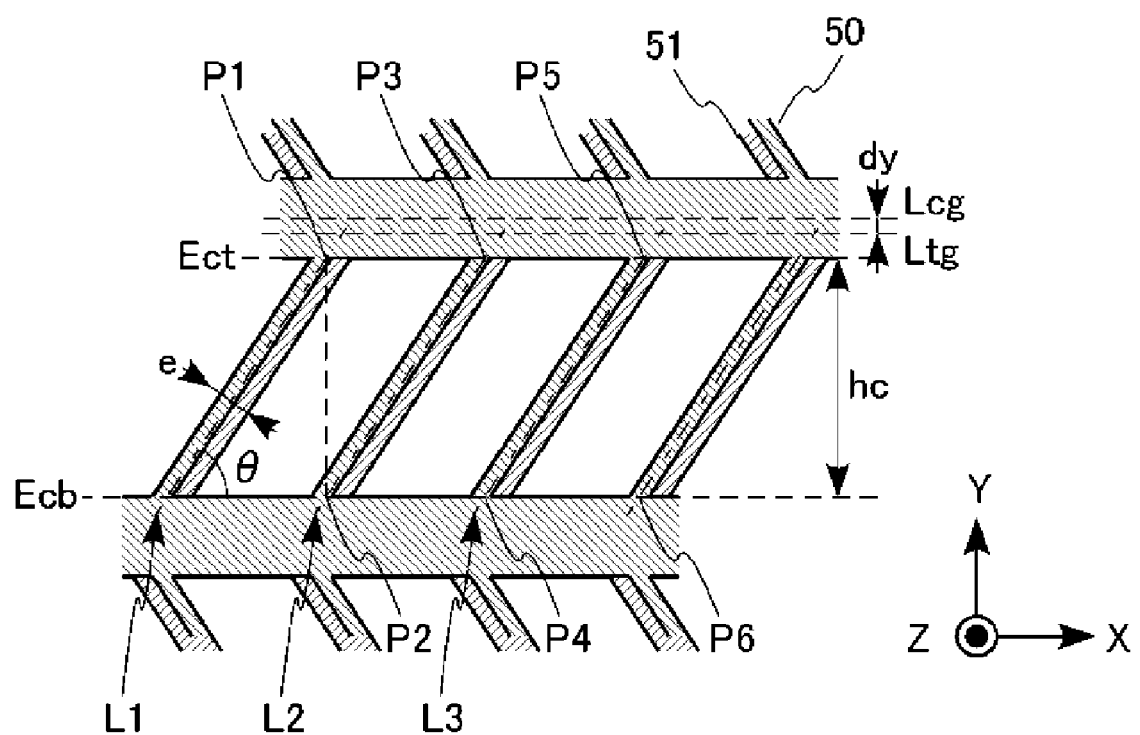
FIG. 23 A plane view showing the layout of a subpixel of the liquid crystal display device according to Embodiment 5 of the present invention when the CF substrate and TFT substrate are out of alignment in the Y-axis direction.

When the CF substrate 22 and TFT substrate 21 are out of alignment and the pattern of the shielding layer 50 or shielding element 51 has an error due to processing accuracy, moire is likely to occur. However, the liquid crystal display device 1E according to this embodiment can significantly reduce moire compared with the device without the above structure. This is because as shown in FIGS. 22 and 23, the shape of at least half of the corners of the opening is defined by the crossover between the shielding layer 50 and shielding element 51.

The case in which the distance hc between the lines defining the upper and lower sides of the opening after the superimposition is smaller than the distance ht between the lines defining the upper and lower sides of the opening of the TFT substrate 21 is discussed above. On the other hand, the width hc can be larger than the width ht. In such a case, the width of the opening in the Y-axis direction after the superimposition is ht−e/cos θ. What is important is to set dl, a half of the difference between hc and ht, to a greater value compared with the accuracy of superimposing the CF substrate 22 and TFT substrate 21 in the Y-axis direction in the production process.

Embodiment 6

Figure 24:
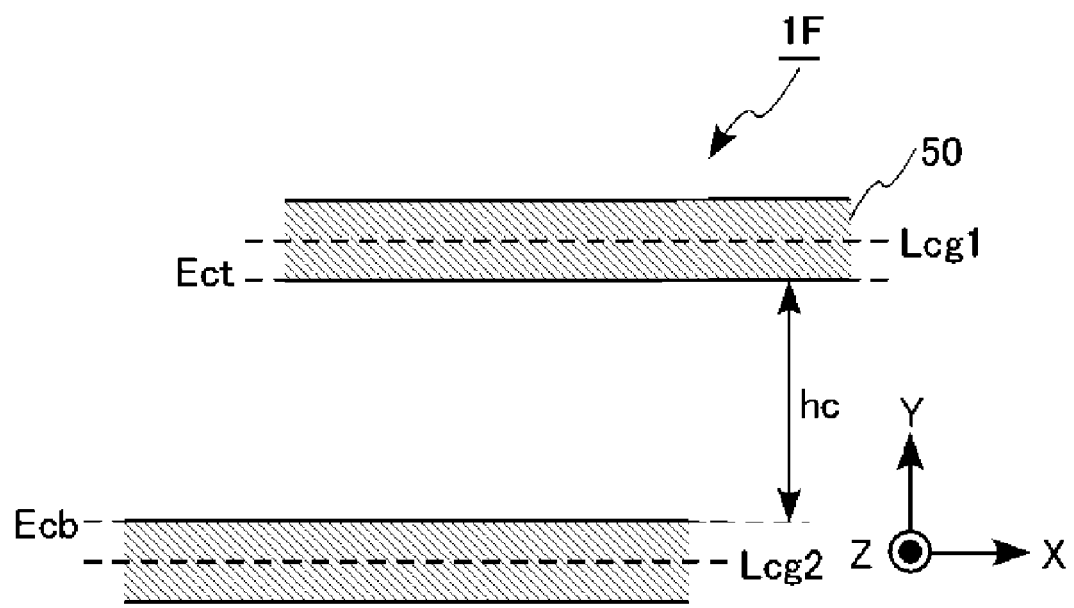
FIG. 24 A plane view showing the layout of the shielding layer of the CF substrate for showing the layout of a subpixel of the liquid crystal display device according to Embodiment 6 of the present invention.

A liquid crystal display device 1F according to this embodiment is constructed with the shielding layer 50 of the CF substrate 22 having the layout as shown in FIG. 24 and with the shielding element 51 of the TFT substrate 21 having the layout as shown in FIG. 20B. Here, the shielding element 51 is a shielding portion consisting of a laminate of films constituting the TFT substrate 21 and transmitting almost no light. The films transmitting almost no light correspond to the P—Si film 72P, gate metal film 74, and wiring metal film 76 in the production process presented in Embodiment 2. Furthermore, the liquid crystal display device 1E can employ the circuit shown in FIG. 2 as the liquid crystal panel circuit configuration.

As shown in FIG. 24, the shielding layer 50 of the CF substrate 22 is in the form of stripes parallel to the X-axis. The difference between the width hc of the light-transmitting opening in the Y-axis direction and the width ht in the Y-axis direction of the opening of the TFT substrate 21 in FIG. 20B is twice dl (2dl). Here, dl is determined in accordance with the accuracy of superimposing the TFT substrate 21 and CF substrate 22 in the production process of the liquid crystal panel 2 and set to accuracy higher than the superimposing accuracy in the Y-axis direction.

The liquid crystal display device 1F according to this embodiment is the same in other structure and operation as the above-described liquid crystal display device 1A according to Embodiment 1.

The liquid crystal display device 1F according to this embodiment can yield the same effects as in Embodiments 1 to 5.

Figure 25:
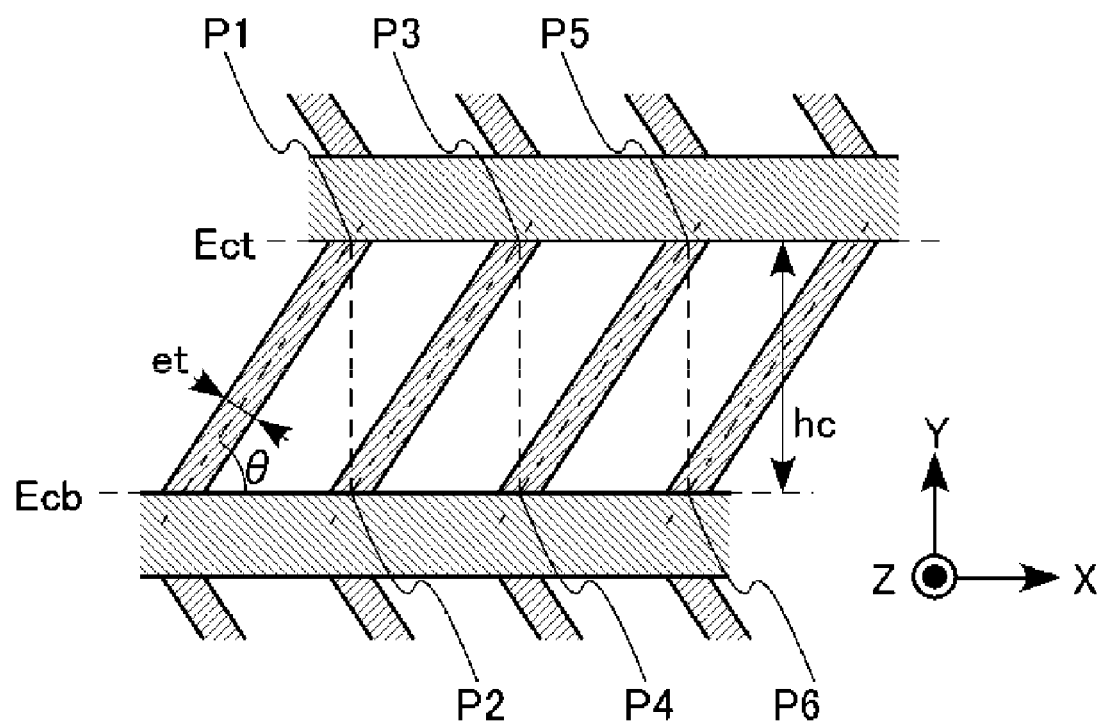
FIG. 25 A plane view showing the layout of a subpixel of the liquid crystal display device according to Embodiment 6 of the present invention when the CF substrate and TFT substrate are in alignment.

A subpixel 4S has the layout as shown in FIG. 25 when the above TFT substrate 21 and CF substrate 22 are superimposed in alignment. Here, the expression "in alignment" refers to the state in which the center lines Lcg1 and Lcg2 of the shielding layer 50 of the CF substrate 22 parallel to the lines Etc and Ecb are aligned with the center lines Ltg1 and Ltg2 of the shielding element 51 of the TFT substrate 21 parallel to the lines Ett and Etb. In the case of FIG. 25, the distance hc between the lines defining the upper side (the +Y direction) and lower side (−Y-axis direction) of the opening of the CF substrate 22 is larger than the distance ht between the lines defining the upper and lower sides of the opening of the TFT substrate 21. Therefore, the distance between the lines defining the upper and lower sides of the opening after the two substrates are superimposed is hc.

Here, the width of the opening in the Y-axis direction in a cross section of the opening at a line parallel to the Y-axis is discussed. As described in Embodiment 1, the width of the opening in the Y-axis direction is hc−et/cos θ at any line parallel to the Y-axis. Therefore, the ratio between the width of the opening and width of the shielding part in the Y-axis direction in a subpixel 4S is constant regardless of the position in the X-axis direction (the extending direction of the gate line G).

Here, attention is paid to the acute angle corners of the opening (the corners having an angle θ). In this embodiment, the shielding part of the CF substrate 22 has no diagonal shielding part. Therefore, the corners having an angle θ are always defined by the crossover between the linear shielding part of the CF substrate 22 and the linear shielding part of the TFT substrate 21. Therefore, errors such as rounding at the corner due to processing accuracy are small, preventing occurrence of moire.

Next, the case in which the CF substrate 22 and TFT substrate 21 are out of alignment only in the X-axis direction is discussed. The CF substrate 22 of this embodiment has no diagonal shielding part. Therefore, the opening is subject to absolutely no change in shape even if the CF substrate 22 and TFT substrate 21 are out of alignment in the X-axis direction. Therefore, the moire does not deteriorate even if the CF substrate 22 and TFT substrate 21 are out of alignment in the X-axis direction.

Next, the case in which the CF substrate 22 and TFT substrate 21 are out of alignment only in the Y-axis direction is discussed. If the positional shift dy in the Y-axis direction between the CF substrate 22 and TFT substrate 21 is smaller than the difference between the distance hc between the lines defining the upper and lower sides of the opening of the CF substrate 22 and the distance ht between the lines defining the upper and lower sides of the opening of the TFT substrate 21, the opening is subject to absolutely no change in shape. Therefore, the moire does not deteriorate due to positional shift as long as the positional shift dy in the Y-axis direction is within the difference between hc and ht.

Next, the case in which the CF substrate 22 and TFT substrate are out of alignment both in the X-axis direction and in the Y-axis direction is discussed. In such a case, for the reason described in Embodiment 5, it is possible to sufficiently minimize the deterioration of moire.

As described above, Embodiment 6 can yield the same effects as in Embodiment 5 and reduce the influence of processing accuracy on the pattern in the production of the CF substrate 22 and TFT substrate 21.

The case in which the width hc in the Y-axis direction of the opening of the CF substrate 22 is smaller than the distance ht between the lines defining the upper and lower sides of the opening of the TFT substrate is discussed above. However, hc can be larger than ht. What is important is to set dl, a half of the difference between hc and ht, to a greater value compared with the accuracy of superimposing the CF substrate 22 and TFT substrate 21 in the Y-axis direction in the production process.

Embodiment 7

Figure 26:
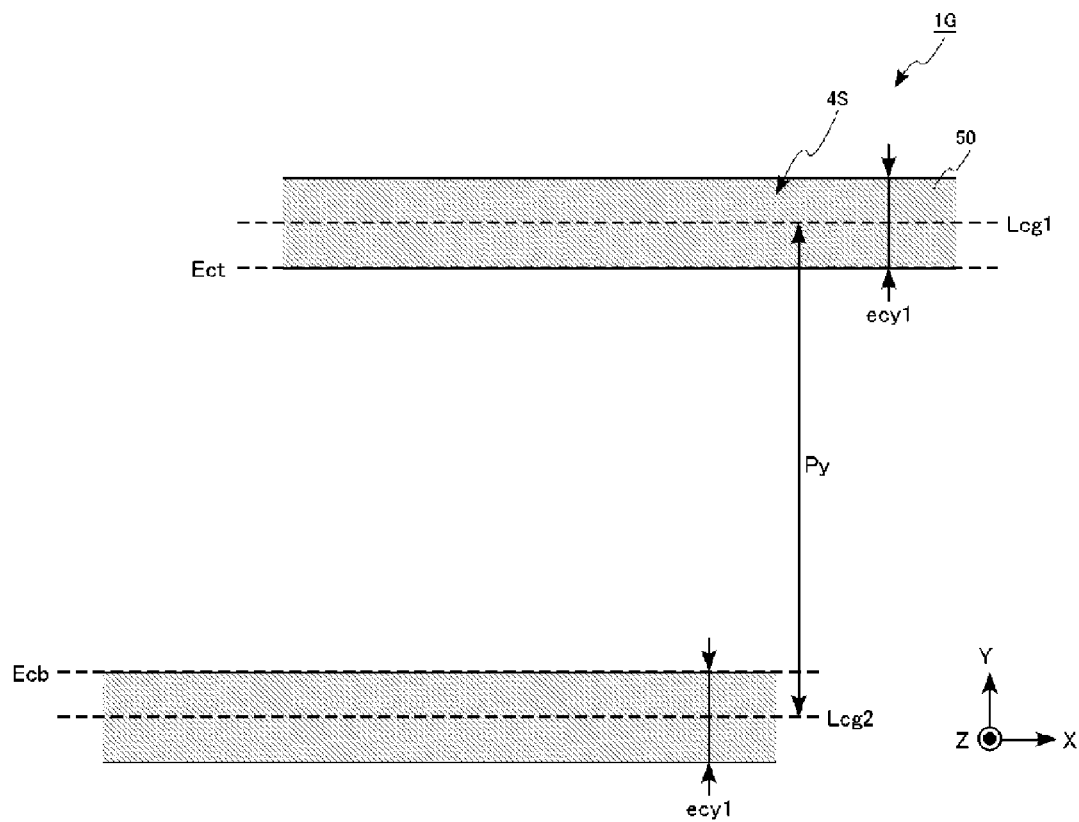
FIG. 26 A plane view showing the layout of the shielding layer of the CF substrate for showing the layout of a subpixel of the liquid crystal display device according to Embodiment 7 of the present invention.
Figure 27:
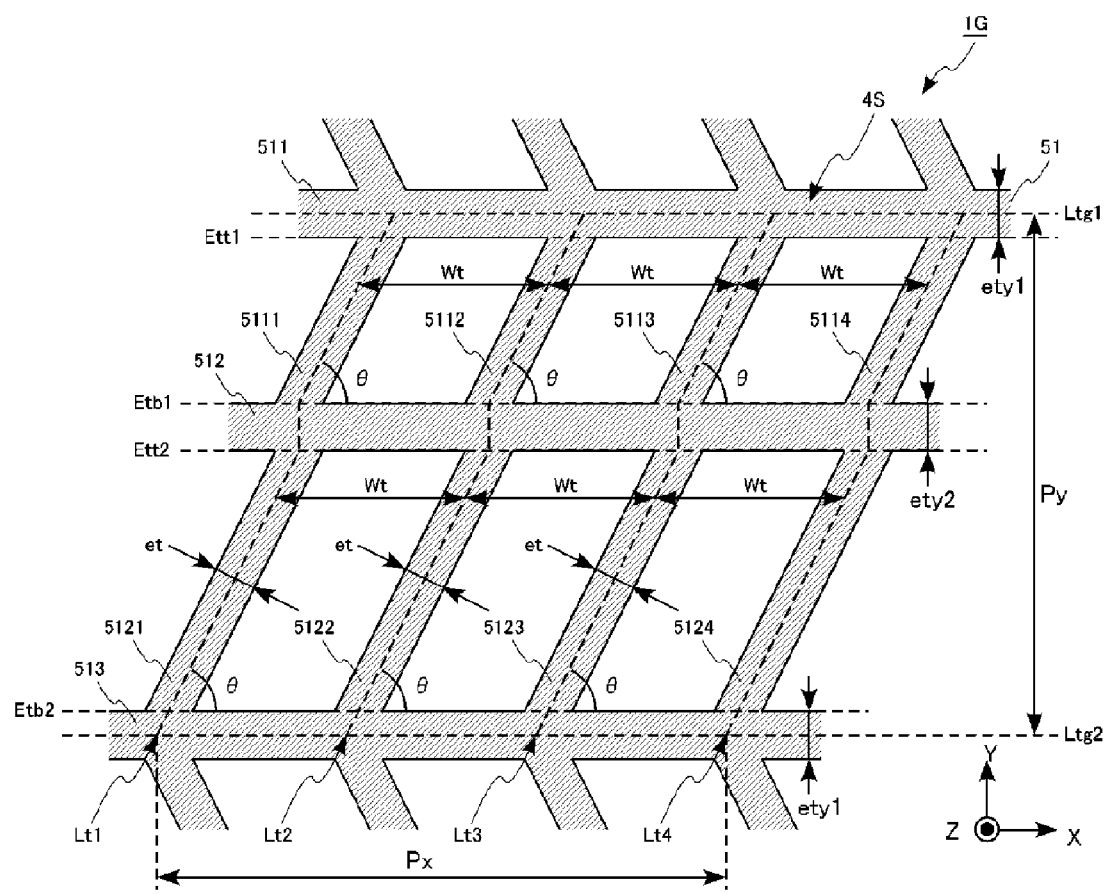
FIG. 27 A plane view showing the layout of the shielding element of the TFT substrate for showing the layout of a subpixel of the liquid crystal display device according to Embodiment 7 of the present invention.

In a liquid crystal display device 1G according to this embodiment, a subpixel 4S is constructed with the shielding layer 50 of the CF substrate 22 having the layout as shown in FIG. 26 and with the shielding element 51 of the TFT substrate 21 as shown in FIG. 27. Here, the shielding element 51 is a shielding portion consisting of a laminate of films constituting the TFT substrate 21 and transmitting almost no light. The films transmitting almost no light correspond to the P—Si film 72P, gate metal film 74, and wiring metal film 76 in the production process presented in Embodiment 2. Furthermore, the liquid crystal display device 1G can employ the circuit shown in FIG. 2 as the liquid crystal panel circuit configuration.

The layout of the shielding layer 50 of the CF substrate 22 is in the form of stripes extending in the X-axis direction and having a width ecy1 in the Y-axis direction. The center lines Lcg1 and Lcg2 of the shielding layer 50 and the lines Ect and Ecb presenting the edges of the shielding layer 50 defining the opening of a subpixel 4S are parallel to each other. In FIG. 26, Py is the pitch of subpixels 4S in the Y-axis direction.

As shown in FIG. 27, the shielding elements 511 and 513 of the TFT substrate 21 in the form of stripes extending in parallel in the X-axis direction and having a width ety1 in the Y-axis direction define the size in the Y-axis direction of the opening of a subpixel 4S. Then, a shielding element 512 divides the opening into two in the Y-axis direction. Furthermore, shielding elements 5111, 5114, 5121, and 5124 having an angle θ with respect to the X-axis define the size in the X-axis direction of the opening of the subpixel 4S. The opening divided into two in the Y-axis direction is further divided into three in the X-axis direction by shielding elements 5112, 5113, 5122, and 5123. The shielding elements 5111 to 5114 and 5121 to 5124 all have the same width et. Here, the distances between lines Lt1 and Lt2, between lines Lt2 and Lt3, and between lines Lt3 and Lt4 are all equal, Wt, in which Lt1 is the line connecting the center lines of the shielding elements 5111 and 5121, Lt2 is the line connecting the center lines of the shielding elements 5112 and 5122, Lt3 is the line connecting the center lines of the shielding elements 5113 and 5123, and Lt4 is the line connecting the center lines of the shielding elements 5114 and 5124. The intersection between the lines Lt1 and Etb1 and the intersection between the lines Lt1 and Ett2 have the same X-coordinate in which Etb1 and Ett2 are the lines presenting the edges of the shielding element 51 parallel to the Y-axis. Furthermore, the intersections of Lt2 with Etb1 and Ett2, intersections of Lt3 with Etb1 and Ett2, intersections of Lt4 with Etb1 and Ett2 have the same positional relationship in the X-axis direction. Here, in FIG.

27, Px and Py are the pitches of subpixels 4S in the X-axis direction and in the Y-axis direction, respectively.

Figure 28:
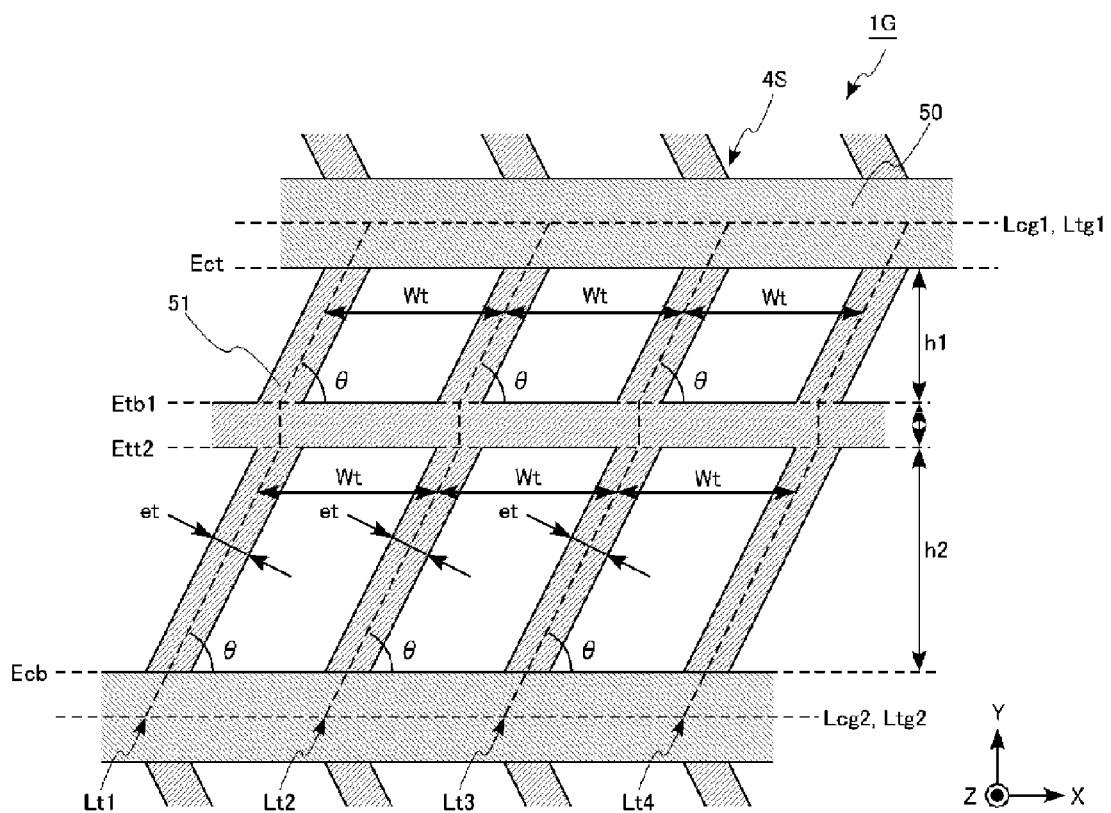
FIG. 28 A plane view showing the layout of a subpixel of the liquid crystal display device according to Embodiment 7 of the present invention when the CF substrate and TFT substrate are in alignment.

FIG. 28 is a plane view of the CF substrate 22 in FIG. 26 and TFT substrate 21 in FIG. 27 after they are superimposed. Upon superimposing them, the center lines Lcg1 and Lcg2 of the shielding layer 50 of the CF substrate 22 are aligned with Ltg1 and Ltg2 of the shielding part of the TFT substrate 21. Furthermore, the width ecy1 in the Y-axis direction of the shielding layer 50 and the width ety1 in the Y-axis direction of the shielding elements 511 and 513 have the relationship ecy1>ety1. Therefore, two openings of a subpixel 4S divided in the Y-axis direction are defined by Ect, Etb1, Ett2, and Ecb. Their heights are h1 and h2, respectively. Here, ecy1 is larger than ety1 by 2$dl$. Here, dl is a value greater than the accuracy of superimposing the CF substrate 22 and TFT substrate 21 in the Y-axis direction.

The liquid crystal display device 1G according to this embodiment is the same in other structure and operation as the above-described liquid crystal display device 1A according to Embodiment 1.

The liquid crystal display device 1G according to this embodiment can yield the same effects as in Embodiment 6.

Figure 29:
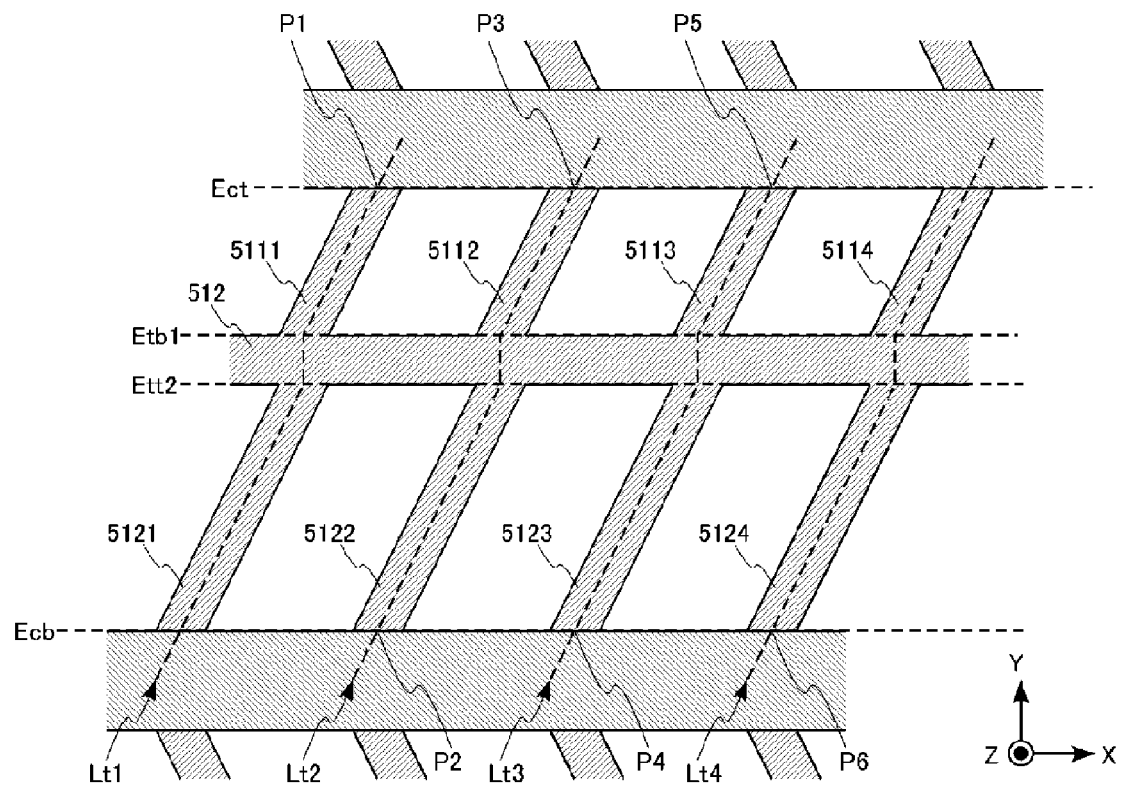
FIG. 29 A plane view showing the layout of a subpixel of the liquid crystal display device according to Embodiment 7 of the present invention when the CF substrate and TFT substrate are in alignment.
Figure 30:
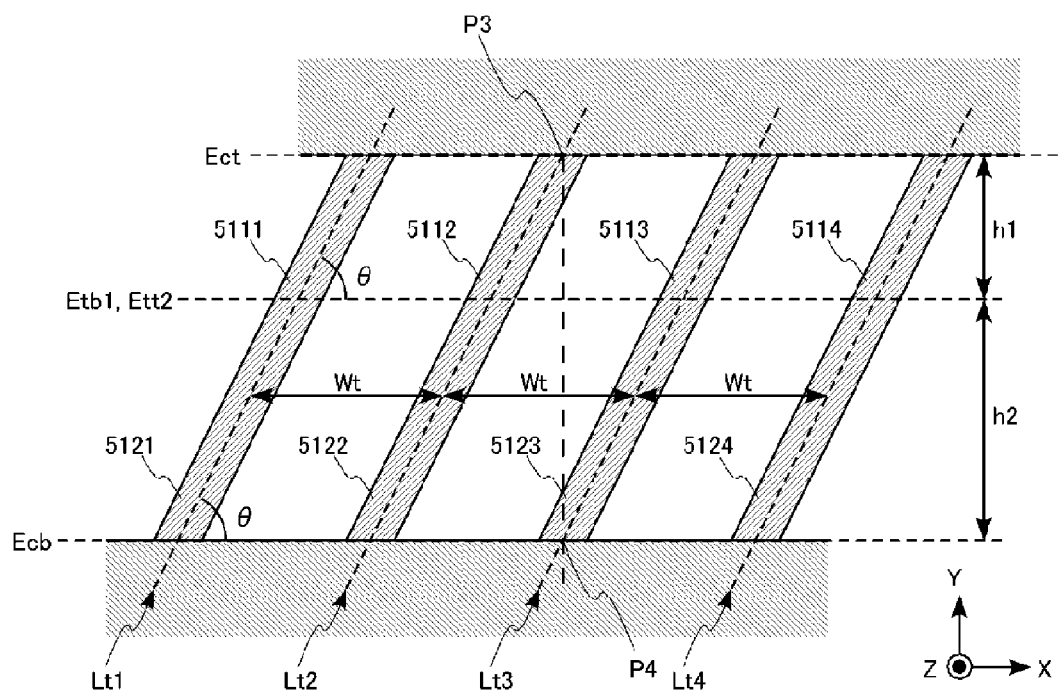
FIG. 30 A plane view showing the layout of a subpixel of the liquid crystal display device according to Embodiment 7 of the present invention when the CF substrate and TFT substrate are in alignment and the shielding element extending in parallel to the X-axis direction and dividing the opening in the Y-axis direction is eliminated.

Here, it is assumed that, as shown in FIG. 29, P1 is the intersection between the center line Lt1 of the shielding elements 5111 and 5121 and the line Ect, P2 and P3 are the intersections of the center line Lt2 of the shielding elements 5112 and 5122 with Ecb and Ect, respectively, P4 and P5 are the intersections of the center line Lt3 of the shielding elements 5113 and 5123 with Ecb and Ect, respectively, and P6 is the intersection between the center line Lt4 of the shielding elements 5114 and 5124 and Ecb. As described above, moire occurs when the height of the opening in the Y-axis direction varies depending on the position in the X-axis direction. Therefore, the shielding element 512 having a constant width in the Y-axis direction has no influence on occurrence of moire. Then, with reference to a plane view of FIG. 30 in which the shielding element 512 is eliminated, the center line Lt1 of the shielding elements 5111 and 5121 becomes a straight line. This is because the shielding element 5111 has an angle θ with respect to Etb1, the shielding element 5121 has an angle θ with respect to Ecb, and Etct, Ecb, Ett1, Etb1, Ett2, and Etb2 are parallel to each other. For the same reason, the centerlines Lt2, Lt3, and Lt4 become straight lines as shown in FIG. 30. Furthermore, the distances between Lt1 and Lt2, between Lt2 and Lt3, and between Lt3 and Lt4 are all equal, Wt. This relationship is the same relationship as in the plane view of a subpixel 4S (FIG. 25) with which the reason that no moire occurs in the liquid crystal display device 1F according to Embodiment 6 is described. Therefore, no moire occurs also in the liquid crystal display device 1G according to this embodiment.

In this embodiment, the width ecy1 of the shielding layer 50 of the CF substrate 22 is larger than the width ety1 of the shielding elements 511 and 513 of the TFT substrate 21 that is superimposed thereon by 2$dl$. Here, dl is set to a value greater than the accuracy of superimposing the CF substrate 22 and TFT substrate 21 in the Y-axis direction. Therefore, even if the CF substrate 22 and TFT substrate 21 are out of alignment, the height of the opening in the Y-axis direction is still defined by the edges Ect and Ecb of the shielding layer 50 of the CF substrate 22 and the edges Etb1 and Ett2 of the shielding element 512 of the TFT substrate 21. Then, the height of the opening in the Y-axis direction is unchanged. Consequently, in the liquid crystal display device 1G according to this embodiment, the moire does not deteriorate even if the CF substrate 22 and TFT substrate are out of alignment.

Embodiment 8

Figure 31:
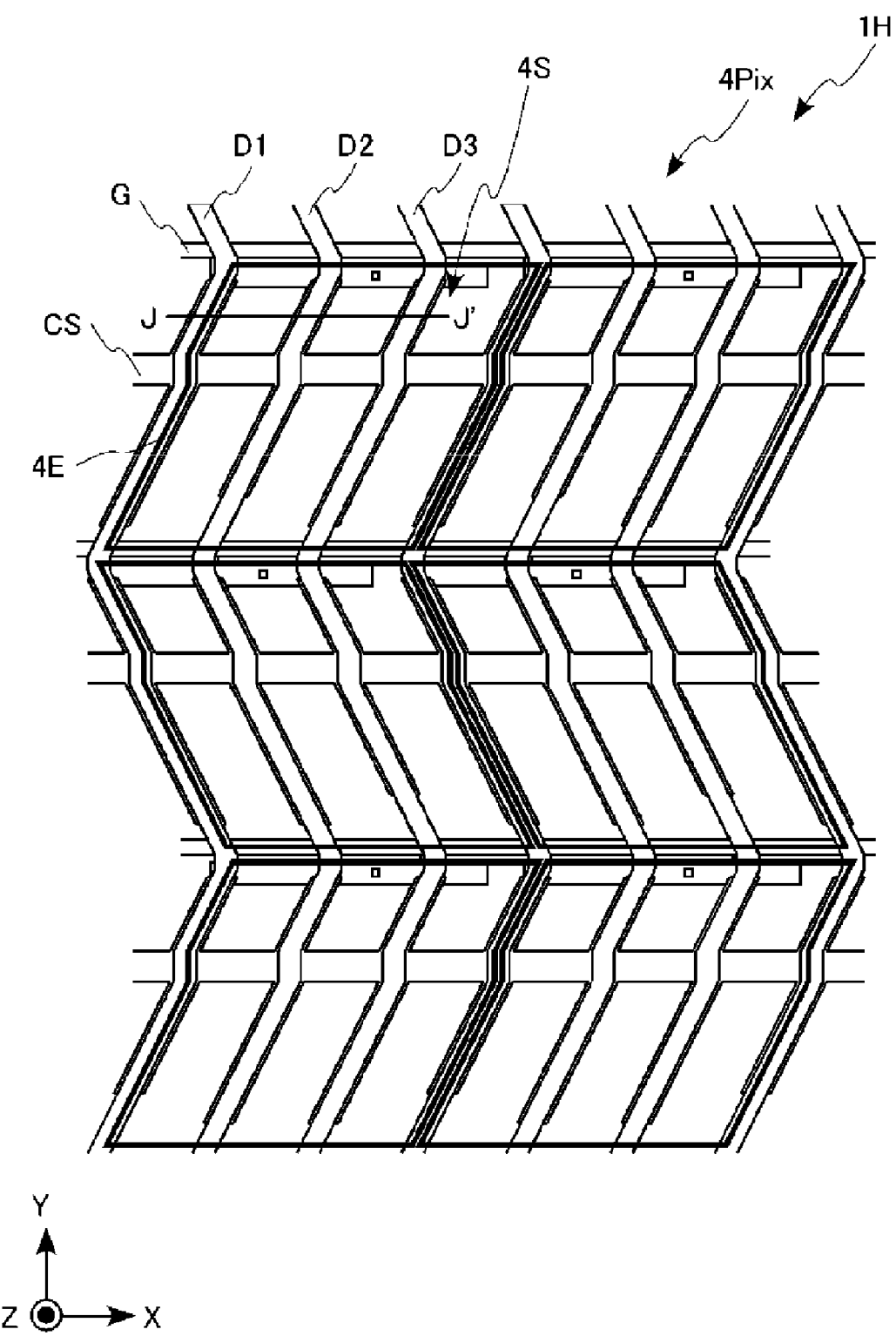
FIG. 31 A plane view showing the pixel layout of the liquid crystal display device according to Embodiment 8 of the present invention.

A liquid crystal display device 1H according to this embodiment is constructed in a combination of the CF substrate 22 in the liquid crystal display device according to Embodiment 7 and a TFT substrate 21 shown in FIG. 31. FIG. 31 shows a pixel 4Pix consisting of subpixels 4S arranged in three rows and two columns on the TFT substrate 21. Of three data lines D1, D2, and D3 having the same width, a data line D1 is adjacent to the boarder of the subpixel 4S. The other two data lines D2 and D3 divide the opening equally in the X-axis direction. A storage capacitor line CS parallel to the gate line G divides the opening in the Y-axis direction.

Here, the width of the data lines D, inclination of the data lines D and gate line G, distance between the data lines D have the same relationship as described in the above Embodiment 7.

Figure 32:
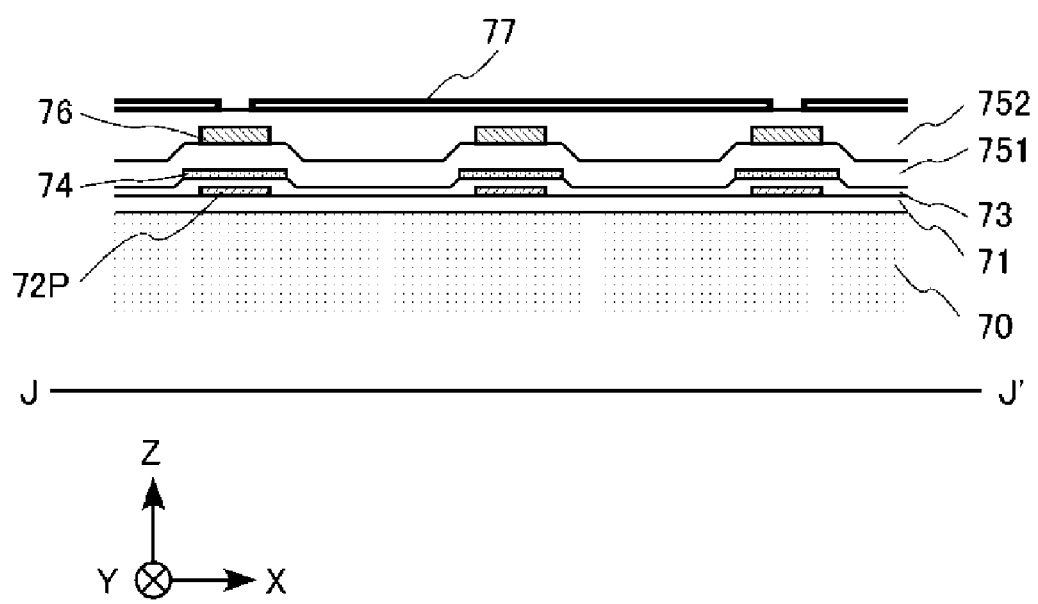
FIG. 32 A cross-sectional view showing a cross section of the pixel part of the liquid crystal display device according to Embodiment 8 of the present invention.

The liquid crystal display device 1H is produced in a P—Si (polysilicon) process as shown in FIG. 32, having a laminate structure consisting of a undercoating film 71, a P—Si film 72P, a gate insulating film 73, a gate metal film 74, a first interlayer film 751, a wiring metal film 76, a second interlayer film 752, and a transparent conductive film 77 on a glass substrate 70. The production process is the same as described in Embodiment 2.

Figure 33A:
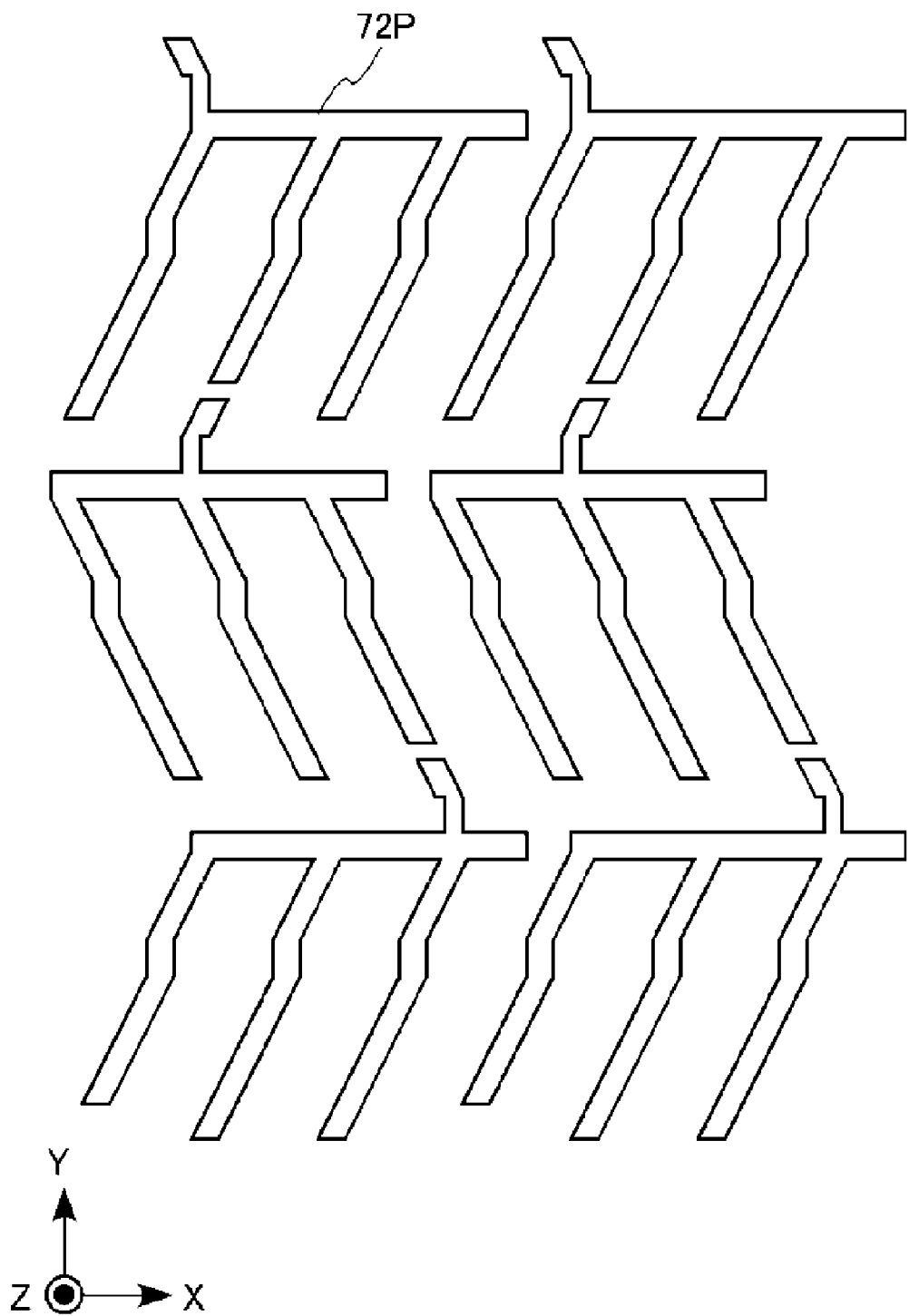
FIG. 33A A plane view showing the state after the patterning of the P—Si film is completed for explaining the production process of the liquid crystal display device according to Embodiment 8 of the present invention.
Figure 33B:
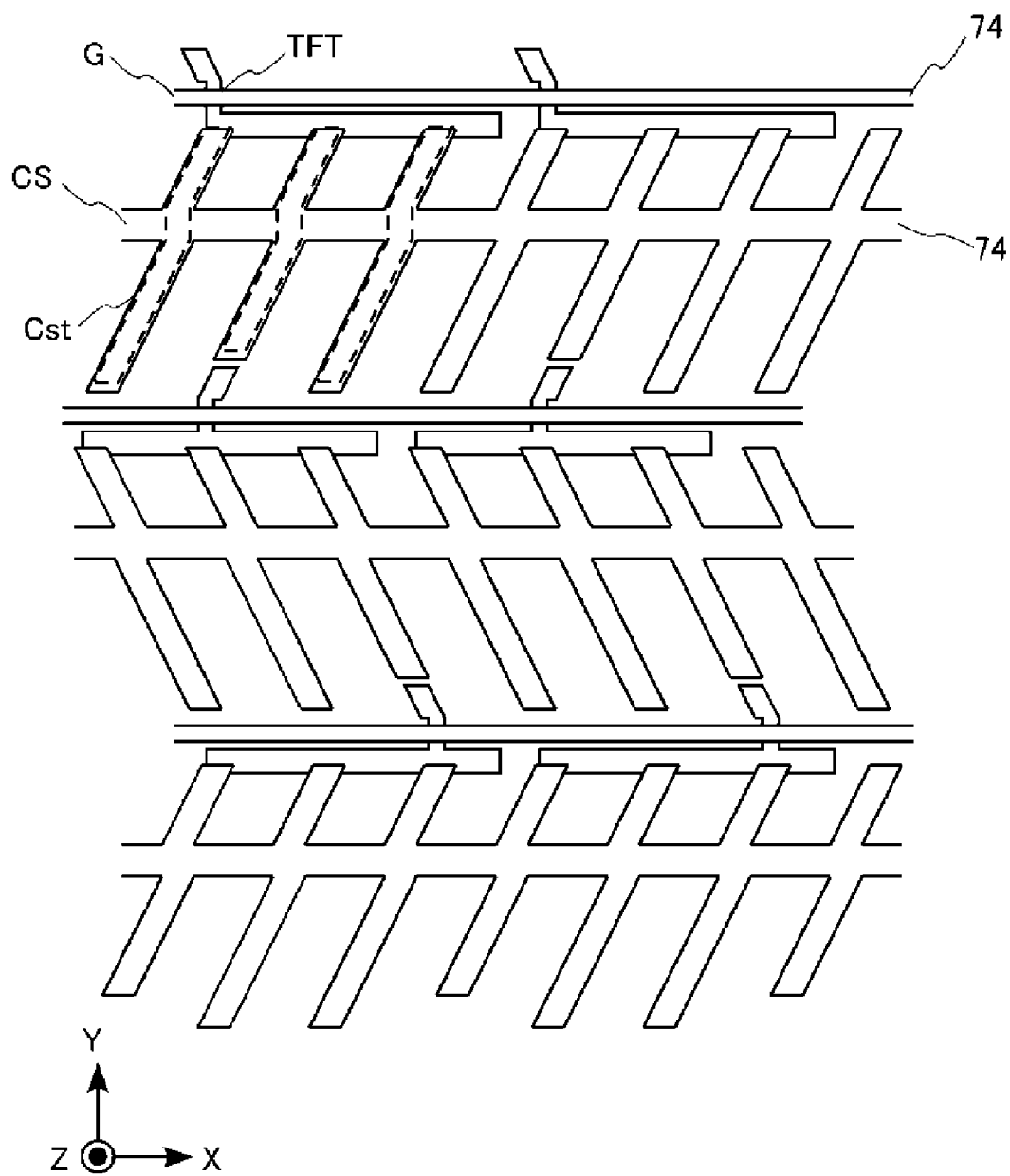
FIG. 33B A plane view showing the state after the patterning of the gate metal film is completed for explaining the production process of the liquid crystal display device according to Embodiment 8 of the present invention.

FIG. 33A shows the patterned P—Si film 72P and FIG. 33B shows the patterned gate metal film. In FIG. 33B, the code G presents a gate line. The region where the gate line G and P—Si film 72P overlap with each other via the gate insulating film 73 forms a TFT. The code CS presents a storage capacitor line, which is parallel to the gate line G and branched to extend where the data lines D1, D2, and D3 are provided. The region where the storage capacitor line CS and P—Si film 72P overlap with each other via the gate insulating film 73 forms a storage capacitor Cst.

Figure 33C:
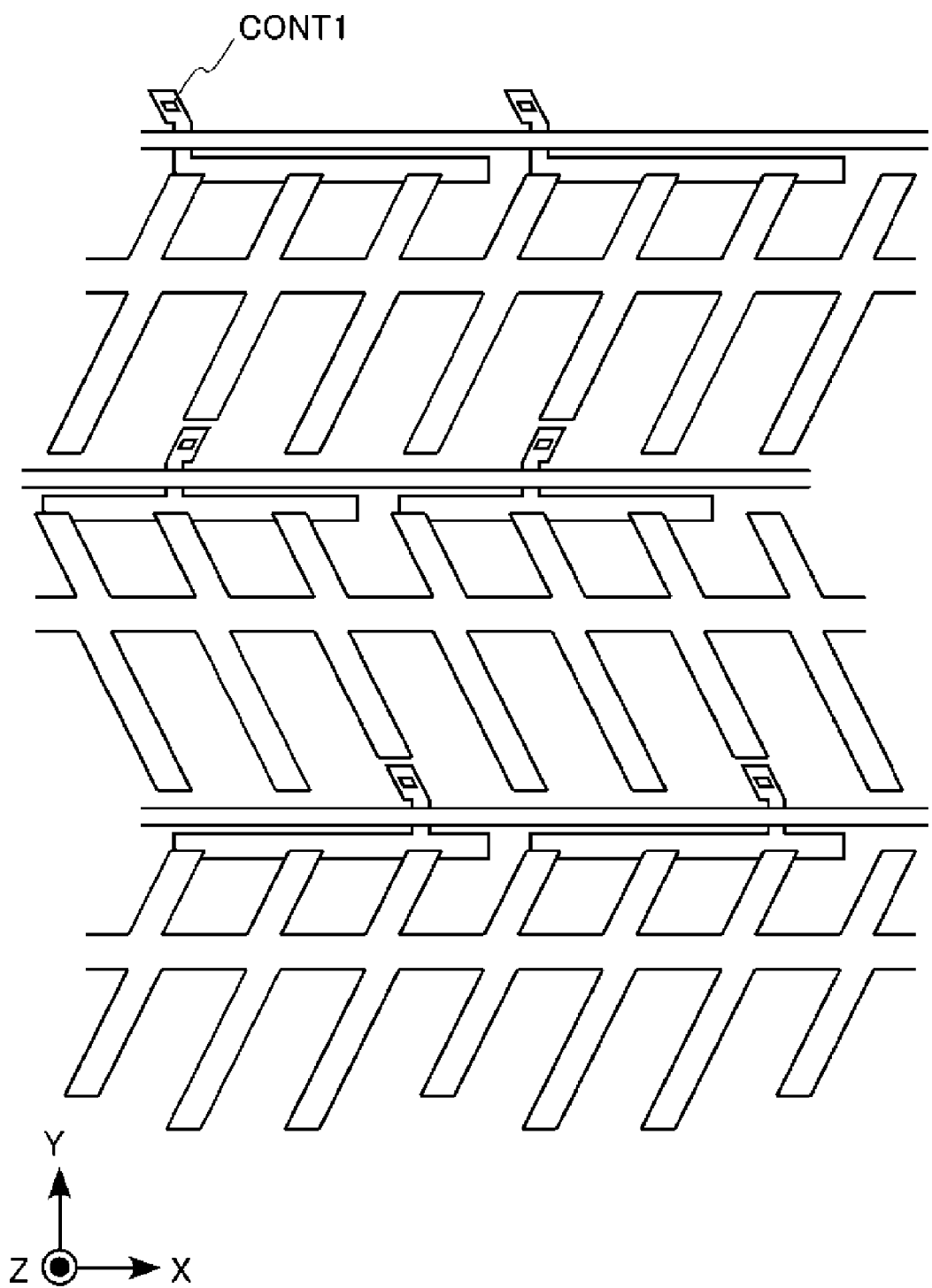
FIG. 33C A plane view showing the state after the patterning of the first contact is completed for explaining the production process of the liquid crystal display device according to Embodiment 8 of the present invention.
Figure 33D:
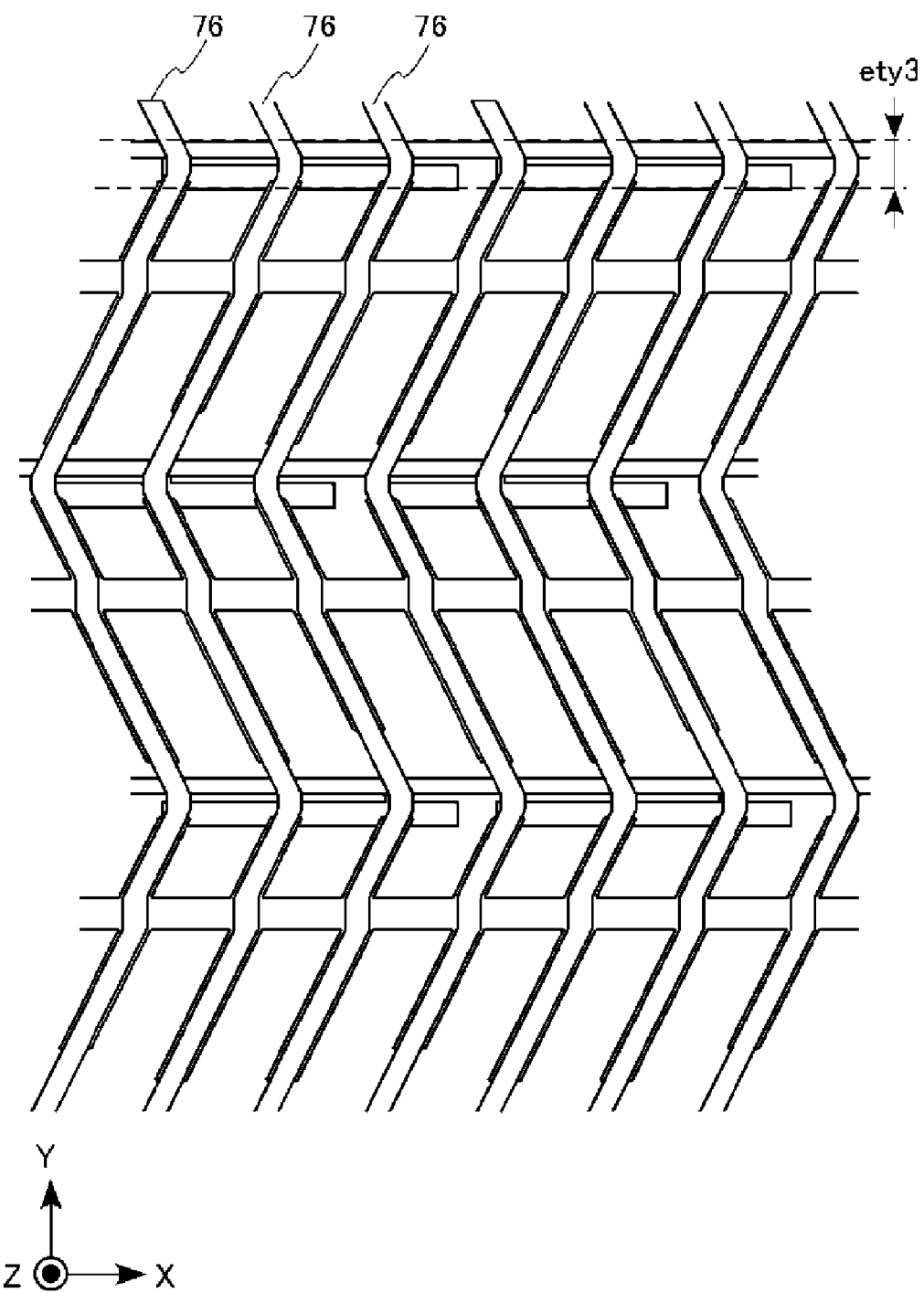
FIG. 33D A plane view showing the state after the patterning of the wiring metal film is completed for explaining the production process of the liquid crystal display device according to Embodiment 8 of the present invention.

FIG. 33C shows the layout of the first contact CONT1. FIG. 33D shows the patterned wiring metal film 76. The first contact CONT1 runs through the first interlayer film 751 and electrically connects the P—Si film 72P to the wiring metal film 76.

Figure 33E:
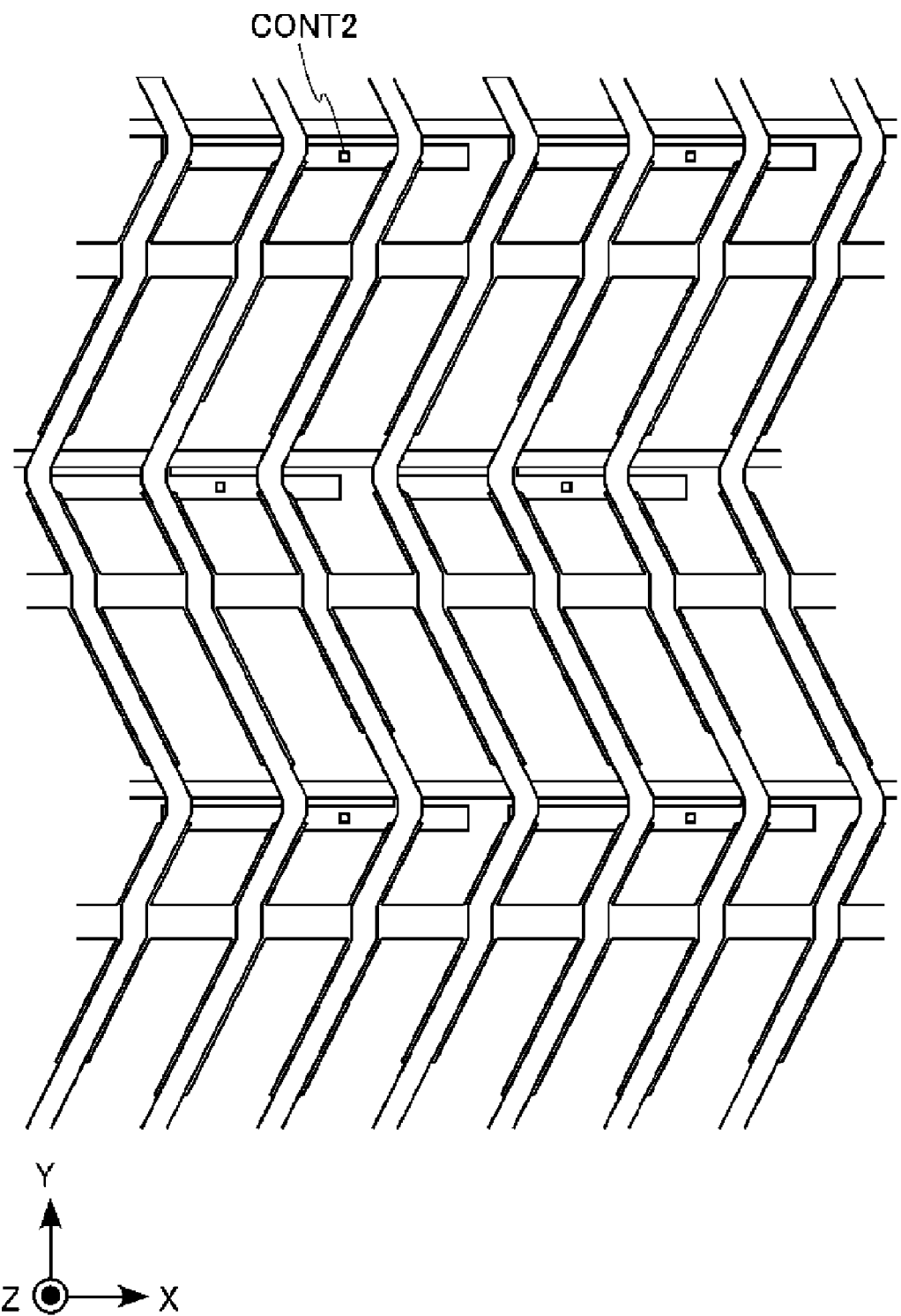
FIG. 33E A plane view showing the state after the patterning of the second contact is completed for explaining the production process of the liquid crystal display device according to Embodiment 8 of the present invention.
Figure 33F:
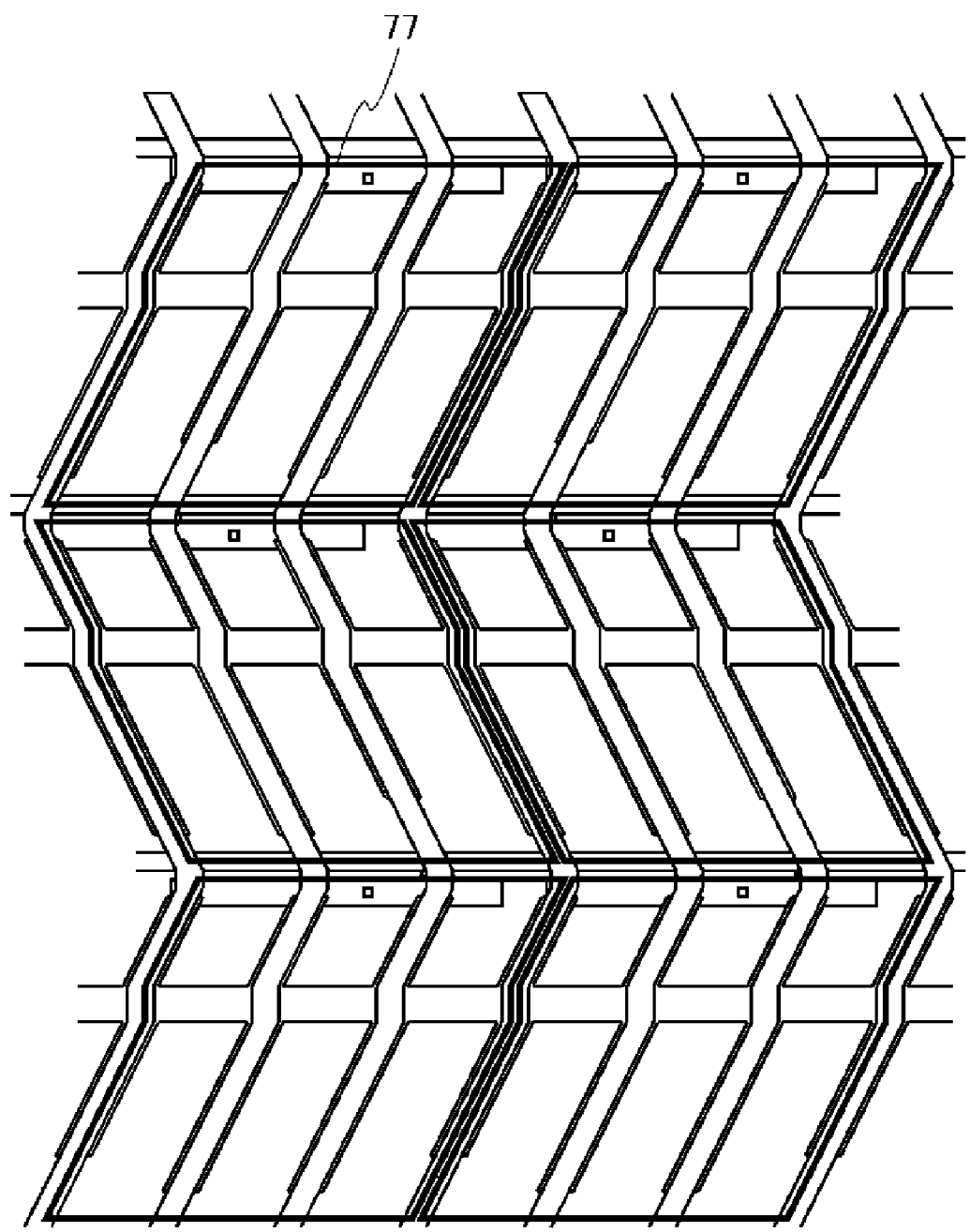
FIG. 33F A plane view showing the state after the patterning of the transparent conductive film is completed for explaining the production process of the liquid crystal display device according to Embodiment 8 of the present invention.

FIG. 33E shows the layout of the second contact CONT2. FIG. 33F shows the patterned transparent conductive film 77 forming a pixel electrode 4E. The second contact CONT2 runs through the first interlayer film 751, second interlayer film 752, and gate insulating film 73 and electrically connects the P—Si film 72P to the transparent conductive film 77.

The undercoating film 71, P—Si film 72P, gate insulating film 73, gate metal film 74, first interlayer film 751, wiring metal film 76, second interlayer film 752, and transparent conductive film 77 can consist of the materials described in Embodiment 2. The method of recrystallizing the P—Si film 72P and impurity implantation process described in Embodiment 2 can be employed. The liquid crystal display device 1H according to this embodiment operates in the same manner as the liquid crystal display device 1A according to Embodiment 1.

The liquid crystal display device 1H according to this embodiment can yield the same effects as in Embodiment 7 and yield an additional effect that the liquid crystal display device 1H can be produced at an improved yield.

Figure 36:
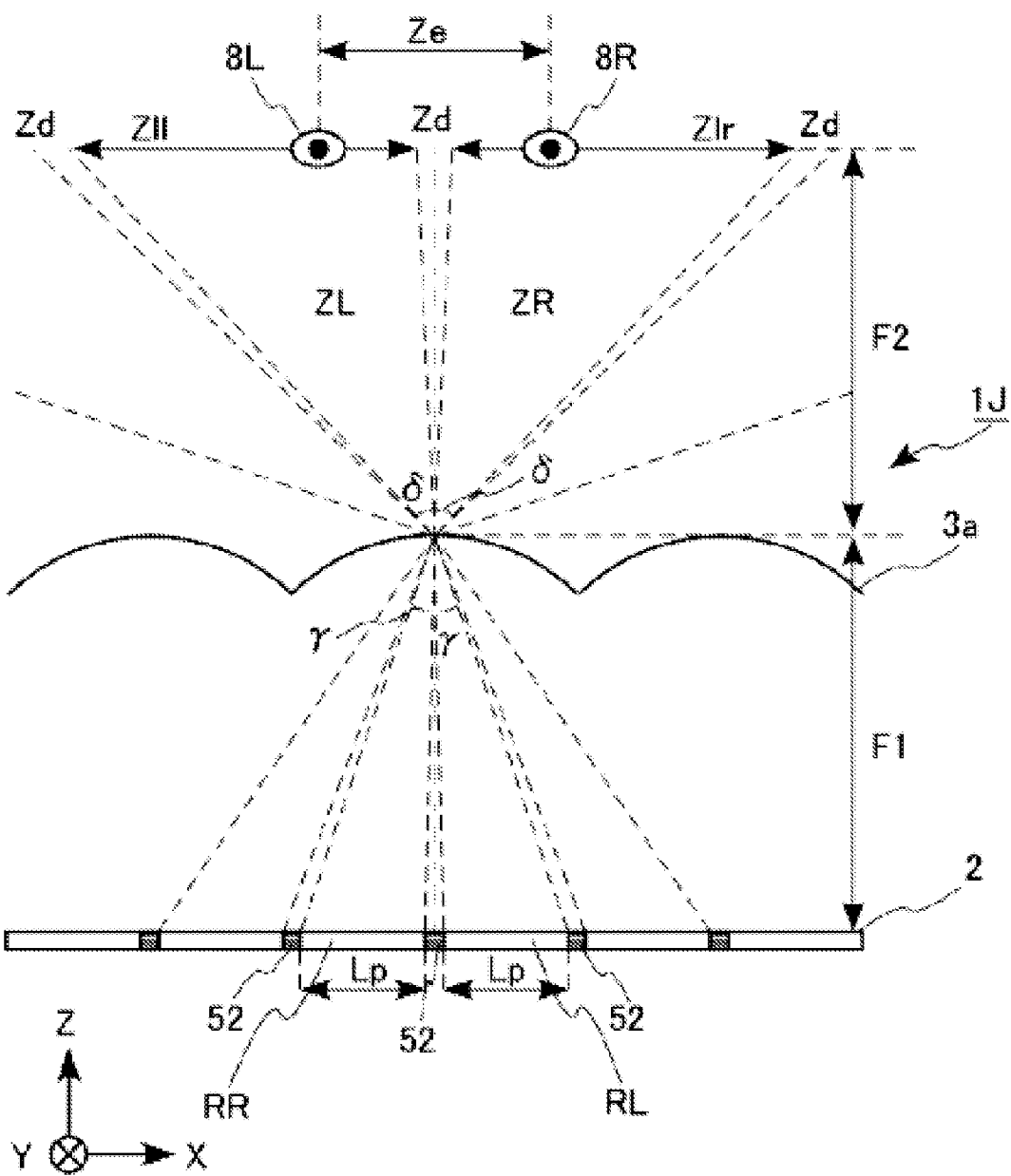
FIG. 36 An illustration for explaining the trajectory of light output from the liquid crystal display device according to Embodiment 10 of the present invention.

In the liquid crystal display device 1H according to this embodiment, the shielding element 51 of the TFT substrate 21 corresponds to the P—Si film 72P, gate metal film 74, and wiring metal film 76. Therefore, the shielding element 51 of the TFT substrate 21 has the form in FIG. 33D. This is nearly the same form as of the shielding element 51 of the TFT substrate 21 in Embodiment 7. The difference is found in the form of the shielding elements 511 and 513 in FIG. 27. However, they can be assumed to be the same if the width ety3 of the gate line G and P—Si film 72P in FIG. 36 is made smaller than their width ety1 in the Y-axis direction. Then, the same effect as in Embodiment 7 can be obtained.

In the liquid crystal display device 1H according to this embodiment, as shown in FIG. 33B, the gate line G and storage capacitor line CS are not close to each other over a long distance on the TFT substrate 21. Generally, if wires formed by the same metal layer and transferring different signals are provided close to each other over a long distance, the possibility of short-circuit between the wires is increased. This is because dust adheres to the metal layer before patterning it and the dust causes etching residues during etching. In the liquid crystal display device 1H according to this embodiment, the wires formed by the same metal layer are not close to each other over a long distance. Therefore, the liquid crystal display device can be produced at an improved yield.

Embodiment 9

Figure 34:
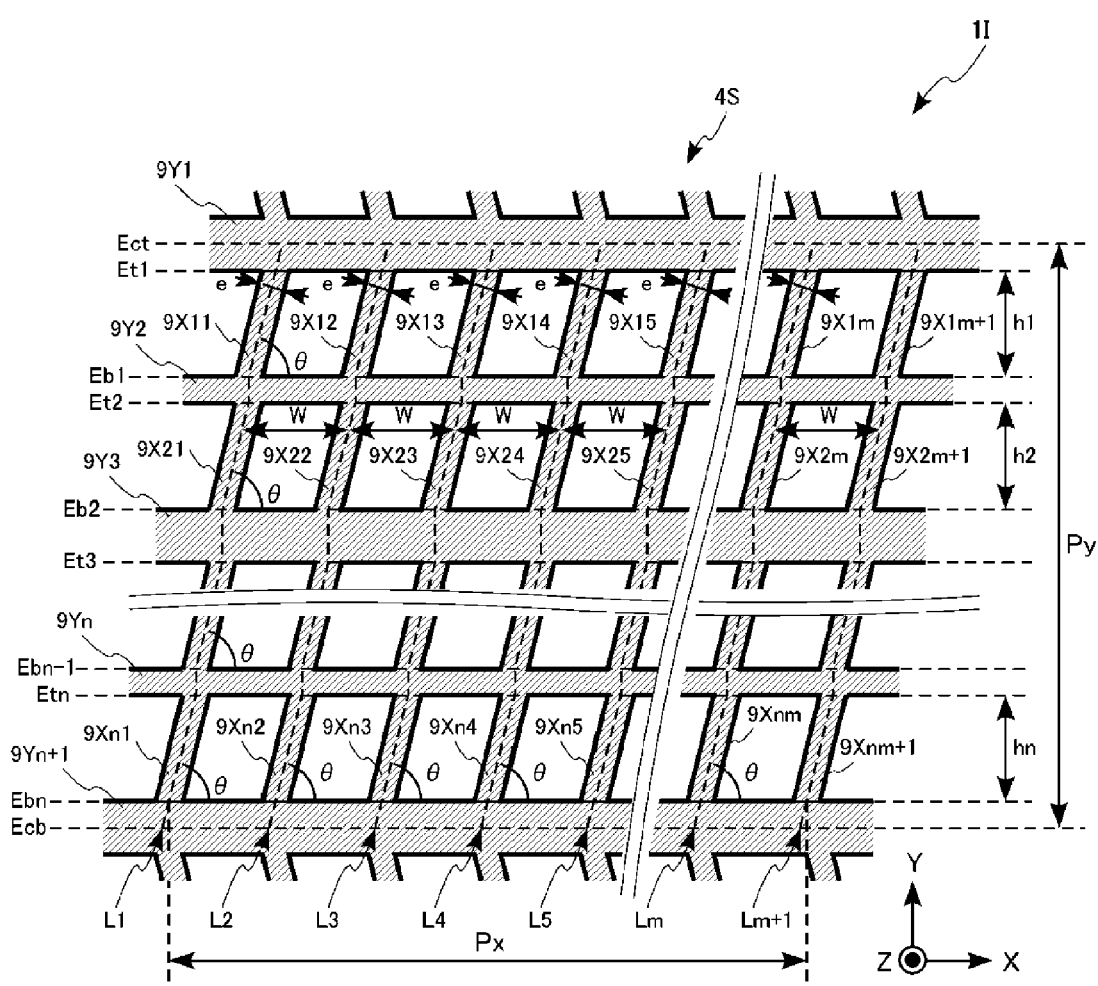
FIG. 34 A plane view showing the pixel layout of the liquid crystal display device according to Embodiment 9 of the present invention.

FIG. 34 shows the form of the opening of a subpixel 4S in a liquid crystal display device 1I according to this embodiment. As described above, the form of the opening is determined by the shielding layer of the CF substrate and the shielding part of the TFT substrate. Then, the portion formed by the shielding layer or shielding element and transmitting no light is termed "a shielding entity" hereafter.

In the case of FIG. 34, shielding entities 9Y1 to 9Yn+1 are each parallel to the Y-axis. On the other hand, shielding entities 9X11 to 9Xnm+1 each have an angle θ with respect to the X-axis and the same width e. Here, the line connecting the center lines of the shielding entities 9X11, 9X21 to 9Xn1 is referred to by L1. Similarly, the line connecting the center lines of the shielding entities 9X12, 9X22 to 9Xn2 is referred to by L2. Furthermore, L3 to Lm+1 are similarly defined. Here, L1 to Lm+1 are situated at equal intervals W. The pitch Py of subpixels 4S in the Y-axis direction is determined by the distance between the center line Ect of the shielding entity 9Y1 and the center line Ecb of the shielding entity 9Yn+1. The pitch Px of subpixels 4S in the X-axis direction is determined by the distance between L1 and Lm+1. Here, L1 to Lm+1 intersect with the edges of each of the shielding entities 9Y2 to 9Yn that are parallel to the X-axis at the same position in the X-axis direction. More specifically, at the intersection between L1 and the shielding entity 9Y2, L1 intersects with the edges Eb1 and Et2 of the shielding entity 9Y2 that are parallel to the X-axis at the same position in the X-axis direction. Similarly, at the intersection between L1 and the shielding entity 9Y3, L1 intersects with the edges Eb2 and Et3 of the shielding entity 9Y3 that are parallel to the X-axis at the same position in the X-axis direction. Here, the widths of the shielding entities 9Y2 to 9Yn in the Y-axis direction can be different. The heights h1 to hn of the opening divided in the Y-axis direction can be different.

As described above, in the liquid crystal display device 1I according to this embodiment, the opening of a subpixel 4S is divided into n in the Y-axis direction and into m in the X-axis direction. Here, the angle θ, heights h1 to hn of the opening divided in the Y-axis direction, and pixel pitch Px in the X-axis direction satisfies the equation below.

$$m \times \Sigma hi / \tan\theta = Px \qquad \text{[Math 10]}$$

in which Σhi is the total of heights h1 to hn.

The liquid crystal panel of the liquid crystal display device 1I can employ the circuit configuration shown in FIG. 2. Furthermore, the TFT substrate production process described in regard to Embodiments 2, 3, and 4 can apply and the drive method described in regard to Embodiment 1 can apply.

The liquid crystal display device 1I according to this embodiment can yield the same effects as in Embodiment 5.

Figure 35:
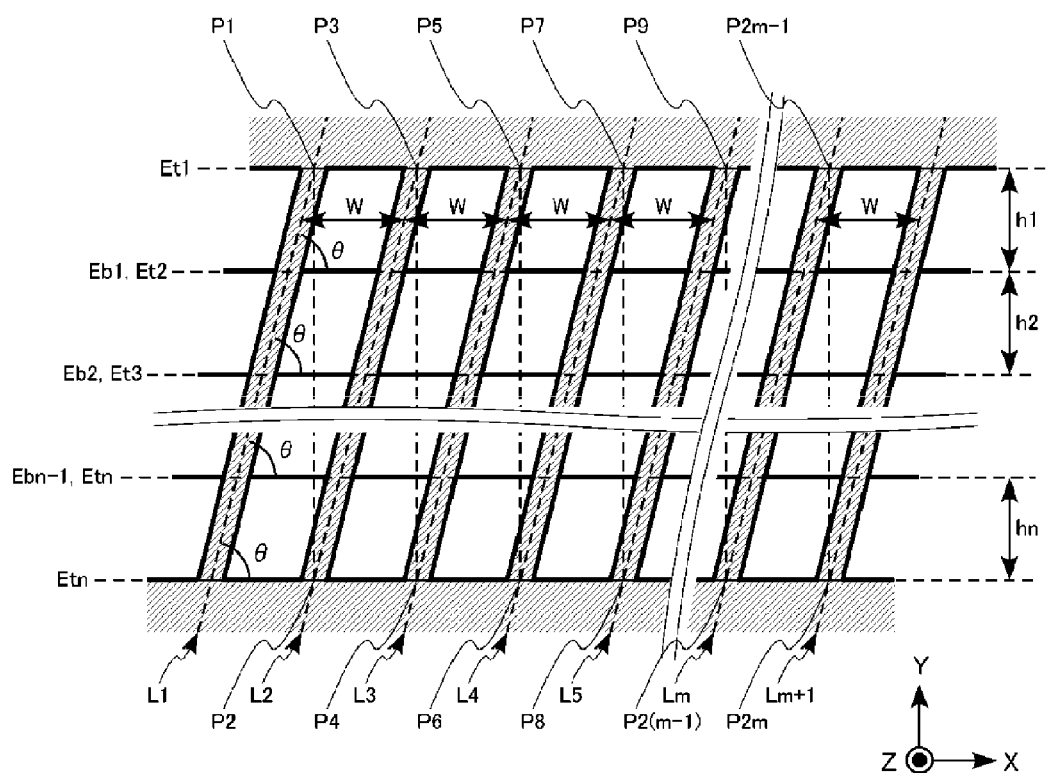
FIG. 35 A plane view showing the pixel layout of the liquid crystal display device according to Embodiment 9 of the present invention when the shielding element extending in parallel to the X-axis direction and dividing the opening in the Y-axis direction is eliminated.

As described in Embodiment 7, the shielding entities 9Y2 to 9Yn having a constant width in the Y-axis direction has no influence on occurrence of moire. Therefore, influence of moire on the liquid crystal display device 1I according to this embodiment can be discussed using a figure in which the shielding entities 9Y2 to 9Yn are eliminated. FIG. 35 is a figure in which the shielding entities 9Y2 to 9Yn are eliminated from FIG. 34. As apparent from FIG. 35, L1 to Lm become straight lines. This is because the shielding entities 9X11 to 9Xnm+1 all have an angle θ with respect to the X-axis and, therefore, L1 to Lm+1 all have an angle θ with respect to the X-axis. Furthermore, if the intersections between L1 to Lm+1 and Et1 and ETn are defined as shown in FIG. 35, P1 and P2, P3 and P4, and P2m−1 and P2m are situated at the same position in the X-axis direction, respectively. The above-described form of the opening has the same relationship as the form of the opening shown in FIG. 4 in Embodiment 1 and satisfies the relationship presented by the above [Math 7]. Therefore, for the same reason described in Embodiment 1, no moire occurs.

Embodiment 10

A liquid crystal display device 1J according to this embodiment has a region RR that is an opening of a subpixel 4S displaying a red right-eye image and a region RL that is an opening of a subpixel 4S displaying a red left-eye image as shown in FIG. 36. Red right-eye light emitted from the region RR is deflected by a cylindrical lens 3a and released for the right eye 8R of the observer with a spread angle δ. Similarly, red left-eye light emitted from the region RL is deflected by the cylindrical lens 3a and released for the left eye 8L of the observer with a spread angle δ.

Here, it is assumed that the lights spread over distances Zlr and Zll at the position of the eyes of the observer and these distances are set to a value two or more times greater than the distance Ze between the right and left eyes 8R and 8L of the observer. The Zlr and Zll can be determined based on the distance between the liquid crystal panel 2 and cylindrical lens 3a, reflective index of the cylindrical lens 3a, and radius of curvature of the cylindrical lens 3a. In doing so, the relationship below is satisfied in which F1 is the distance between the liquid crystal panel 2 and the convex surface of the cylindrical lens 3a, F2 is the distance between the convex surface of the cylindrical lens 3a and the eyes of the observer, n and r are the refractive index and radius of curvature of the cylindrical lens 3a, and Lp is the width in the X-axis direction of the opening of a subpixel 4S:

$$\tan\gamma = Lp/F1 \qquad \text{[Math 11]}$$

$$\tan\delta = Ze/F2 \qquad \text{[Math 12]}$$

$$r = (n-1) \times F1/n \qquad \text{[Math 13]}$$

Figure 37:
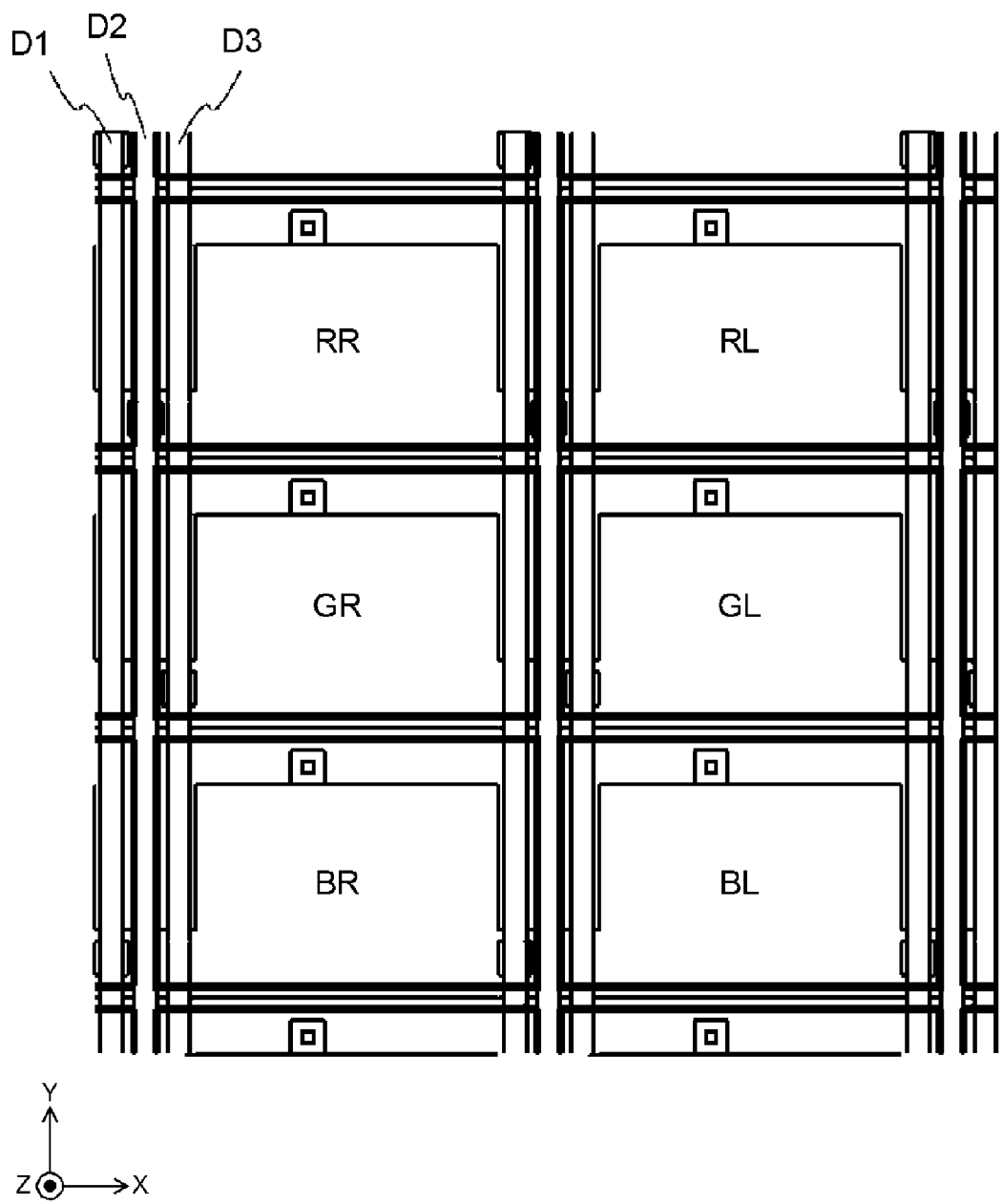
FIG. 37 A plane view showing a pixel layout of the liquid crystal display device according to Embodiment 10 of the present invention.

The liquid crystal display device 1J according to this embodiment can employ a pixel layout in which a subpixel 4S has a rectangular, hexagonal, or trapezoidal opening in addition to the layout described in regard to Embodiments 1 to 9. For example, as shown in FIG. 37, a layout in which a subpixel 4S has a rectangular opening can be employed. In such a case, three data lines D1, D2, and D3 provided for a column of subpixels arranged along the data lines D are provided collectively so as not to divide the opening.

Figure 38:
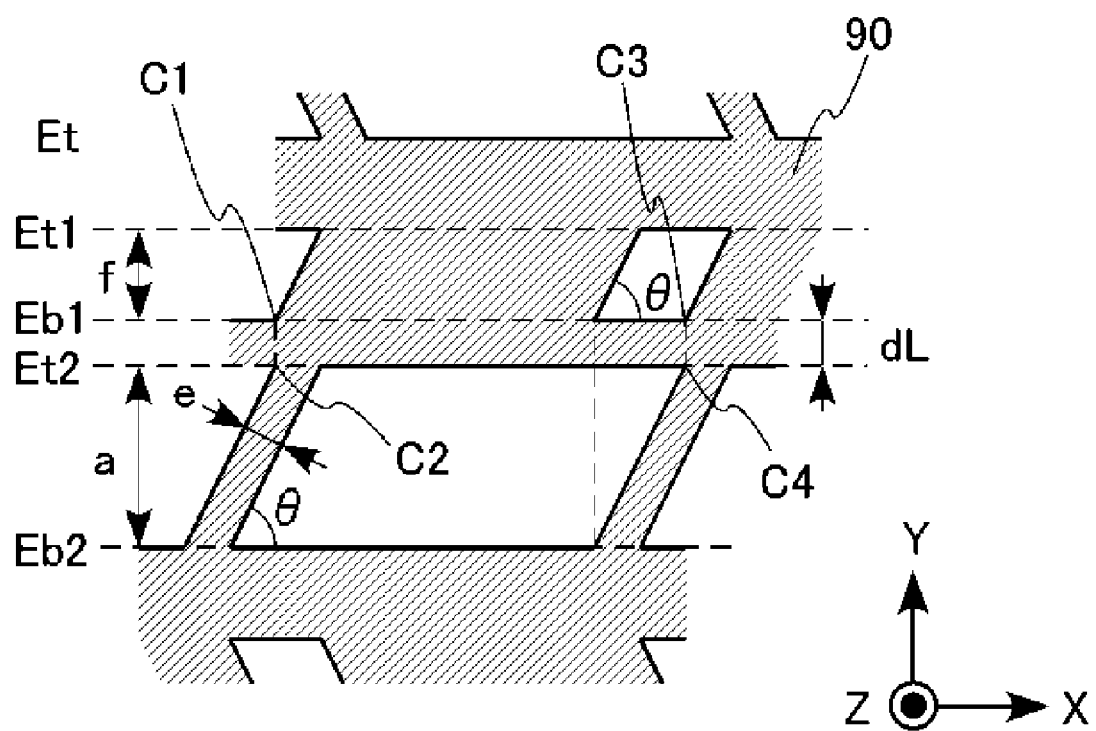
FIG. 38 A plane view showing another pixel layout of the liquid crystal display device according to Embodiment 10 of the present invention.
Figure 39:
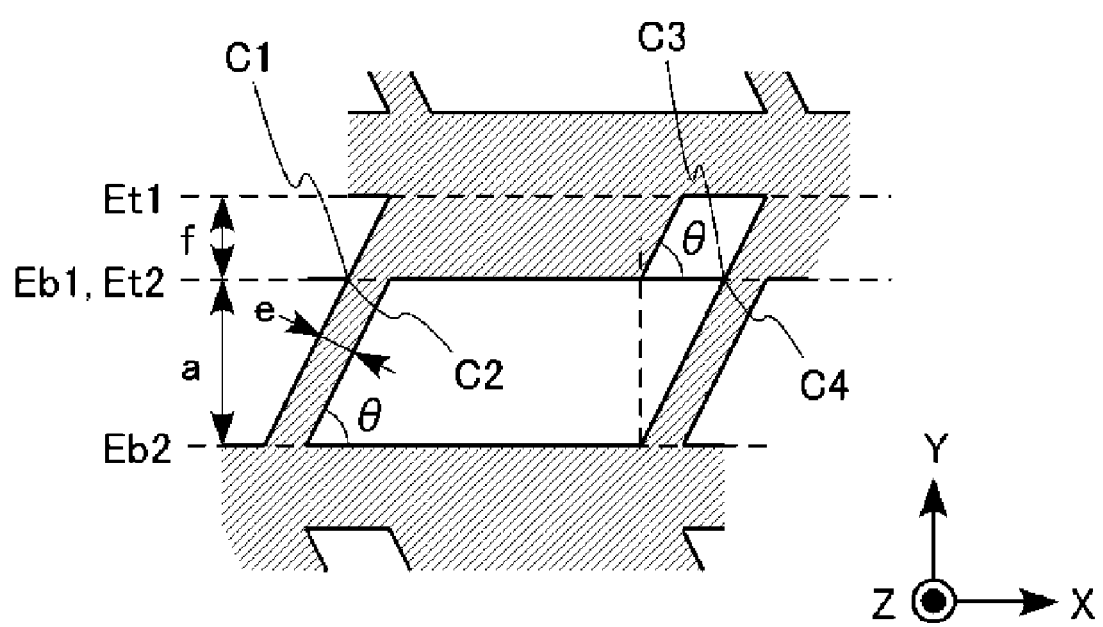
FIG. 39 A plane view showing the other pixel layout of the liquid crystal display device according to Embodiment 10 of the present invention when the shielding element extending in parallel to the X-axis direction and dividing the opening in the Y-axis direction is eliminated.

Another pixel layout applicable to the liquid crystal display device according to this embodiment is shown in FIG. 38. FIG. 38 shows an opening of a subpixel 4S that is defined by a shielding entity 90. Here, the shielding entity is a portion defined by the crossover of the shielding layer 50 of the CF substrate 22 and the shielding element 51 of the TFT substrate 21 and transmitting no light. This opening of a subpixel 4S is formed by dividing the hexagonal opening shown in FIG. 52 with a shielding element extending in parallel to the X-axis and having an equal width dL in the Y-axis direction. The shielding element corresponds to the portion of the shielding element having the edges Eb1 and Et2 in FIG. 38. With the opening being divided in this way, the corners C1 and C2 of the opening are situated at the same position in the X-axis direction and the corners C3 and C4 are situated at the same position in the X-axis direction. Therefore, as shown in FIG. 39, the layout of the opening after the shielding element is eliminated is the same form as the one in FIG. 52.

The liquid crystal display device 1J according to this embodiment is the same in other structure and operation as the above-described liquid crystal display device 1A according to Embodiment 1.

As described above, moire occurs when the shielding layer 50 of the liquid crystal panel 2 is projected toward the observer via the lens and viewed by the observer as a black belt Zd. As shown in FIG. 36, when light from the liquid crystal panel 2 is emitted toward the observer, the distance between black belts Zd that appear due to the shielding part 52 adjacent to the opening of a subpixel 4S is increased to two or more times larger than the distance between the eyes of the observer. Therefore, the black belts Zd cannot be seen unless the observer moves the head significantly. Then, the observer is unlikely to subjectively be aware of moire even if the black belts Zd due to shielding part 52 is projected toward the observer. Here, the above shielding part 52 is a portion defined by the shielding layer 50 of the CF substrate 22 and shielding element 51 of the TFT substrate and transmitting no light.

Then, the liquid crystal display device 1J according to this embodiment can employ a layout in which the opening of a subpixel 4S is rectangular, hexagonal, trapezoidal or of the shape shown in FIG. 38. The liquid crystal display device 1J according to this embodiment eliminates the layout constraint that the opening has a constant width in the Y-axis direction regardless of the X-coordinate. Therefore, a layout maximizing the opening can be employed. Then, the aperture rate is improved.

The liquid crystal display device 1J according to this embodiment can yield the effect that the liquid crystal display device can be produced at an improved yield when the opening layout shown in FIG. 38 is employed.

In the liquid crystal display device according to this embodiment, it is possible to provide the gate line G at the position of the shielding element 90 between the lines Et and Ea and the storage capacitor line CD at the position of the shielding element 90 between the lines Eb1 and Et2. In such a case, the gate line G and storage capacitor line CS are not close to each other over a long distance. Therefore, defects causing short-circuit between the gate line G and storage capacitor line CS under the influence of dust do not easily occur in the course of production of the liquid crystal display device; the liquid crystal display device can be produced at an improved yield.

Embodiment 11

Figure 40:
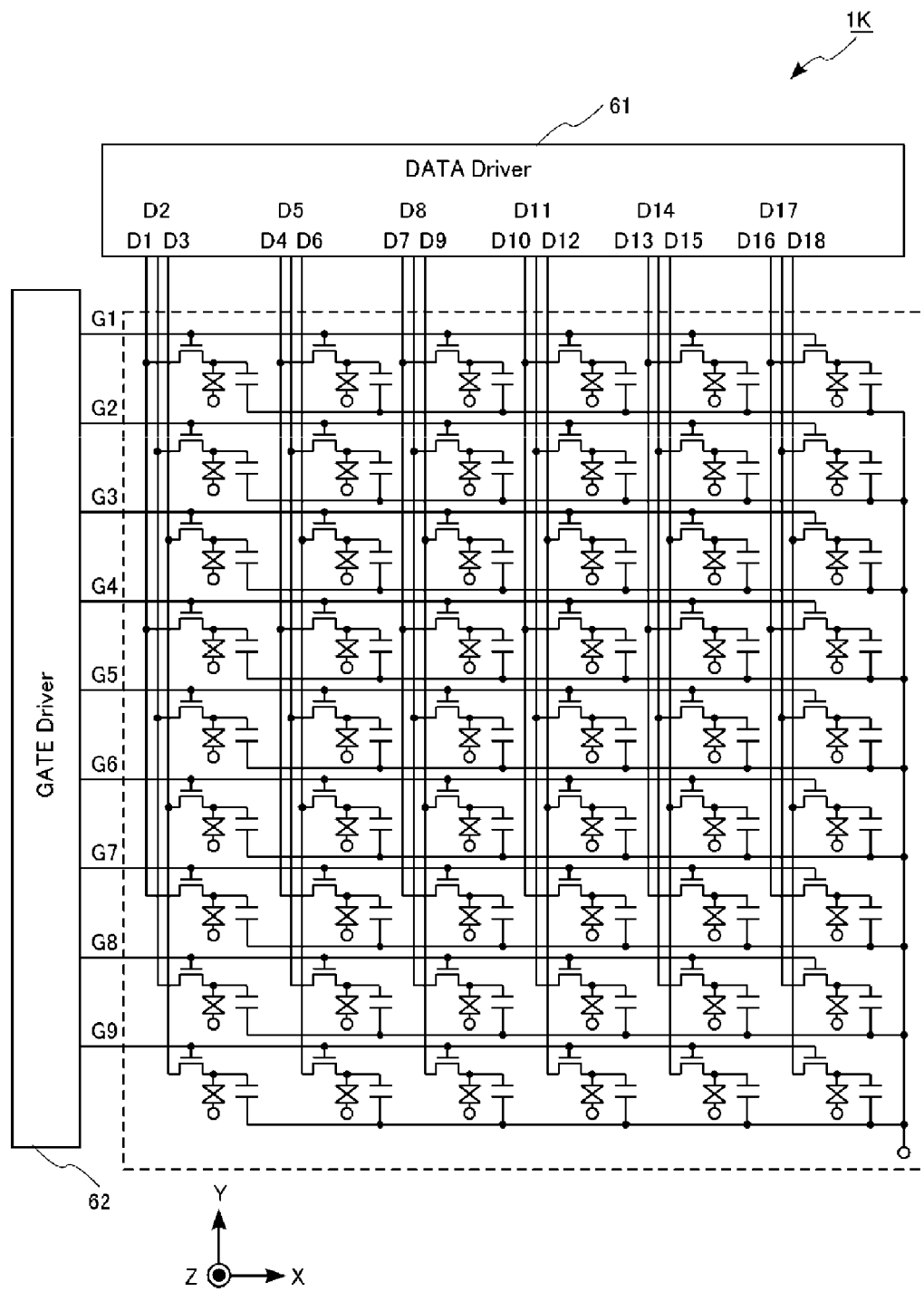
FIG. 40 A circuit diagram showing the structure of the liquid crystal display device according to Embodiment 11 of the present invention.

A liquid crystal display device 1K according to this embodiment is different from the liquid crystal display device 1A according to Embodiment 1 in that the gate lines G provided for each row of subpixels 4S are driven by the output terminals of different gate drivers 62 as shown in FIG. 40. The pixel layout of the TFT substrate 21 can be any layout presented in Embodiments 2 to 10.

Figure 41:
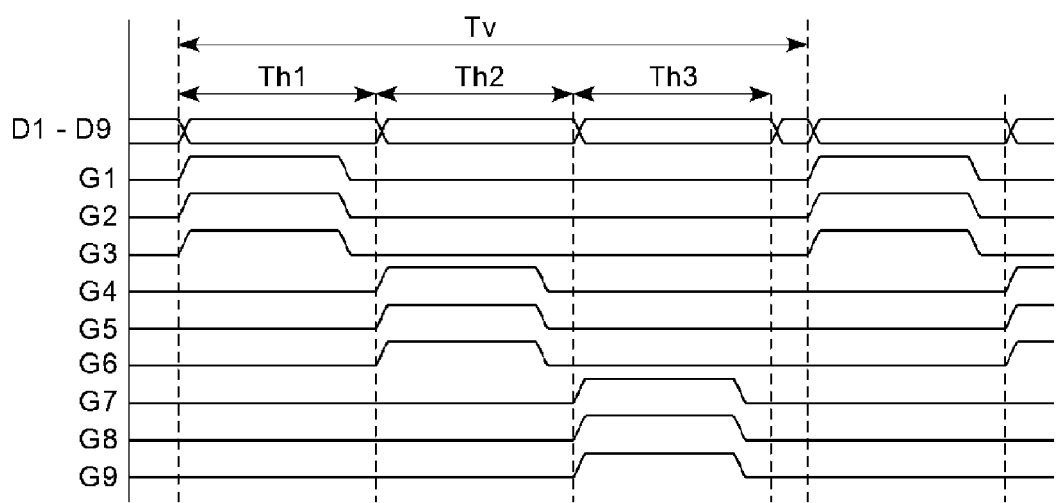
FIG. 41 A timing chart showing the operation of the liquid crystal display device according to Embodiment 11 of the present invention.
Figure 42:
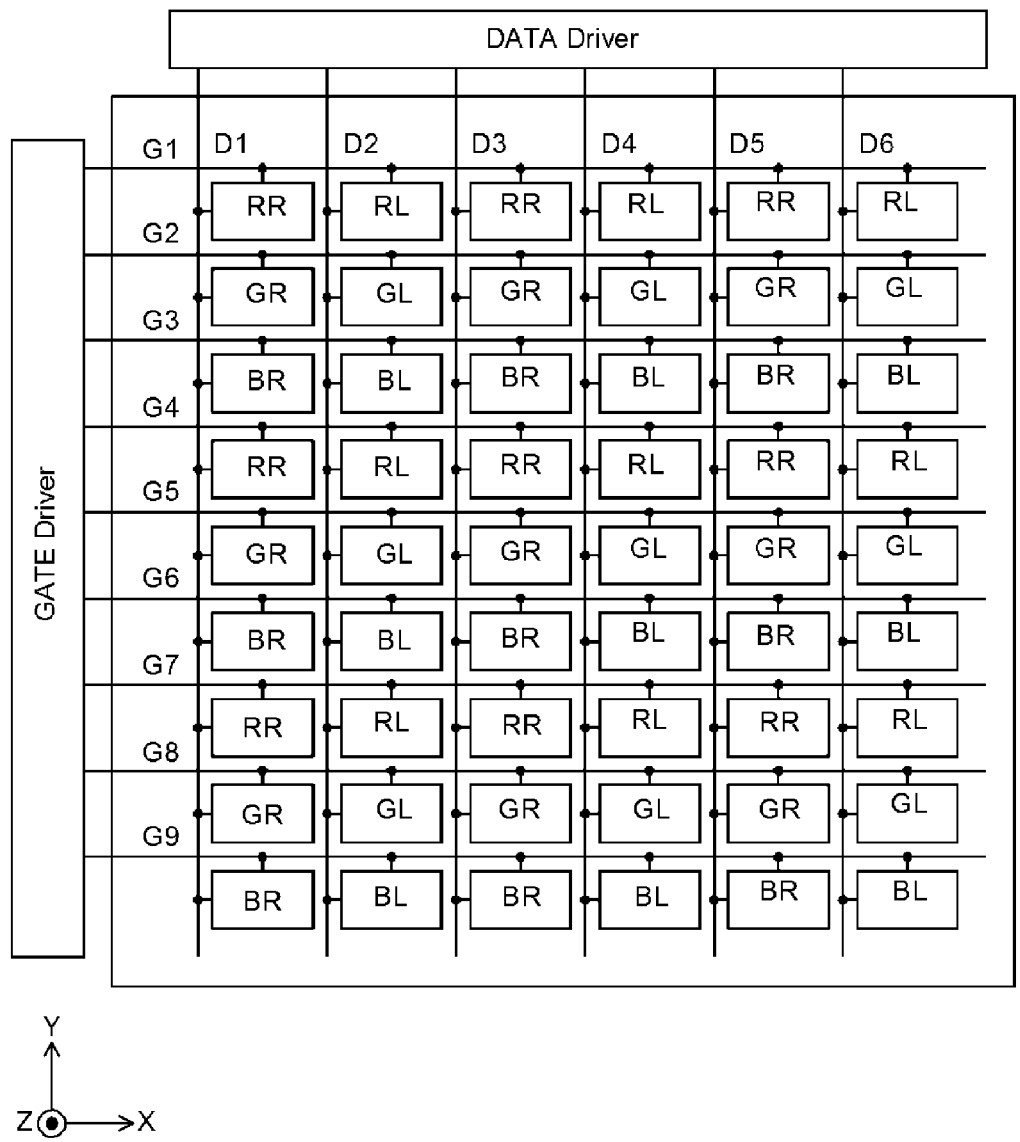
FIG. 42 A circuit diagram showing the structure of a prior art liquid crystal display device.
Figure 43:
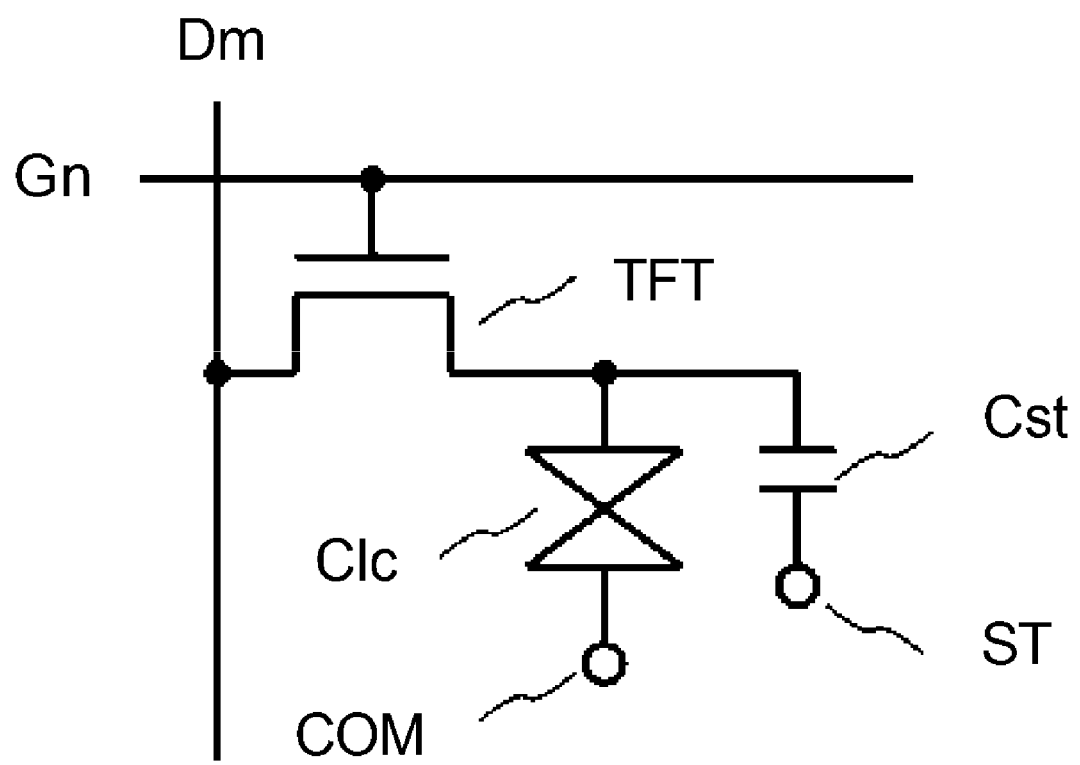
FIG. 43 A circuit diagram showing the structure of a subpixel of a prior art liquid crystal display device.
Figure 44:
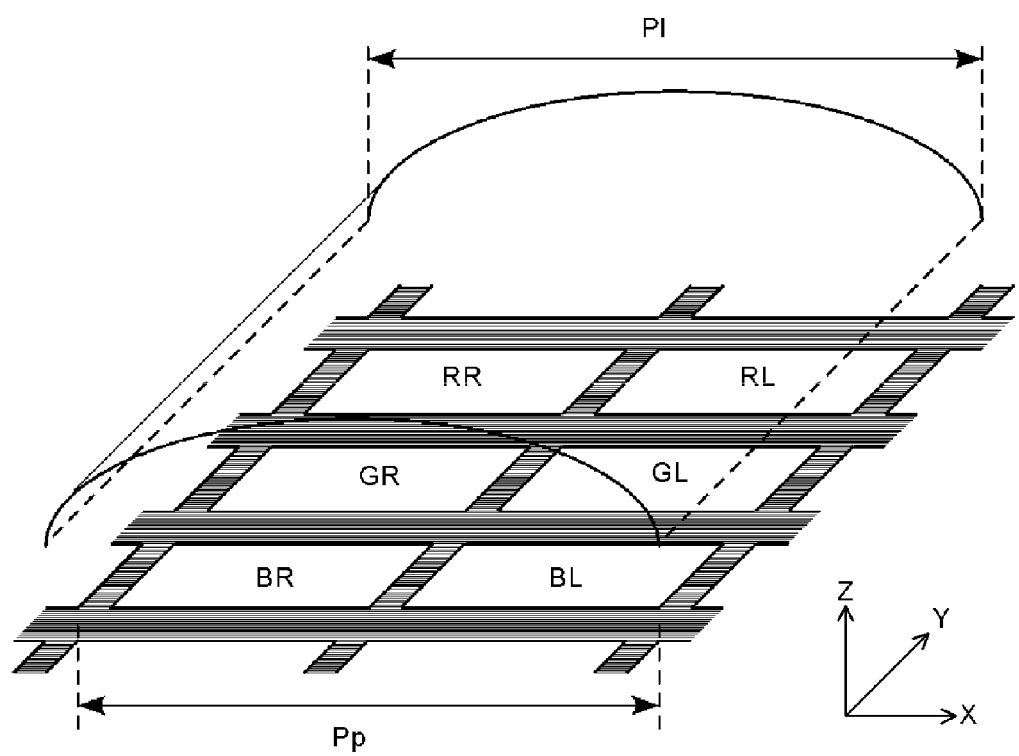
FIG. 44 A three-dimensional view showing the structure of a prior art liquid crystal display device.
Figure 45:
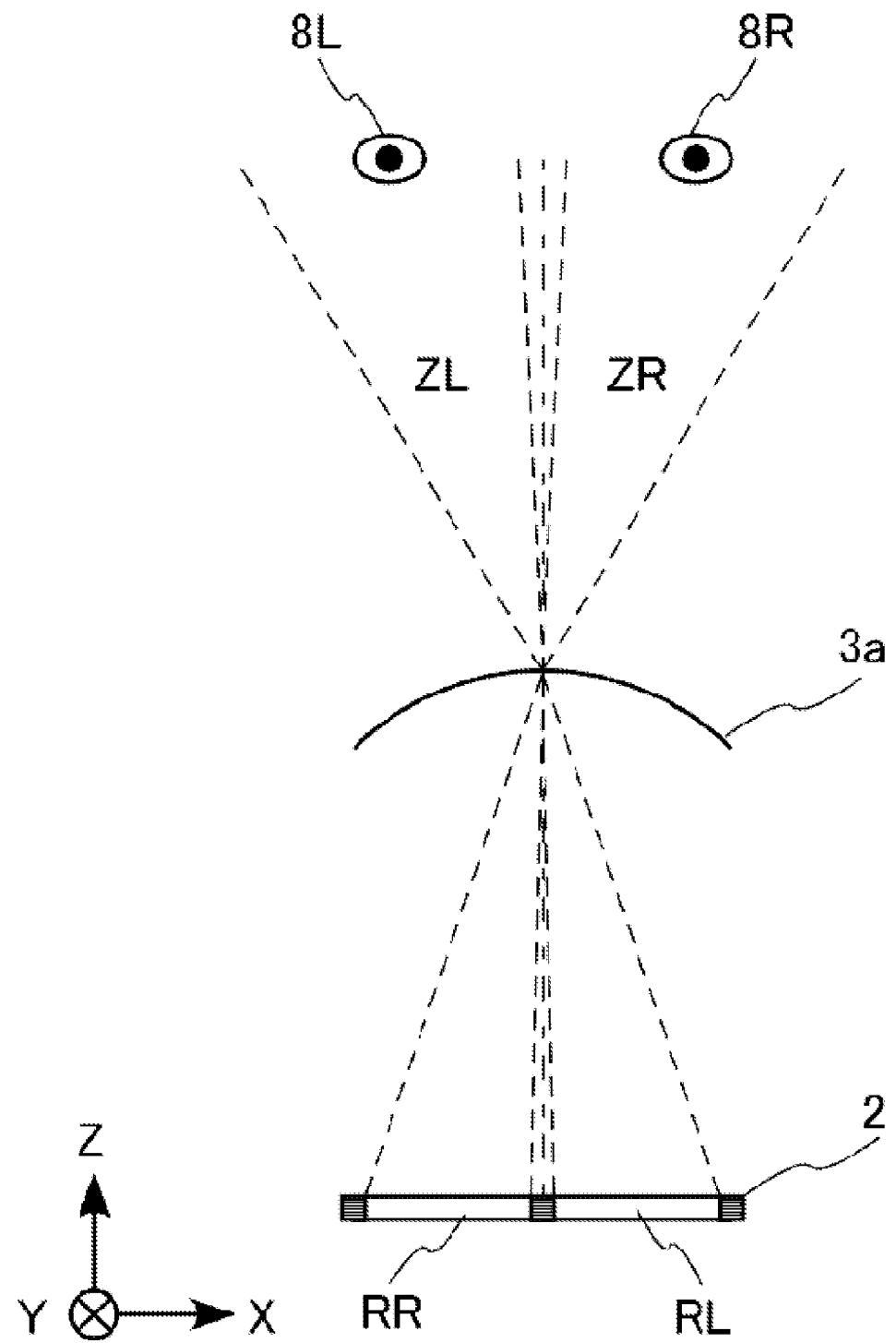
FIG. 45 An illustration for explaining the trajectory of light output from a prior art liquid crystal display device.
Figure 46:
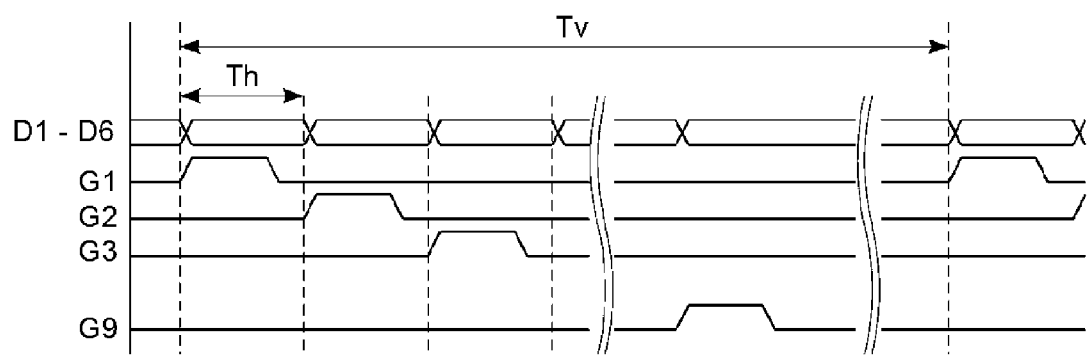
FIG. 46 A timing chart showing the operation of a prior art liquid crystal display device.
Figure 47:
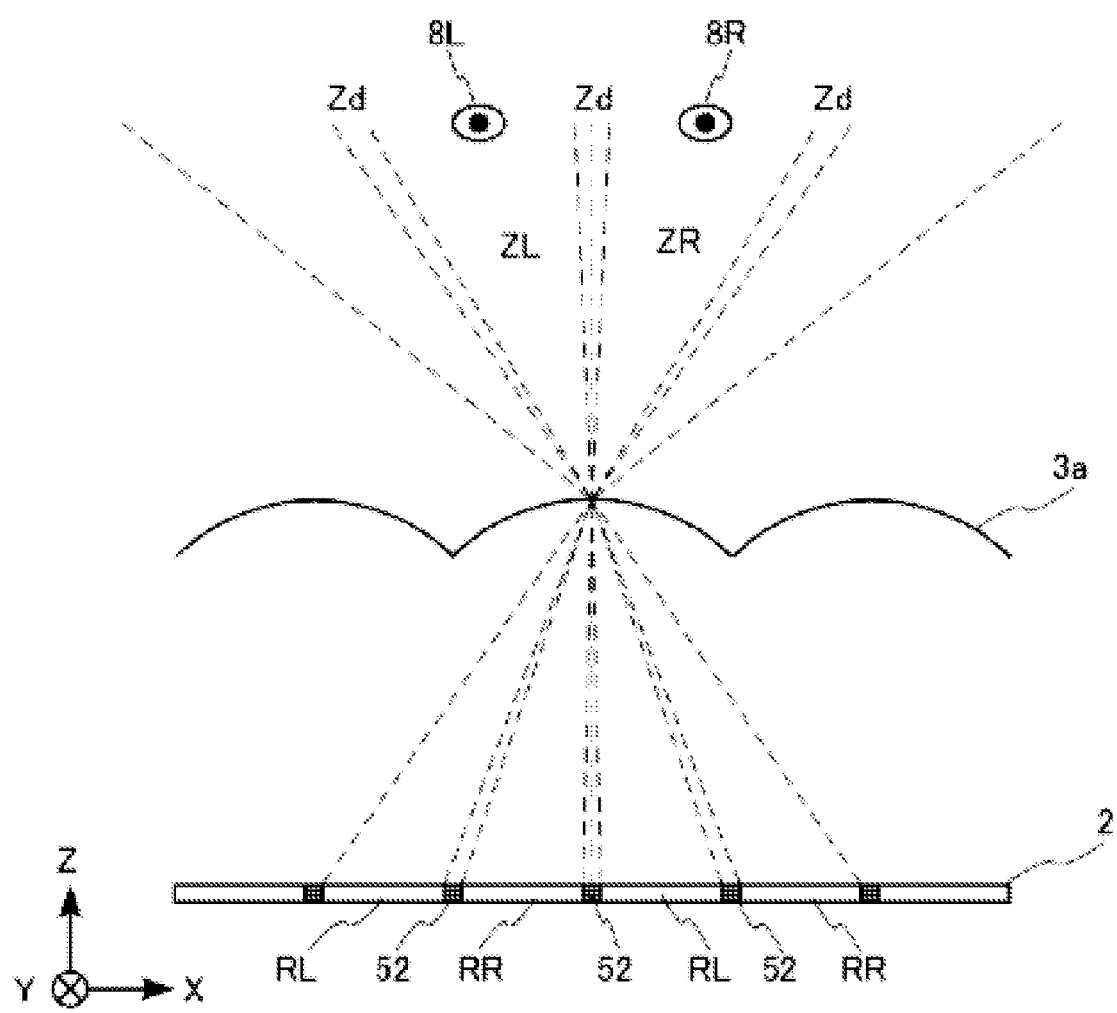
FIG. 47 An illustration for explaining the trajectory of light output from a prior art liquid crystal display device.
Figure 48:
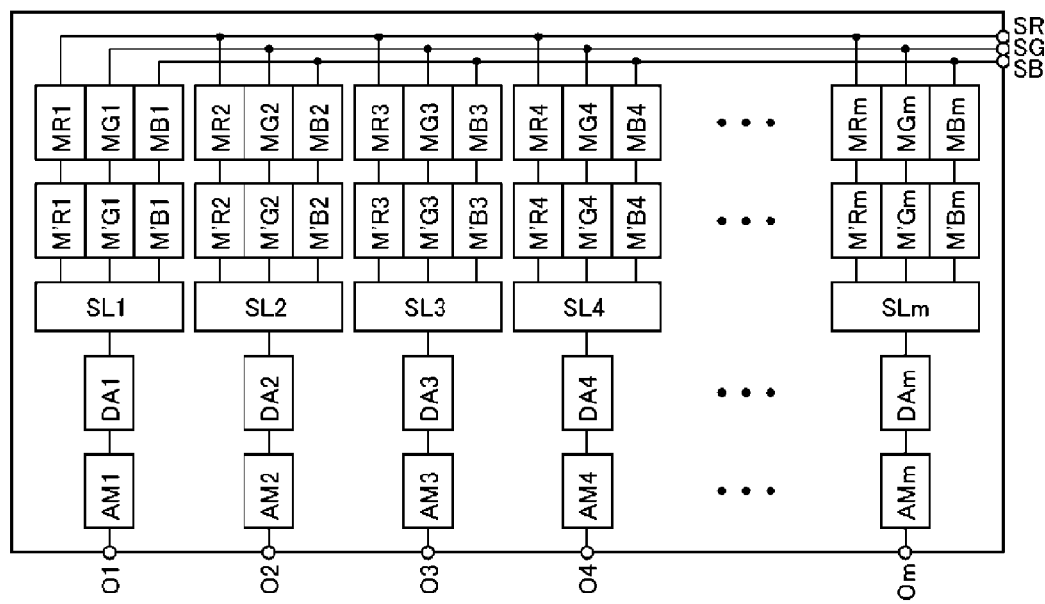
FIG. 48 A circuit diagram showing an exemplary data driver applicable to a prior art liquid crystal display device.
Figure 49:
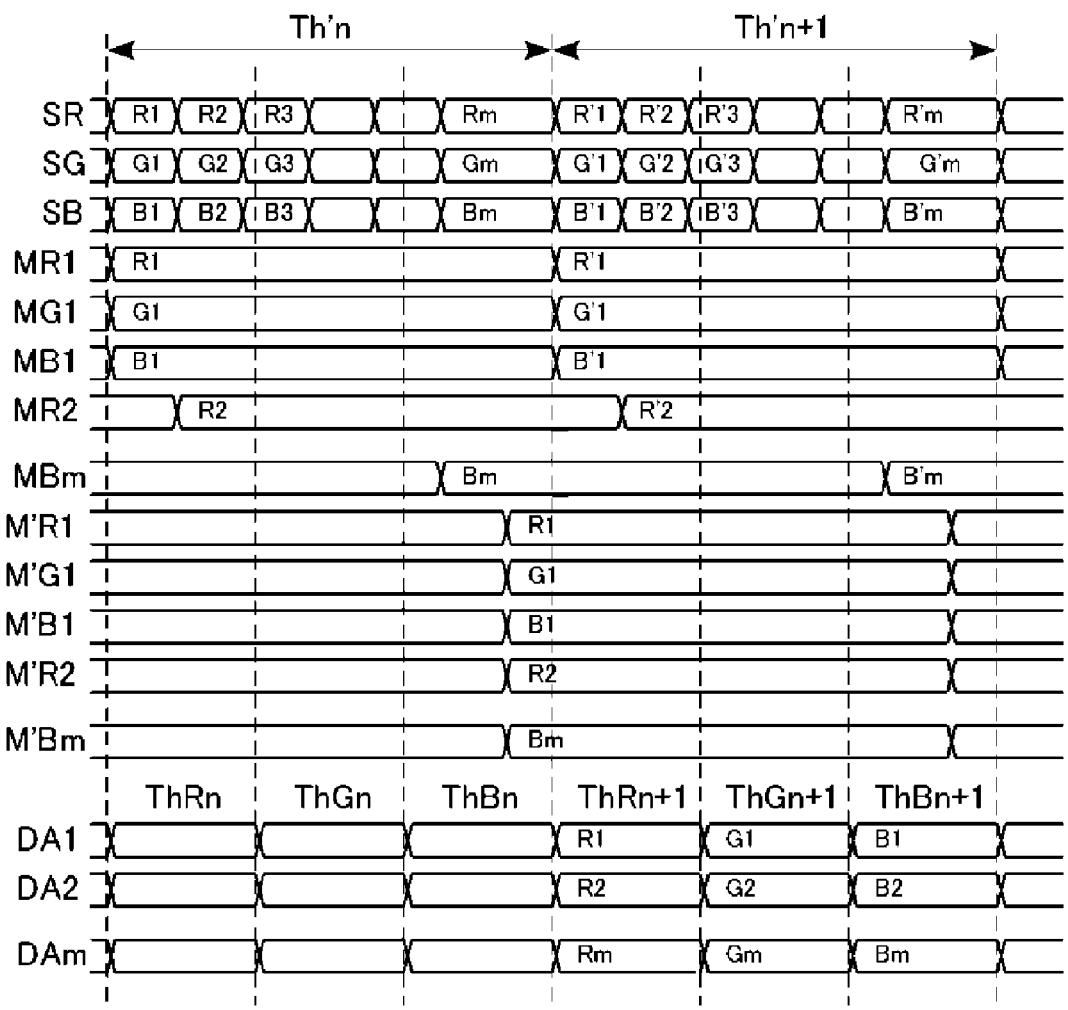
FIG. 49 A timing chart showing the operation of a data driver applicable to a prior art liquid crystal display device.
Figure 50:
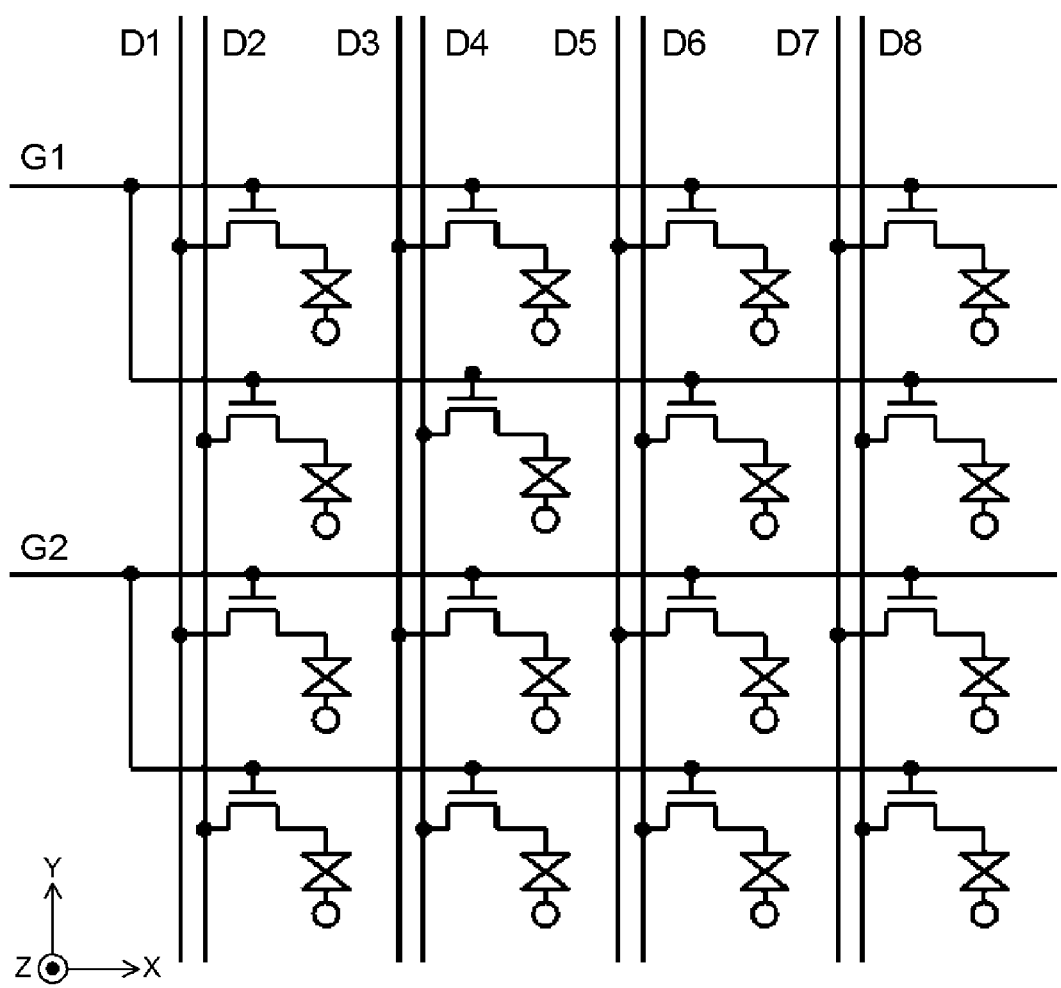
FIG. 50 A circuit diagram showing the structure of a prior art liquid crystal display device.
Figure 51:
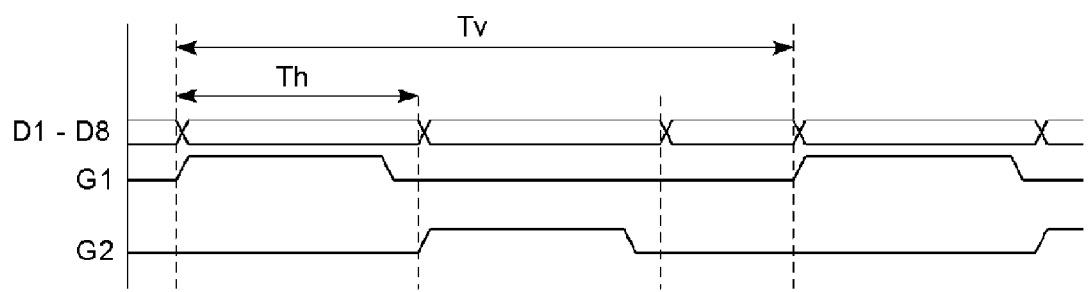
FIG. 51 A timing chart showing the operation of a prior art liquid crystal display device.

The liquid crystal display device 1K comprises nine rows of subpixels 4S. As shown in FIG. 41, one frame time period Tv for writing video signals for one screen in the liquid crystal display device 1G are divided into three horizontal time period Th1 to Th3. Then, the nine gate lines are divided into three groups of three lines (G1 to G3, G4 to G6, and G7 to G9). The gate lines G in a group are driven by the same voltage waveform.

The liquid crystal display device 1K according to this embodiment is the same in other structure and operation as the above-described liquid crystal display device 1A according to Embodiment 1.

In the liquid crystal display device 1K according to this embodiment, multiple gate lines G driven at the same time are driven by different drive circuits (the gate drivers 62). The impedance of a gate line depends on the number of pixel thin film transistors TFT connected to the gate line and the number of data lines D overlapping with the gate line. As the impedance is increased, it takes more time to turn on the pixel thin film transistors TFT.

In the liquid crystal display device 1K according to this embodiment, the gate lines G driven at the same time are driven by different drive circuits. Therefore, the drive circuit has the workload reduced and can operate at a higher speed. In other words, the time required for drive can be reduced even if the resistance per gate line is increased in accordance with increased areas. Furthermore, the time required for drive can be reduced even if the number of pixel thin film transistors TFT connected to a gate line or the area overlapping with data lines D is increased in accordance with higher resolutions. Therefore, the liquid crystal display device 1K according to this embodiment can deal with increased areas and higher resolutions.

In the above embodiments, a pixel 4Pix has a parallelogram opening and multiple data lines D have the same width. However, small errors may occur in the actual production process. For example, as for the line width, process errors of several % on the designed values occur. However, there will be no problem in practice even if the parallelogram is deformed or the line width of multiple data lines D is subject to errors within the above range. Furthermore, if each company follows its own design rules to run the production process, the opening shape is deviated (transformed) from a parallelogram and multiple lines may not have the same width. However, there will be no problem in practice as long as such deviation (transformation) is within several % like the process errors.

Various embodiments and modifications are available to the present invention without departing from the broad sense of spirit and scope of the present invention. The above embodiments are given for explaining the present invention and do not confine the scope of the present invention. In other words, the scope of the present invention is given by the scope of claims, not by the embodiments. Various modifications made within the scope of claims and the scope of significance of the invention equivalent thereto are considered to fall under the scope of the present invention.

Some or all of the above-described embodiments can be described as in the following subjunction but not restricted thereto.

(Subjunction 1)

A liquid crystal display device comprising a liquid crystal panel in which multiple pixels displaying right-eye and left-eye images are arranged in a matrix, and an optical unit arranged in a first direction, extending in a second direction perpendicular to the first direction, and allocating light emitted from the pixels in the first direction, wherein:

the pixels each comprise multiple subpixels arranged in a matrix;

the subpixels are each driven by a gate line extending in the first direction and a data line extending in the second direction, and provided with a color resist transmitting light of the same color as the subpixel adjacent in the first direction;

the subpixels are provided with an opening transmitting light and a shielding part transmitting no light in the manner that the ratio between the opening and shielding part in the second direction within the subpixel is nearly constant regardless of the position in the first direction;

the data line is arranged in the manner that n (n is an integer equal to or greater than 3) data lines are provided for each column of the subpixels and n−1 data lines divide the subpixel at equal intervals; and the multiple subpixels of each of the pixels are driven by a same gate signal.

(Subjunction 2)

The liquid crystal display device according to Subjunction 1, wherein:

the subpixel is provided with multiple separated pixel electrodes.

(Subjunction 3)

The liquid crystal display device according to Subjunction 1 or 2, wherein:

the liquid crystal panel is composed of a TFT substrate on which thin film transistors are provided, a CF substrate on which color resists are provided, and a liquid crystal layer interposed between the TFT substrate and the CF substrate;

the subpixel has a nearly parallelogram opening in the TFT substrate and a nearly parallelogram opening zoned by a shielding layer in the CF substrate;

the TFT substrate is provided with the shielding layer at positions corresponding to the data line; and the width in the second direction of the opening of the TFT substrate and the width in the second direction of the opening of the CF substrate are different.

(Subjunction 4)

The liquid crystal display device according to Subjunction 3, wherein:

the width of the shielding layer provided at positions corresponding to the data line is different from the width of the data line.

(Subjunction 5)

The liquid crystal display device according to any one of Subjunction 1 to 4, wherein:

the number of the color resists is an even number equal to or greater than 4.

(Subjunction 6)

The liquid crystal display device according to any one of Subjunction 1 to 5, wherein:

the subpixel comprises at least a thin film transistor, a pixel electrode, and a storage capacitor, and the storage capacitor is formed under the n data lines.

(Subjunction 7)

The liquid crystal display device according to any one of Subjunction 1 to 6, wherein:

the storage capacitor is provided along the n data lines and substantially does not cross the data lines.

(Subjunction 8)

The liquid crystal display device according to any one of Subjunction 1 to 7, further comprising a data driver driving the data lines, wherein:

the data driver comprises the same number of memories as the subpixels of the pixel, the same number of digital-analog converters as the subpixels of the pixel, and the same number of amplifiers as the subpixels of the pixel; and the memories stores digitalized video signals, and the digital-analog converters supply the video signals output from the memories to the data lines via the amplifiers.

(Subjunction 9)

A liquid crystal display device comprising a liquid crystal panel in which multiple pixels displaying right-eye and left-eye images are arranged in a matrix, and an optical unit arranged in a first direction, extending in a second direction perpendicular to the first direction, and allocating light emitted from the pixels in the first direction, wherein:

the pixels each comprise multiple subpixels arranged in a matrix;

the subpixels are each driven by a gate line extending in the first direction and a data line extending in the second direction, and provided with a color resist transmitting light of the same color as the subpixel adjacent in the first direction; and the width in the first direction of light allocated by the optical unit is two or more times larger than the distance in the first direction between the eyes of the observer at a given position in a third direction perpendicular to the first and second directions.

(Subjunction 10)

A method of driving a liquid crystal display device provided with a liquid crystal panel in which multiple pixels displaying right-eye and left-eye images are arranged in a matrix, the pixels comprise multiple subpixels driven by at least one of n gate lines and at least one of m data lines arranged in a matrix, and the subpixels comprise a thin film transistor, a liquid crystal capacitor, and a storage capacitor, comprising the following steps:

outputting a gate signal to turn on the thin film transistors onto at least one of the gate lines in a time period T/n in which T is a frame time period to write video signals for one screen; and applying video signals to the m data lines after the thin film transistors are turned on and writing the video signals in the liquid crystal capacitors and storage capacitors.

(Subjunction 11)

A liquid crystal display device comprising a liquid crystal panel in which multiple pixels displaying right-eye and left-eye images are arranged in a matrix, and an optical unit arranged in a first direction, extending in a second direction perpendicular to the first direction, and allocating light emitted from the pixels in the first direction, wherein:

the pixels each comprise multiple subpixels arranged in a matrix;

the subpixels are provided with multiple first shielding parts transmitting no light and extending in the first direction and multiple second shielding parts transmitting no light and having an angle θ with respect to the first direction;

the multiple first shielding parts each have a constant width in the second direction and the multiple second shielding parts have an equal width in the first direction;

the opening of the subpixels is divided by the multiple first shielding parts in the second direction and divided by the multiple second shielding parts equally into m in the first direction; and the following relationship is satisfied in which h is the total length in the second direction of the multiple divided openings in the second direction and Px is the pitch of the subpixels in the first direction:

$m \times h / \tan \theta = Px$.

The present invention can be used in a liquid crystal device realizing high image quality at low cost.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A liquid crystal display device comprising a liquid crystal panel in which multiple pixels displaying right-eye and left-eye images are arranged in a matrix, and an optical unit arranged in a first direction, extending in a second direction perpendicular to said first direction, and allocating light emitted from said pixels in said first direction, wherein:
   said pixels each comprise multiple subpixels arranged in a matrix;
   said subpixels are each driven by a gate line extending in said first direction and a data line extending in said second direction, and provided with a color resist transmitting light of the same color as said subpixel adjacent in said first direction;
   said subpixels are provided with an opening transmitting light and a shielding part transmitting no light in the manner that the ratio between said opening and shielding part in said second direction within said subpixel is nearly constant regardless of the position in said first direction;
   said data line is arranged in the manner that n (n is an integer equal to or greater than 3) data lines are provided for each column of said subpixels and n−1 data lines divide said subpixel at equal intervals; and
   said multiple subpixels of each of said pixels are driven by a same gate signal.

2. The liquid crystal display device according to claim 1, wherein:
   said subpixel is provided with multiple separated pixel electrodes.

3. The liquid crystal display device according to claim 1, wherein:
   said liquid crystal panel is composed of a TFT substrate on which thin film transistors are provided, a CF substrate on which color resists are provided, and a liquid crystal layer interposed between said TFT substrate and said CF substrate;
   said subpixel has a nearly parallelogram opening in said TFT substrate and a nearly parallelogram opening zoned by a shielding layer in said CF substrate;
   said TFT substrate is provided with said shielding layer at positions corresponding to said data line; and
   the width in said second direction of the opening of said TFT substrate and the width in said second direction of the opening of said CF substrate are different.

4. The liquid crystal display device according to claim 3, wherein:
   the width of said shielding layer provided at positions corresponding to said data line is different from the width of said data line.

5. The liquid crystal display device according to claim 1, wherein:
   the number of said color resists is an even number equal to or greater than 4.

6. The liquid crystal display device according to claim 1, wherein:
   said subpixel comprises at least a thin film transistor, a pixel electrode, and a storage capacitor, and said storage capacitor is formed under said n data lines.

7. The liquid crystal display device according to claim 1, wherein:
   said storage capacitor is provided along said n data lines and substantially does not cross said data lines.

8. A liquid crystal display device comprising a liquid crystal panel in which multiple pixels displaying right-eye and left-eye images are arranged in a matrix, and an optical unit arranged in a first direction, extending in a second direction perpendicular to said first direction, and allocating light emitted from said pixels in said first direction, wherein:
   said pixels each comprise multiple subpixels arranged in a matrix;
   said subpixels are each driven by a gate line extending in said first direction and a data line extending in said second direction, and provided with a color resist transmitting light of the same color as said subpixel adjacent in said first direction; and
   the width in said first direction of light allocated by said optical unit is two or more times larger than the distance in said first direction between the eyes of the observer at a given position in a third direction perpendicular to said first and second directions.

9. A liquid crystal display device comprising a liquid crystal panel in which multiple pixels displaying right-eye and left-eye images are arranged in a matrix, and an optical unit arranged in a first direction, extending in a second direction perpendicular to said first direction, and allocating light emitted from said pixels in said first direction, wherein:
   said pixels each comprise multiple subpixels arranged in a matrix;
   said subpixels are provided with multiple first shielding parts transmitting no light and extending in said first direction and multiple second shielding parts transmitting no light and having an angle θ with respect to said first direction;
   said multiple first shielding parts each have a constant width in said second direction and said multiple second shielding parts have an equal width in said first direction;
   the opening of said subpixels is divided by said multiple first shielding parts in said second direction and divided by said multiple second shielding parts equally into m in said first direction; and
   the following relationship is satisfied in which h is the total length in said second direction of the multiple divided openings in said second direction and Px is the pitch of said subpixels in said first direction:

$m \times h / \tan \theta = Px$.

* * * * *